United States Patent
Higa et al.

(10) Patent No.: US 11,430,047 B2
(45) Date of Patent: Aug. 30, 2022

(54) SELF-CHECKOUT SYSTEM, PURCHASED PRODUCT MANAGEMENT METHOD, AND PURCHASED PRODUCT MANAGEMENT PROGRAM

(71) Applicant: NEC Corporation, Tokyo (JP)

(72) Inventors: Kyota Higa, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/976,647

(22) PCT Filed: Mar. 9, 2018

(86) PCT No.: PCT/JP2018/009203
§ 371 (c)(1),
(2) Date: Aug. 28, 2020

(87) PCT Pub. No.: WO2019/171572
PCT Pub. Date: Sep. 12, 2019

(65) Prior Publication Data
US 2020/0410572 A1    Dec. 31, 2020

(51) Int. Cl.
*G06Q 30/00*    (2012.01)
*G06Q 30/06*    (2012.01)
(Continued)

(52) U.S. Cl.
CPC ....... *G06Q 30/0633* (2013.01); *G06F 9/5027* (2013.01); *G06Q 30/0639* (2013.01); *G06V 20/13* (2022.01)

(58) Field of Classification Search
None
See application file for complete search history.

(56) References Cited

U.S. PATENT DOCUMENTS 9,911,290 B1 * 3/2018 Zalewski ............... G06Q 20/12
10,290,031 B2 * 5/2019 Reid .................. G06K 9/00335
(Continued)

FOREIGN PATENT DOCUMENTS

JP    2015-001879 A    1/2015
JP    2016-004353 A    1/2016
(Continued)

OTHER PUBLICATIONS

Zheng Qin, "Introduction to E-commerce", 2009, Springer, springer.com (Year: 2009).*
(Continued)

*Primary Examiner* — Naeem U Haq
*Assistant Examiner* — Norman Donald Sutch, Jr.

(57) ABSTRACT

On the basis of a detected change in the display state of the product and of a person included in the captured image or a person whose in-store flow line has been detected, a rearrangement detection means 820 detects that a product has been returned to a different location than the location from which the product was taken. A shopping list generation means 830 uses shelving information on a product shelf to specify a product for which there has been detected a change in the display state that is a result of the person having picked up the product, performs a registration process for registering the specified product on a shopping list that corresponds to the person, and performs a deletion process for deleting the product, which has been returned to the different location than the location from which the product was taken, from the shopping list.

10 Claims, 27 Drawing Sheets

(51) Int. Cl.
  *G06F 9/50* (2006.01)
  *G06V 20/13* (2022.01)

(56) References Cited

U.S. PATENT DOCUMENTS

| | | | | |
|---|---|---|---|---|
| 10,515,309 | B1* | 12/2019 | McNamara | G01G 19/52 |
| 10,943,285 | B1* | 3/2021 | Grigsby | H04W 4/029 |
| 2004/0210526 | A1* | 10/2004 | Brown | G06Q 20/102 |
| | | | | 705/40 |
| 2011/0050396 | A1* | 3/2011 | Chaves | G06Q 10/087 |
| | | | | 340/10.1 |
| 2015/0029339 | A1* | 1/2015 | Kobres | H04N 7/181 |
| | | | | 348/150 |
| 2015/0363798 | A1 | 12/2015 | Aihara et al. | |
| 2016/0371636 | A1* | 12/2016 | Douglas | G06Q 20/208 |
| 2018/0002109 | A1 | 1/2018 | Yamashita | |
| 2019/0147393 | A1* | 5/2019 | McCafferty | G06Q 30/0208 |
| | | | | 340/572.1 |
| 2019/0236530 | A1* | 8/2019 | Cantrell | G06Q 10/087 |
| 2019/0244161 | A1* | 8/2019 | Abhishek | G06Q 30/0639 |

FOREIGN PATENT DOCUMENTS

| | | |
|---|---|---|
| JP | 2016-532932 A | 10/2016 |
| JP | 2017-157216 A | 9/2017 |
| WO | 2015/140851 A1 | 9/2015 |
| WO | 2015/140853 A1 | 9/2015 |
| WO | 2016/117600 A1 | 7/2016 |

OTHER PUBLICATIONS

Devin Coldewey; "Inside Amazon's surveillance-powered, no-checkout convenience store"; Jan. 21, 2018; techcrunch.com; https://techcrunch.com/2018/01/21/inside-amazons-surveillance-powered-no-checkoutconvenience-store/ (Year: 2018).*

Zoran Zivkovic, "Improved Adaptive Gaussian Mixture Model for Background Subtraction", Proceedings of the 17th International Conference on Pattern Recognition (ICPR'04), IEEE Computer Society, Aug. 2004, pp. 28-31, vol. 2-vol. 02, USA.

Yuichiro Nishizawa, "Looking at the omnichannel trend from 'a consumer perspective' based on overseas cases", non-official translation, Ryutsu Networking, Mar. 10, 2017, pp. 39-43, No. 300.

International Search Report for PCT/JP2018/009203 dated Jun. 5, 2018 (PCT/ISA/210).

* cited by examiner

FIG. 6

| SECOND ATTENTION IMAGE | FIRST ATTENTION IMAGE | TYPE OF CHANGE |
|---|---|---|
|  |  | CHANGE CAUSED BY PRODUCT CONTAINED ANEW IN PRODUCT SHELF |
|  |  | CHANGE CAUSED BY PRODUCT HAVING BEEN TAKEN |
|  |  | CHANGE CAUSED BY DIFFERENT APPEARANCE OF PRODUCT DISPLAYED ON PRODUCT SHELF |

FIG. 7

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| 2 | 1 | 500,250,30,50 | PRODUCT DECREASE |
| 3 | 1 | 500,250,30,50 | PRODUCT INCREASE |
| 4 | 1 | 250,300,30,50 | PRODUCT INCREASE |
| 5 | 1 | 750,100,40,50 | PRODUCT INCREASE |

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| 1 | 1 | 250,300,30,50 | PRODUCT INCREASE |
| 2 | 1 | 500,250,30,50 | PRODUCT DECREASE |
| 2 | 1 | 500,250,30,50 | PRODUCT INCREASE |
| 5 | 1 | 750,100,40,50 | PRODUCT INCREASE |

FIG. 14

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| 2 | 1 | 500,250,30,50 | PRODUCT DECREASE |
| 3 | 2 | 100,250,50,70 | PRODUCT INCREASE |
| 4 | 2 | 250,300,40,60 | PRODUCT DECREASE |

FIG. 15

| PERSON ID | CAMERA ID | POSITION INFORMATION (x,y,width,height) | TYPE OF CHANGE |
|---|---|---|---|
| 1 | 1 | 10,0,30,50 | PRODUCT DECREASE |
| 1 | 2 | 100,250,50,70 | PRODUCT INCREASE |
| 2 | 1 | 500,250,30,50 | PRODUCT DECREASE |
| 4 | 2 | 250,300,40,60 | PRODUCT DECREASE |

FIG. 19

| PERSON ID | PRODUCT SHELF ID | CAMERA ID |
|---|---|---|
| 1 | PRODUCT SHELF A | 1 |
| 2 | PRODUCT SHELF A | 1 |
| 2 | PRODUCT SHELF A | 1 |
| 1 | PRODUCT SHELF A | 1 |
| 3 | PRODUCT SHELF A | 1 |

FIG. 20

| PERSON ID | CAMERA ID | PRODUCT SHELF ID | POSITION INFORMATION (x,y,width,height) | TYPE OF CHANGE |
|---|---|---|---|---|
| 1 | 1 | PRODUCT SHELF A | 10,0,30,50 | PRODUCT DECREASE |
| 2 | 1 | PRODUCT SHELF A | 500,250,30,50 | PRODUCT DECREASE |
| 2 | 1 | PRODUCT SHELF A | 500,250,30,50 | PRODUCT INCREASE |
| 1 | 1 | PRODUCT SHELF A | 250,300,30,50 | PRODUCT INCREASE |
| 3 | 1 | PRODUCT SHELF A | 750,100,40,50 | PRODUCT INCREASE |

FIG. 21

| PERSON ID | CAMERA ID | PRODUCT SHELF ID | POSITION INFORMATION (x,y,width,height) | TYPE OF CHANGE |
|---|---|---|---|---|
| 1 | 1 | PRODUCT SHELF A | 10,0,30,50 | PRODUCT DECREASE |
| 1 | 1 | PRODUCT SHELF A | 250,300,30,50 | PRODUCT INCREASE |
| 2 | 1 | PRODUCT SHELF A | 500,250,30,50 | PRODUCT DECREASE |
| 2 | 1 | PRODUCT SHELF A | 500,250,30,50 | PRODUCT INCREASE |
| 3 | 1 | PRODUCT SHELF A | 750,100,40,50 | PRODUCT INCREASE |

| TERMINAL IDENTIFICATION INFORMATION | PRODUCT SHELF ID | POSITION INFORMATION (x,y,width,height) | TYPE OF CHANGE |
|---|---|---|---|
| 1 | PRODUCT SHELF A | 10,0,30,50 | PRODUCT DECREASE |
| 1 | PRODUCT SHELF A | 250,300,30,50 | PRODUCT INCREASE |
| 2 | PRODUCT SHELF A | 500,250,30,50 | PRODUCT DECREASE |
| 2 | PRODUCT SHELF A | 500,250,30,50 | PRODUCT INCREASE |
| 3 | PRODUCT SHELF A | 750,100,40,50 | PRODUCT INCREASE |

SELF-CHECKOUT SYSTEM, PURCHASED PRODUCT MANAGEMENT METHOD, AND PURCHASED PRODUCT MANAGEMENT PROGRAM

CROSS REFERENCE TO RELATED APPLICATIONS

This application is a National Stage of International Application No. PCT/JP2018/009203 filed Mar. 9, 2018.

TECHNICAL FIELD

The present invention relates to a self-register (self-checkout) system that automatically manages products purchased by customers, a purchased product management method thereof, and a purchased product management program therefor.

BACKGROUND ART

Stores that sell products, such as convenience stores and supermarkets, have introduced self-checkout systems in which customers themselves operate cash register (hereinafter, referred to as checkout) terminals. In a typical self-checkout system, a customer makes payment by causing the checkout terminal to read a product identification code (for example, a barcode). Since, however, it takes time and effort for the customer to determine the position of the identification code, various methods have been proposed for automatically identifying the product purchased by the customer.

For example, Patent Literature (PTL) 1 describes a system that tracks the removal or arrangement of articles in a place of stock with a material handling facility. The system described in PTL 1 acquires an image of a user's hand, detects that an article is taken from the place of stock, and adds the article to a user article list in response to the detection.

In addition, PTL 2 describes a point-of-sales (POS) system for payment of products. The POS system described in PTL 2 detects the flow line of a customer by using a captured image, identifies a customer who intends to make a payment for a product, and recognizes the product for payment with the product displayed in a position corresponding to the flow line of the customer as a candidate.

Non Patent Literature (NPL) 1 describes a method of subtracting a background image by using an adaptive Gaussian mixture model.

CITATION LIST

Patent Literatures

PTL 1: Japanese Unexamined PCT Publication No. 2016-532932
PTL 2: International Publication No. WO 2015/140853

Non Patent Literature

NPL 1: Zoran Zivkovic, "Improved Adaptive Gaussian Mixture Model for Background Subtraction," Proceedings of the 17th International Conference on Pattern Recognition (ICPR '04), U.S. IEEE Computer Society, August 2004, Volume2-Volume02, pp. 28-31

SUMMARY OF INVENTION

Technical Problem

On the other hand, to implement the system described in PTL 1, there is a need for an imaging device (camera) capable of identifying each customer's hand, which leads to an increase in installation cost problematically. Furthermore, in the system described in PTL 1, it is difficult to identify a product in the case where the product has been returned to a different location than a location from which the product was taken, and therefore the system has a problem that it is difficult to properly manage a user article list.

Furthermore, in the system described in PTL 2, the product associated with flow line data is a candidate for a payment process, though the system cannot determine whether the customer returned the product before payment. Therefore, in the case where the customer returns the product to a different location than the location from which the product was taken, it is difficult to detect such movements. Thus, even if a product has been returned to a different location than the location from which the product was taken, it is preferable to be able to properly manage the products that customers purchase.

Therefore, it is an object of the present invention to provide a self-checkout system, a purchased product management method, and a purchased product management program capable of properly managing products purchased by customers even in the case where a product has been returned to a different location than the location from which the product was taken.

Solution to Problem

According to an aspect of the present invention, there is provided a self-checkout system including: a change detection means for detecting a change in a display state of a product on the basis of a captured image of the product; a rearrangement detection means for detecting that the product has been returned to a different location than the location from which the product was taken on the basis of the change in the display state of the product detected by the change detection means and a person included in the captured image or a person whose in-store flow line has been detected; and a shopping list generation means for specifying the product for which there has been detected a change in the display state that is a result of the person having picked up the product on the basis of shelving information on a product shelf on which the product has been arranged, performing a registration process for registering the specified product on a shopping list corresponding to the person, and performing a deletion process for deleting the product, which has been returned to the different location than the location from which the product was taken, from the shopping list that corresponds to the person, on the basis of a result of detection by the rearrangement detection means and of the shelving information.

According to another aspect of the present invention, there is provided a purchased product management method including the steps of: detecting a change in a display state of a product on the basis of a captured image of the product; detecting that the product has been returned to a different location than the location from which the product was taken on the basis of the change in the display state of the detected product and a person included in the captured image or a person whose in-store flow line has been detected; specifying the product for which there has been detected a change in the display state that is a result of the person having picked up the product on the basis of shelving information on a product shelf on which the product has been arranged and performing a registration process for registering the specified product on a shopping list corresponding to the person; and performing a deletion process for deleting the product, which has been returned to the different location than the location from which the product was taken, from the shopping list that corresponds to the person, on the basis of a result of detection indicating that the product has been returned to the different location than the location from which the product was taken and of the shelving information.

According to still another aspect of the present invention, there is provided a purchased product management program for causing a computer to perform: a change detection process of detecting a change in a display state of a product on the basis of a captured image of the product; a rearrangement detection process of detecting that the product has been returned to a different location than the location from which the product was taken on the basis of the change in the display state of the product detected by the change detection process and a person included in the captured image or a person whose in-store flow line has been detected; and a shopping list generation process of specifying the product for which there has been detected a change in the display state that is a result of the person having picked up the product on the basis of shelving information on a product shelf on which the product has been arranged, performing a registration process for registering the specified product on a shopping list corresponding to the person, and performing a deletion process for deleting the product, which has been returned to the different location than the location from which the product was taken, from the shopping list that corresponds to the person, on the basis of a result of detection by the rearrangement detection process and of the shelving information.

Advantageous Effects of Invention

The present invention enables products purchased by customers to be properly managed even in the case where a product has been returned to a different location than the location from which the product was taken.

BRIEF DESCRIPTION OF DRAWINGS

FIG. 6 It depicts an explanatory diagram illustrating an example of a classification result output from an area change classification unit.

FIG. 7 It depicts an explanatory diagram illustrating an example of product-and-person relationship information.

FIG. 14 It depicts an explanatory diagram illustrating an example of product-and-person relationship information.

FIG. 15 It depicts an explanatory diagram illustrating an example of integrated product-and-person relationship information.

FIG. 19 It depicts an explanatory diagram illustrating an example of a flow line data.

FIG. 20 It depicts an explanatory diagram illustrating an example of product-and-person relationship information.

FIG. 21 It depicts an explanatory diagram illustrating an example of product-and-person relationship information.

FIG. 24 It depicts a block diagram illustrating a configuration example of an image processing device 300a.

FIG. 25 It depicts an explanatory diagram illustrating another example of the flow line data.

DESCRIPTION OF EMBODIMENT

Hereinafter, exemplary embodiments of the present invention will be described with reference to appended drawings.

Exemplary Embodiment 1

In the first exemplary embodiment, description will be made on a self-checkout system 1 that manages a list of products that a customer plans to purchase (hereinafter, referred to as "shopping list") on the basis of a captured image. In particular, the self-checkout system 1 of this exemplary embodiment manages the shopping list properly by detecting that a product has been returned to a different location than the location from which the product was taken.

As will be described later, the self-checkout system 1 of this exemplary embodiment detects a change in a product shelf 3 on the basis of a captured image captured by an imaging device 2 and also detects areas of persons and objects that are included in the captured image. Then, the self-checkout system 1 associates the change in the product shelf 3 with an extracted person and integrates the information associated with the person as a reference. Thus, the self-checkout system 1 is configured to associate the change in the product shelf 3 on the basis of the extracted person. As a result, the self-checkout system 1 detects that a product has been returned to a different location than the location from which the product was taken, such as in the case where a customer picks up a product once and places it on another product shelf 3.

Figure 1:
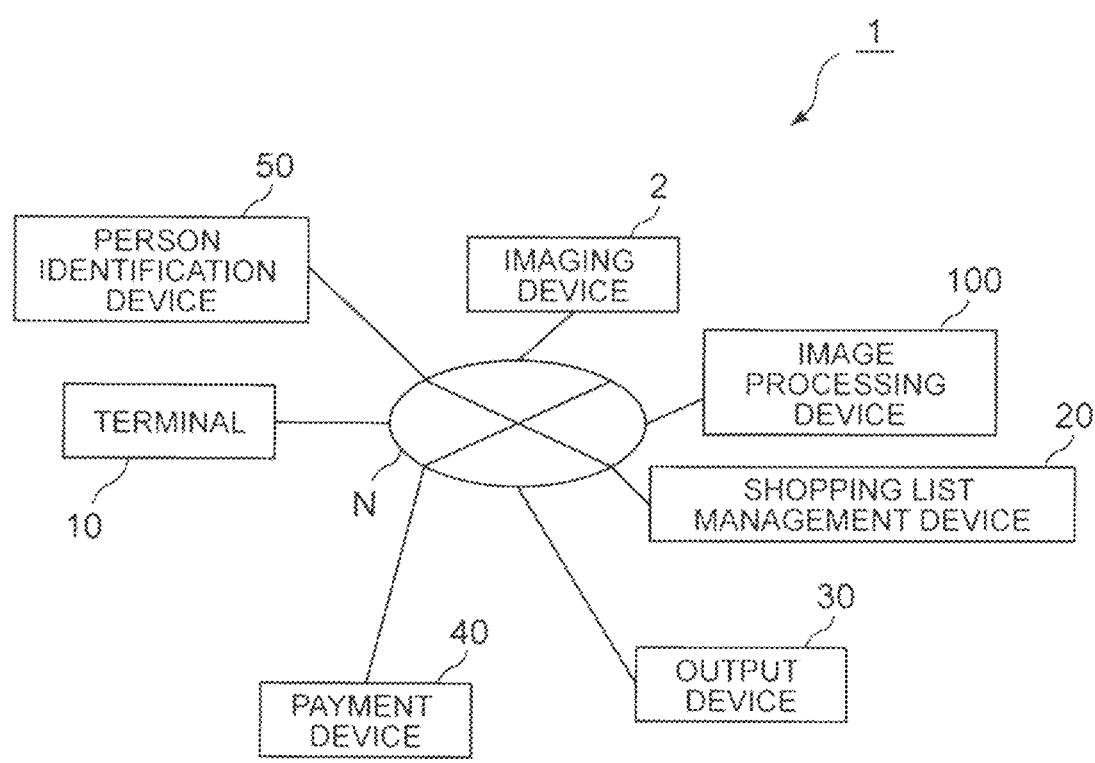
FIG. 1 It depicts a block diagram illustrating a configuration example of a first exemplary embodiment of a self-checkout system according to the present invention.

FIG. 1 is a block diagram illustrating a configuration example of a first exemplary embodiment of a self-checkout system according to the present invention. The self-checkout system 1 of this exemplary embodiment includes a terminal 10 carried by a customer, an image processing device 100, an imaging device 2, a shopping list management device 20, an output device 30, a payment device 40, and a person identification device 50. The terminal 10, the image processing device 100, the imaging device 2, the shopping list management device 20, the output device 30, the payment device 40, and the person identification device 50 are interconnected via, for example, a network N.

In this exemplary embodiment, the image processing device 100, the imaging device 2, and the shopping list management device 20 will be described as separate components. Each component, however, may be built in another device. For example, the imaging device 2 may have a function as the image processing device 100 described later, and the image processing device 100 may have a function as the imaging device 2. Moreover, for example, the image processing device 100 and the shopping list management device 20 may be implemented by the same hardware to receive an image captured by the imaging device 2 and to perform the respective processes described later.

In addition, FIG. 1 illustrates a case of a single imaging device 2. The number of imaging devices 2 included in the self-checkout system 1, however, is not limited to one, and may be two or more.

Figure 2:
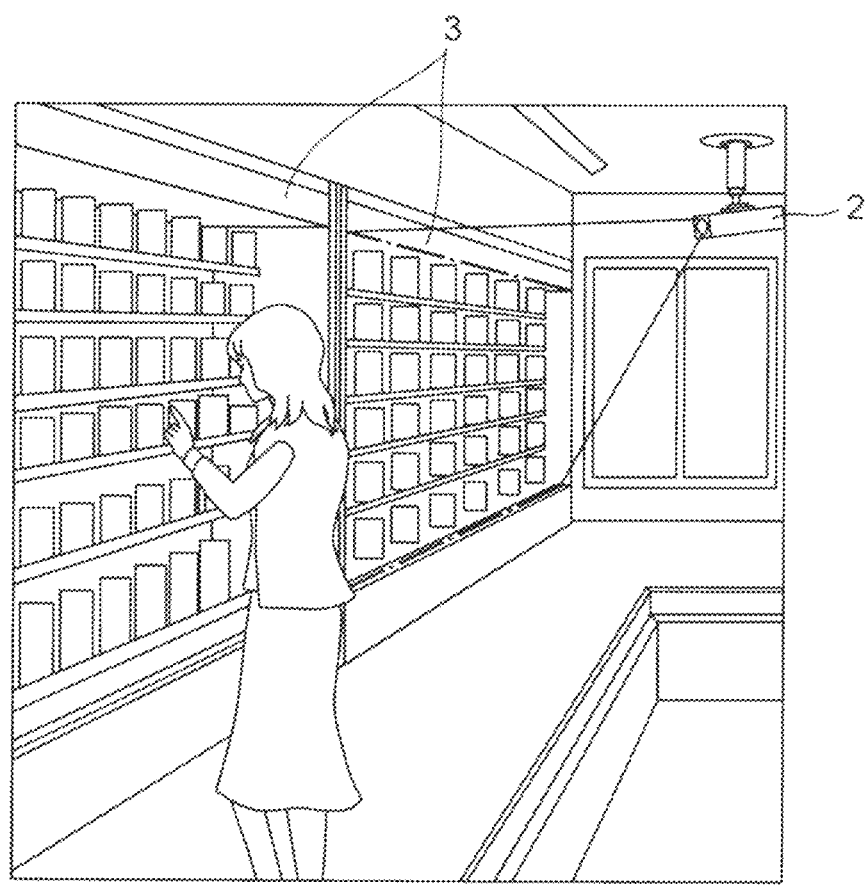
FIG. 2 It depicts an explanatory diagram illustrating an example of a use scene of a self-checkout system 1.

FIG. 2 is an explanatory diagram illustrating an example of a use scene of the self-checkout system 1. Referring to FIG. 2, in the self-checkout system 1, the imaging device 2 captures an image of the product shelf 3 in the store. Then, the imaging device 2 sends a video signal indicating the captured image captured by the imaging device 2 to the image processing device 100.

The imaging device 2 is, for example, a security camera installed in a store or the like. The imaging device 2 is installed, for example, at a predetermined position where the product shelf 3 can be imaged in a store or the like. In addition, a camera ID or the like for identifying the imaging device 2 is assigned in advance to the imaging device 2. The imaging device 2 acquires a captured image. At this time, the imaging device 2 refers to, for example, its own clock or the like and associates the imaging time, which is the time when the captured image was acquired, with the acquired captured image. In this way, the imaging device 2 acquires the captured image representing the state of the product shelf 3 and the like.

The image captured by the imaging device 2 may be a moving image or continuous still images. Further, in this exemplary embodiment, the captured image acquired by the imaging device 2 is a color image (hereinafter, referred to as "RGB [red green blue] image"). The captured image acquired by the imaging device 2 may be, for example, an image in a color space other than the RGB image color space.

As described above, the imaging device 2 sends the video signal indicating the acquired captured image to the image processing device 100. The imaging device 2 may store the captured image in the inside of the imaging device 2 or in a storage device different from the image processing device 100.

The image processing device 100 is an information processing device that detects a change in a display state of a product by analyzing the captured image of the product. Further, in this exemplary embodiment, the image processing device 100 detects that a product has been returned to a different location than the location from which the product was taken.

Figure 3:
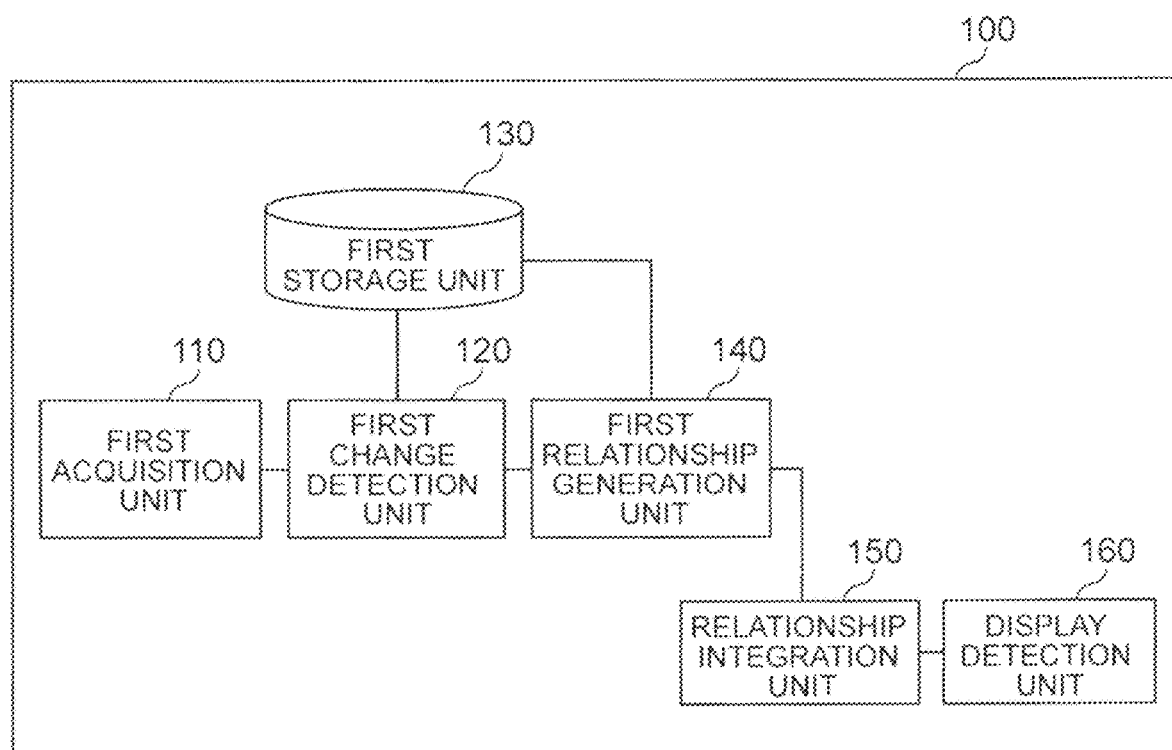
FIG. 3 It depicts a block diagram illustrating a configuration example of an image processing device 100.

FIG. 3 is an explanatory diagram illustrating a configuration example of the image processing device 100. The image processing device 100 of this exemplary embodiment includes a first acquisition unit 110, a first change detection unit 120, a first storage unit 130, a first relationship generation unit 140, a relationship integration unit 150, and a display detection unit 160. Specifically, the image processing device 100 includes, for example, an arithmetic device, and a storage device (not illustrated). Then, the image processing device 100 implements each of the above processing units, for example, by executing programs stored in the storage device on the arithmetic device.

Note that the image processing device 100 illustrated in FIG. 3 represents a configuration unique to the present disclosure. The image processing device 100 may have a member not illustrated in FIG. 3. This is the same as for the second and subsequent exemplary embodiments.

The first acquisition unit 110 acquires the video signal indicating the captured image acquired by the imaging device 2 that images the product shelf 3. The first acquisition unit 110 may receive the video signal sent from the imaging device 2. The first acquisition unit 110 may acquire a video signal converted based on the captured image stored in the inside of the imaging device 2 or in a storage device different from the imaging device 2 and the image processing device 100.

As described above, the image processing device 100 may be built in the imaging device 2. In this configuration, the first acquisition unit 110 may be configured to acquire a captured image itself.

The first acquisition unit 110 converts the acquired video signal to an RGB image that constitutes the video signal. Then, the first acquisition unit 110 supplies the converted RGB image to the first change detection unit 120. Note that the RGB image acquired by the first acquisition unit 110 by converting the video signal represents a captured image of the product shelf 3 captured by the imaging device 2 and is therefore also simply referred to as "captured image."

Figure 4:
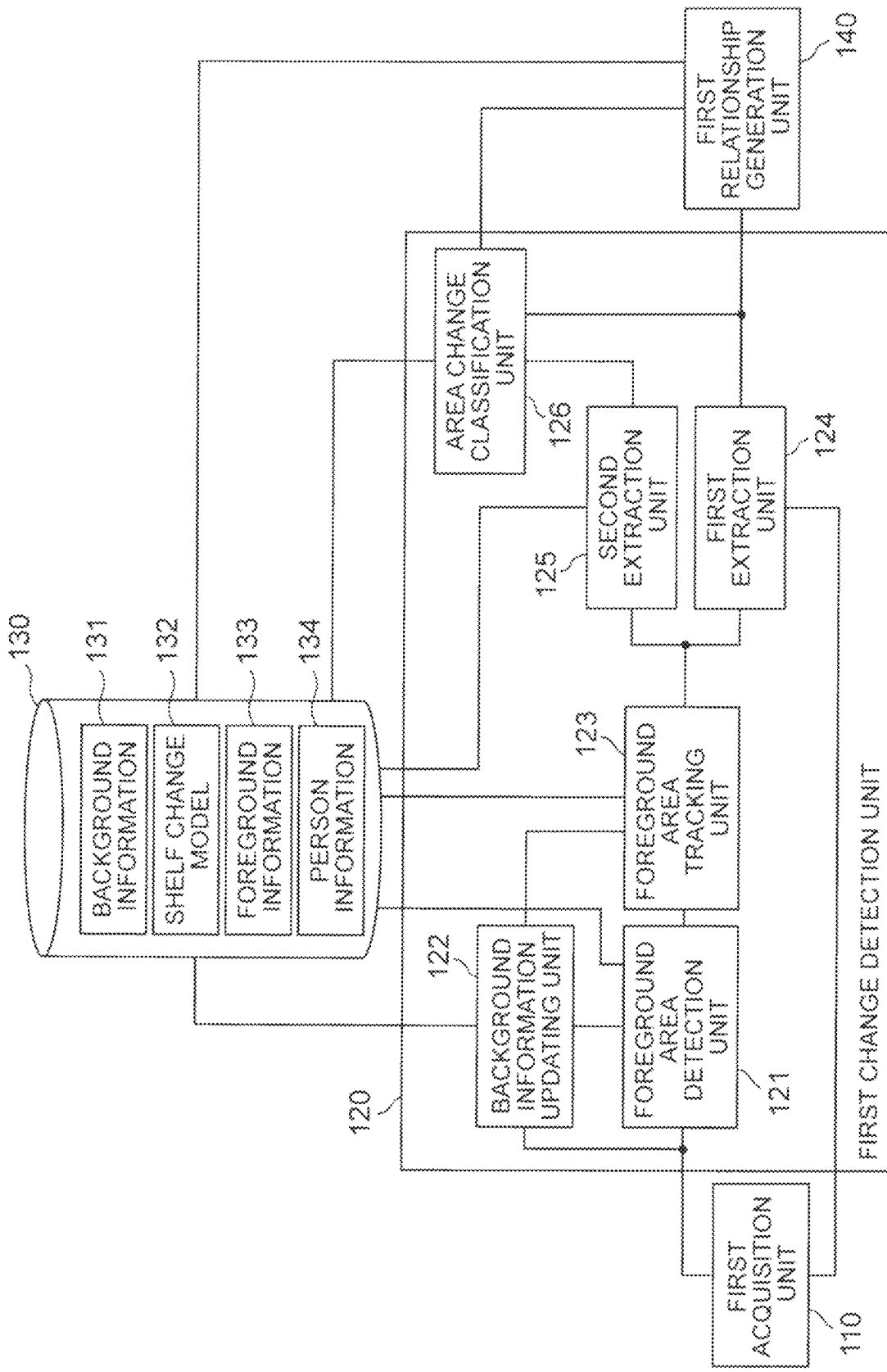
FIG. 4 It depicts a block diagram illustrating a configuration example of a first change detection unit and a first storage unit.

FIG. 4 is a block diagram illustrating a configuration example of the first change detection unit 120 and the first storage unit 130. Referring to FIG. 4, the first change detection unit 120 and the first storage unit 130 will be described below.

The first storage unit 130 is a storage device such as a hard disk or a memory. The first storage unit 130 stores background information 131, a shelf change model 132, foreground information 133, and person information 134. The first storage unit 130 may be implemented by a storage device different from the image processing device 100, or may be built in the first change detection unit 120. Furthermore, the background information 131, the shelf change model 132, the foreground information 133, and the person information 134 may be stored in the same storage device or may be stored in different storage devices.

The background information 131 is a reference image for a comparison with the captured image performed by the first change detection unit 120. The background information 131 is also referred to as "background image." The background information 131 is preferably the same type of image as, for example, the captured image. In this exemplary embodiment, the captured image is an RGB image as described above. Therefore, it is preferable that the background information 131 is also an RGB image. The background information 131 may be the captured image initially supplied to the first change detection unit 120 from the first acquisition unit 110, or may be an image given in advance.

Furthermore, as described later, the background information 131 is updatable information. The details of the process performed when updating the background information 131 will be described later.

The shelf change model 132 is a model of the change in the product shelf 3, which has been learned in advance. The shelf change model 132 is previously stored, for example, in the first storage unit 130. The shelf change model 132 may be obtained by learning with machine learning such as, for example, the convolutional neural network, which is known widely in general.

The shelf change model 132 represents, for example, "a change caused by that a product is no longer contained in the product shelf 3" or "a change caused by that a product is contained anew in the product shelf 3," which have been learned by using an image in which the product is contained in the product shelf 3 and an image in which the product is not contained in the product shelf 3. In addition, the shelf change model 132 represents "a change caused by a different appearance of a product displayed on the product shelf 3," which has been learned by using an image of a plurality of products and a plurality of images in which the shape of each product has changed. Furthermore, the shelf change model 132 represents "a change caused by the presence of a person in front of the product shelf 3," "a change caused by the presence of a shopping cart in front of the product shelf 3," and the like which have been learned by using a captured image captured with no physical object in front of the product shelf 3 and a captured image captured with a physical object such as a person in front of the product shelf 3. Furthermore, the shelf change model 132 may represent, for example, "a change caused by a change in illumination," which has been learned by using images in various environments.

The learning data of the shelf change model 132 may be, for example, a 6-channel image, in which two RGB images before and after the change are combined, or may be a 2-channel image, in which any one of the R, G, and B components of one RGN image before the change is combined with that of the other RGB image after the change. Moreover, the learning data may be, for example, a 4-channel image, in which any two of the R, G, and B components of one RGB image before the change are combined with those of the other RGB image after the change, or may be a 2-channel image, in which two RGB images before and after the change are converted to gray scale images and then combined. Moreover, the learning data may be an image obtained by converting RGB images before and after the change to images in another color space such as HSV (hue saturation value) color space, and combining one or more channels in the color space after the conversion to another color space.

Furthermore, the learning data of the shelf change model 132 may be generated from a color image such as an RGB image, or may be generated by using both of a color image and a range image.

The foreground information 133 is stored by a foreground area detection unit 121. The foreground information 133 includes information indicating a foreground area (area of change) that is an area different from the background image of the RGB image, where the area is detected by the foreground area detection unit 121 as a result of a comparison between the background information 131, which is a background image, and the RGB image, which is a captured image. Specifically, the foreground information 133 is a binary image associated with the imaging time of the captured image, for example. The details of the process of storing the foreground information 133 will be described later.

The person information 134 is stored by the foreground area tracking unit 123. The person information 134 is generated by associating, for example, the ID of the imaging device (camera ID), the person ID, the position on the captured image, the imaging time of the captured image, or the like with a person area extracted by the foreground area tracking unit 123. As will be described later, the person area is, for example, an RGB image. In other words, the person information 134 is allowed to include information indicating, for example, the color, dimensions, shape, and aspect ratio of a circumscribing rectangle of the stored person area. The details of the process of storing the person information 134 will be also described later.

The first change detection unit 120 detects the area of change related to the product shelf 3.

For example, in the case where a product displayed on the product shelf 3 included in the captured image is not included in an image (for example, the background image) acquired previous to the captured image, the first change detection unit 120 detects the area of the product. Furthermore, for example, in the case where a product displayed on the product shelf 3 included in the background image is not included in the captured image, the first change detection unit 120 detects the area of the product. Moreover, for example, in the case where the product displayed on the product shelf 3 included in the captured image is different in appearance from the product included in the background image, the first change detection unit 120 detects the area of the product. In this manner, the first change detection unit 120 detects changes in the display state of products such as a decrease in products (lost), an increase in products (appeared anew), a difference in appearance of a product, and the like, on the basis of the captured image.

Furthermore, for example, in the case where the captured image is captured when a person or an object is present between the product shelf 3 and the imaging device 2, the first change detection unit 120 detects the area of the person or object included in the captured image of the product shelf 3.

As described above, the first change detection unit 120 detects an area of change related to the product shelf 3, such as an area of change in the inside of the product shelf 3, which is an area where the product display state has changed, or an area of change in the captured image of a person or an object present between the product shelf 3 and the imaging device 2.

As illustrated in FIG. 4, the first change detection unit 120 includes the foreground area detection unit 121, a background information updating unit 122, the foreground area tracking unit 123, a first extraction unit 124, a second extraction unit 125, and an area change classification unit 126.

The foreground area detection unit 121 receives the captured image supplied from the first acquisition unit 110. Moreover, the foreground area detection unit 121 acquires background information 131 corresponding to the captured image from the first storage unit 130. As described above, the background information 131 is an RGB image. The foreground area detection unit 121 compares the captured image and the background information 131, which are two RGB images, with each other. Then, the foreground area detection unit 121 detects an area changed between the two RGB images compared with each other, as an area of change. Since the foreground area detection unit 121 compares the background information 131, which is a background image, with the RGB image, which is a captured image, it can also be said that the foreground area detection unit 121 performs a process of detecting the foreground area, which is an area different from the background image.

In this exemplary embodiment, the method in which the foreground area detection unit 121 detects the area of change is not particularly limited. The foreground area detection unit 121 may detect the area of change by using an existing technique. The foreground area detection unit 121 may detect the area of change by using, for example, a background subtraction method. The foreground area detection unit 121 may generate a binary image in which the pixel value of the detected area of change is represented by 255 and other pixel values are each represented by 0.

Figure 5A:
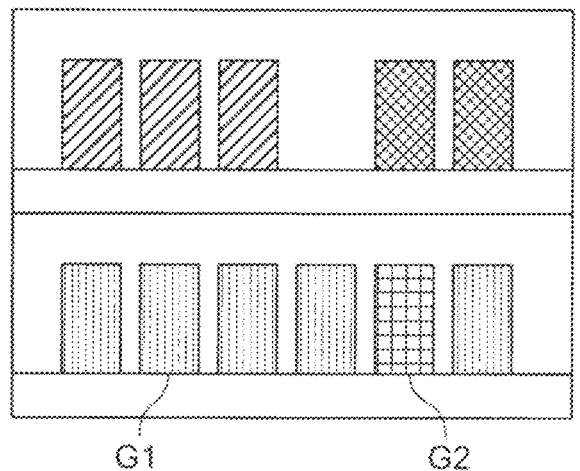
FIG. 5a through 5c It depicts an explanatory diagram illustrating an example of operation of a foreground area detection unit.
Figure 5B:
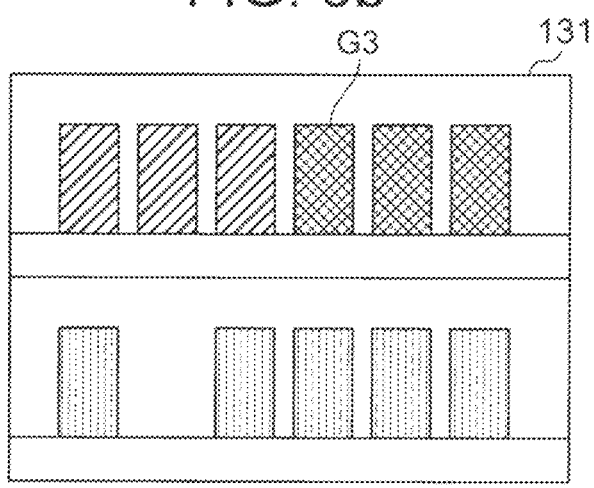
Figure 5C:
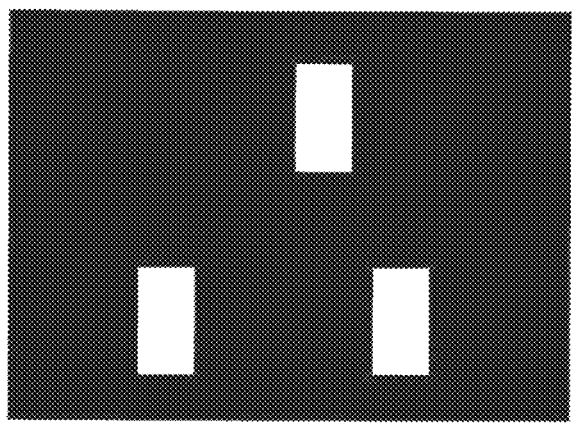

The following describes an example of the operation of the foreground area detection unit 121 more specifically with reference to FIG. 5a through 5c. FIG. 5a through 5c are explanatory diagrams illustrating an example of operation of the foreground area detection unit 121. FIG. 5a illustrates an example of a captured image, and FIG. 5b illustrates an example of the background information 131 corresponding to the captured image stored in the first storage unit 130. Moreover, FIG. 5c illustrates an example of a binary image that is a detection result of the area of change.

Referring to FIGS. 5a and 5b, there are differences between the captured image and the background information 131 in the three areas of products G1, G2, and G3. For example, in the cases illustrated in FIGS. 5a and 5b, the product G1 is not included in the background information 131, but included in the captured image. Moreover, the product G3 is included in the background information 131, but not included in the captured image. Furthermore, another product is displayed on the background information 131 at the position of the product G2 included in the captured image. Therefore, the foreground area detection unit 121 detects the area of the product G2 as an area in which a change has occurred. In this case, the foreground area detection unit 121 generates a binary image in which the parts corresponding to the areas of the products G1, G2, and G3 are represented in white and other parts are represented in black, for example, as illustrated in FIG. 5c.

In the following description, an area of change is a white part as illustrated in FIG. 5c. In other words, the area of change is, for example, a set of pixels with a pixel value of 255 and with any of the pixels adjacent to those pixels having a pixel value of 255. In the example illustrated in FIG. 5c, the foreground area detection unit 121 detects three areas of change.

As described above, the foreground area detection unit 121 generates a binary image having the same size as the captured image, for example. Furthermore, the foreground area detection unit 121 associates a binary image that is a detection result with the imaging time of the captured image used to generate the binary image. The foreground area detection unit 121 may associate the binary image with the information indicating the captured image used to generate the binary image, the information indicating the background information 131, or the like. Then, the foreground area detection unit 121 supplies the detection result associated with the imaging time of the captured image or the like to the background information updating unit 122 and to the foreground area tracking unit 123. Furthermore, the foreground area detection unit 121 stores the detection result associated with the imaging time of the captured image, as the foreground information 133, into the first storage unit 130.

Note that the result of the detection by the foreground area detection unit 121 only needs to include information indicating the detected area of change. The foreground area detection unit 121 may associate, for example, the information indicating the position of the detected area of change (the area where the pixel value is 255) and its size with the information indicating the captured image used to detect the area of change and with the information indicating the background image and may output the association result as a detection result. In this manner, the detection result output by the foreground area detection unit 121 may be in any format.

In addition, the foreground area detection unit 121 may associate the imaging time of the captured image with the binary image, which is the detection result, and may also associate color information contained in the area of change extracted from the captured image with the binary image. The foreground area detection unit 121 may associate the image of the area of change with the detection result, instead of the color information of the area of change. Thus, the foreground area detection unit 121 may associate information other than the imaging time with the detection result.

Furthermore, as illustrated in FIG. 5c, the binary image generated by the foreground area detection unit 121 sometimes includes a plurality of areas of change. In such a case, the foreground area detection unit 121 may generate a binary image for each area of change. The method in which the foreground area detection unit 121 generates the binary image for each area of change will be described later as a modification of the foreground area detection unit 121.

The foreground area tracking unit 123 tracks the area of change detected by the foreground area detection unit 121 among a plurality of captured images. The foreground area tracking unit 123 supplies binary images to the first extraction unit 124 and to the second extraction unit 125 or extracts a person area, according to the tracking result. The foreground area tracking unit 123 also supplies an update signal indicating an update of the background information 131 to the background information updating unit 122.

The foreground area tracking unit 123 receives the detection result (binary image) supplied from, for example, the foreground area detection unit 121. The foreground area tracking unit 123 acquires the foreground information 133, which is a binary image generated from the captured image that has been captured before the imaging time of the captured image related to the binary image, which is associated with the binary image that is the detection result, from the first storage unit 130. Then, the foreground area tracking unit 123 tracks the area of change by performing a process of linking the respective areas of change each represented by a binary image.

The foreground area tracking unit 123 is able to track an area of change by using various methods. The foreground area tracking unit 123 calculates similarity, for example, on the basis of at least one of the dimensions, shape, and aspect ratio of a circumscribing rectangle of the area of change, which is represented by the binary image supplied from the foreground area detection unit 121 and the foreground information 133 acquired from the first storage unit 130. Further, the foreground area tracking unit 123 tracks the area of change by linking the areas of change each having the highest calculated similarity with each other. Furthermore, in the case of a configuration in which color information is associated with the detection result, the foreground area tracking unit 123 may perform the tracking by using the color information. The foreground area tracking unit 123 may perform the tracking on the basis of the image of the area of change associated with the detection result.

The foreground area tracking unit 123 confirms whether the tracking result is a predetermined time or longer, or whether the moving distance of the area of change is a predetermined threshold or more. Note that the predetermined time and the predetermined threshold used for the confirmation by the foreground area tracking unit 123 are arbitrary.

In the case where the moving distance of the area of change is less than the predetermined threshold and the tracking result is the predetermined time or longer, the foreground area tracking unit 123 supplies the binary image, which is the detection result supplied from the foreground area detection unit 121, to the first extraction unit 124 and to the second extraction unit 125. At this time, the foreground area tracking unit 123 adds, for example, information indicating the captured image used to generate the binary image and information indicating the background information 131 to the binary image and supplies the binary image to the first extraction unit 124 and to the second extraction unit 125. The foreground area tracking unit 123 may supply, for example, the corresponding captured image and background information 131 along with the binary image to the first extraction unit 124 and to the second extraction unit 125. Moreover, in the case where the binary image includes a plurality of areas of change and one of the areas of change has not been tracked for a predetermined time or longer, the foreground area tracking unit 123 may supply the binary image to the first extraction unit 124 and to the second extraction unit 125 together with the information indicating the area of change tracked for the predetermined time or longer.

In the case where the binary image includes a plurality of areas of change, the foreground area tracking unit 123 may generate a plurality of binary images such that one binary image includes one area of change. For example, a binary image including only the area of change that has been tracked for the predetermined time or longer may be supplied to the first extraction unit 124 and to the second extraction unit 125, and a binary image including the area of change that has not been tracked for the predetermined time or longer track may be discarded. Note that the foreground area tracking unit 123 may receive the binary image for each area of change as the detection result from the foreground area detection unit 121.

In the case where the moving distance of the area of change is equal to or more than the predetermined threshold, the foreground area tracking unit 123 determines that the object included in the area of change is a moving body. If the object included in the area of change is determined to be a moving body in this manner, the foreground area tracking unit 123 inhibits supplying the area of change to the first extraction unit 124 and to the second extraction unit 125. As a result, the image processing device 100 is able to delete changes related to the product shelf 3 that are irrelevant to the increase or decrease of products, such as "a change caused by the presence of a person in front of the product shelf 3." This enables the product display state to be monitored more accurately.

Note that the foreground area tracking unit 123 may supply the determination result, in which the object included in the area of change is determined to be a moving body, to the first extraction unit 124 and to the second extraction unit 125 in association with the area of change. Furthermore, in the case where the determination result is associated with the area of change, the area change classification unit 126 may classify the change related to the product shelf 3 in this area of change as a type of change related to an object other than a product displayed on the product shelf 3. For example, the area change classification unit 126 may classify the change related to the product shelf 3 in the area of change as the type of change related to an object other than a product, such as "a change caused by the presence of a person in front of the product shelf 3," "a change caused by the presence of a shopping cart in front of the product shelf 3," or the like.

The foreground area tracking unit 123 extracts the area of change determined to be a moving body from the captured image, as a person area. Specifically, the foreground area tracking unit 123 uses the captured image and the binary image that has the same size as the captured image to extract an image in an area on the captured image corresponding to the area where the pixel value is 255 in the binary image, as a first attention image. As described above, the captured image is an RGB image. Therefore, the extracted person area is also an area of an RGB image.

For each area of change determined to be a moving body, the foreground area tracking unit 123 may extract a person area of the same shape as the area of change or may extract an area enclosed by a frame of the same shape as the predetermined shape circumscribing the area of change as a person area. The shape of the frame circumscribing the area of change may be, for example, a rectangle, an ellipse, or any other shape. Moreover, the foreground area tracking unit 123 may extract an area enclosed by a frame that is larger than the frame circumscribing the area of change by a predetermined size as a person area.

Subsequently, the foreground area tracking unit 123 associates an ID of the imaging device 2 (camera ID), a person ID assigned to, for example, each extracted person area, a position on a captured image, the imaging time of the captured image, and the like with the extracted person area. Then, the foreground area tracking unit 123 stores the associated information into the first storage unit, as person information 134. The position on the captured image may be represented by the coordinate values of the four corners of the circumscribing rectangle of the area of change determined to be a moving body, for example, or may be represented by the coordinate value of at least one of the four corners and the width and height of the circumscribing rectangle.

Furthermore, the foreground area tracking unit 123 supplies an update signal indicating an update of the background information 131 to the background information updating unit 122.

For example, in the case of supplying the detection result indicating the area of change to the first extraction unit 124 and to the second extraction unit 125 after tracking the area of change, the foreground area tracking unit 123 supplies an update signal with a value of 1 along with information indicating the area of change to the background information updating unit 122. The update signal with the value of 1 indicates that the image of the part corresponding to the area of change in the background information 131 is to be updated. Moreover, in the case of not supplying the detection result to the first extraction unit 124 and to the second extraction unit 125, the foreground area tracking unit 123 may supply an update signal with a value of 0 along with the information indicating the area of change to the background information updating unit 122. The update signal with the value of 0 indicates that the image of the part corresponding to the area of change in the background information 131 is not to be updated. The case where the detection result is not output to the first extraction unit 124 and to the second extraction unit 125 means, for example, a case where the tracking result is less than a predetermined time, or a case where the moving distance of the area of change is equal to or more than a predetermined threshold.

The foreground area tracking unit 123 may supply the update signal indicating an update of the background information 131 to the background information updating unit 122 at a timing other than the above example. In the case where it is determined that a product included in the area of change is likely to have been purchased or added, for example, on the basis of product purchase information or purchase-of-stock information, store worker work information, and the like sent from an external device (not illustrated) of the image processing device 100, the foreground area tracking unit 123 may output an update signal with a value of 1 to update the background of the product shelf 3. The foreground area tracking unit 123 may supply the update signal indicating the update of the background information 131 to the background information updating unit 122 on the basis of the tracking time or the like included in the tracking result.

On the basis of the captured image supplied from the first acquisition unit 110, the detection result supplied from the foreground area detection unit 121, the RGB image that is the background information 131 stored in the first storage unit 130, and the update signal supplied from the foreground area tracking unit 123, the background information updating unit 122 updates the background information 131. The method in which the background information updating unit 122 updates the background information 131 is not particularly limited. The background information updating unit 122 may update the background information 131 by using the same method as the method described in NPL 1, for example.

Note that the background information updating unit 122 does not need to update, for example, the image of the part that corresponds to the area of change indicated by the detection result supplied from the foreground area detection unit 121, in the RGB image indicated by the background information 131. For example, in the case of receiving the above-described update signal with a value of 0 from the foreground area tracking unit 123, the background information updating unit 122 does not update the background information of the area corresponding to the area of change.

As described above, in the case of not outputting the detection result to the first extraction unit 124 and to the second extraction unit 125, the foreground area tracking unit 123 supplies the update signal with the value of 0 to the background information updating unit 122. If the tracking result satisfies a first predetermined condition in this manner, the background information updating unit 122 receives the update signal with the value of 0 and does not update the background information of the area corresponding to the area of change. In other words, if the tracking result satisfies the first predetermined condition, the background information updating unit 122 updates the background information 131 except the area corresponding to the area of change. As a result, the area corresponding to the area that has not been updated in the captured image acquired next by the first acquisition unit 110 is easily detected as an area of change by the foreground area detection unit 121.

Moreover, for example, in the case where the update signal supplied from the foreground area tracking unit 123 has a value of 1, the background information updating unit 122 updates the image of the part corresponding to the area of change indicated by the detection result supplied from the foreground area detection unit 121 in the RGB image indicated by the background information 131. As described above, if the tracking result is predetermined time or longer, the foreground area tracking unit 123 supplies the detection result representing the tracked area of change to the first extraction unit 124 and to the second extraction unit 125, and also supplies an update signal with a value of 1 to the background information updating unit 122. In other words, if the second predetermined condition that the tracking result is a result of tracking for a predetermined time or longer is satisfied, the background information updating unit 122 receives the update signal with the value of 1 from the foreground area tracking unit 123, and updates the image of the part corresponding to that area of change in the background information 131. Thereby, the background information updating unit 122 is able to bring the background information 131 stored in the first storage unit 130 closer to the captured image acquired by the first acquisition unit 110 at that time. Therefore, the image processing device 100 is able to prevent the foreground area detection unit 121 from detecting the area in the captured image, which is acquired next by the first acquisition unit 110 in response to the above area of change, as an area of change.

The first extraction unit 124 receives a binary image, which is a detection result, from the foreground area tracking unit 123. In addition, the first extraction unit 124 acquires the captured image used to generate the binary image from the first acquisition unit 110. Note that the first extraction unit 124 may receive the captured image together with the binary image from the foreground area tracking unit 123.

The first extraction unit 124 extracts the image of the area of change from the captured image. Specifically, the first extraction unit 124 uses the captured image and the binary image, which has the same size as the captured image, to extract the image of the area in the captured image corresponding to the area where the pixel value in the binary image is 255, as a first attention image. For example, if the binary image is as illustrated in FIG. 5c, the first extraction unit 124 extracts three first attention images from the captured image. Since the captured image is an RGB image as described above, the extracted first attention images are RGB images, too.

Note that the first extraction unit 124 may extract the first attention image of the area that has the same shape as the area of change for each area of change, or may extract an image of an area enclosed by a frame of the same shape as the frame of a predetermined shape circumscribing the area of change, as the first attention image. The shape of the frame circumscribing the area of change may be, for example, a rectangle, an ellipse, or any other shape. Moreover, the first extraction unit 124 may extract an image of an area enclosed by a frame that is larger than the frame circumscribing the area of change by a predetermined size, as the first attention area.

The first extraction unit 124 supplies the extracted first attention image to the area change classification unit 126. The area in the captured image of the first attention image extracted by the first extraction unit 124 is also referred to as "first attention area." Moreover, the first extraction unit 124 acquires the position information of the first attention area, associates the position information with the imaging time, and supplies them to the first relationship generation unit 140. The position information of the first attention area may be, for example, the coordinate values of the four corners of the circumscribing rectangle of the first attention area or may be represented by the coordinate value of at least one of the four corners and the width and height of the circumscribing rectangle. If the circumscribing rectangle is circular, the position information of the first attention area may be, for example, the center coordinates of the circle and the radius of the circle. If the circumscribing rectangle is elliptic, the position information in the first attention area may be, for example, the center coordinates of the ellipse and the major and minor axes of the ellipse.

The second extraction unit 125 receives the binary image, which is the detection result, from the foreground area tracking unit 123. Moreover, the second extraction unit 125 acquires the background information 131 used to generate the binary image from the first storage unit 130. The second extraction unit 125 may receive the background information 131 together with the binary image from the foreground area tracking unit 123.

The second extraction unit 125 extracts the image of the area of change from the background information 131. Specifically, the second extraction unit 125 extracts the image of an area on the background information 131 corresponding to the area where the pixel value is 255 in the binary image, as the second attention image, by using the background information 131, which is background information, and the binary image. A method of extracting the second attention image is the same as the method of extracting the first attention image. The second extraction unit 125 supplies the extracted second attention image to the area change classification unit 126. The area on the background information 131 of the second attention image extracted by the second extraction unit 125 is also referred to as "second attention area."

The area change classification unit 126 classifies a change related to the product shelf 3 in the area of change and supplies the classification result to the first relationship generation unit 140. On the basis of the first attention area and the second attention area, which have been supplied from the first extraction unit 124 and the second extraction unit 125, and the shelf change model 132 stored in the first storage unit 130, the area change classification unit 126 classifies the change from the state of the image of the area corresponding to the detected area of change on the background image to the state of the image of the area corresponding to the area of change on the captured image.

The state of the image means, for example, a state where the image includes a product or does not include any product, a state where the image includes a customer or does not include any customer, a state where the image includes a shopping basket or does not include any shopping basket, a state where the image includes a shopping cart or does not include any shopping cart, or the like. On the basis of the shelf change model 132, the area change classification unit 126 classifies changes related to the product shelf 3 in the area of change into the types of changes such as, for example, "a change caused by that a product is no longer contained in the product shelf 3," "a change caused by that a product is contained anew in the product shelf 3," "a change caused by a different appearance of a product displayed on the product shelf 3," "a change caused by the presence of a person in front of the product shelf 3," "a change caused by the presence of a shopping cart in front of the product shelf 3," "a change caused by a change in illumination," and the like. The types into which the area change classification unit 126 classifies the changes in the state of the area of change are illustrative, and not limited thereto. Moreover, for example, "a change caused by a different appearance of a product displayed on the product shelf 3" may be classified in more detail into "a change in appearance caused by a different product," "a change in appearance caused by a change in product attitude," and the like.

More specifically, the area change classification unit 126 receives the first attention image from the first extraction unit 124. Moreover, the area change classification unit 126 receives the second attention image from the second extraction unit 125. Then, on the basis of the shelf change model 132 stored in the first storage unit 130, the area change classification unit 126 classifies a change from the state of the second attention image to the state of the first attention image corresponding to that second attention image, for example, as any one of the above-described types. In other words, the area change classification unit 126 classifies the change from the state of the second attention image to the state of the first attention image on the basis of the result of comparison with the shelf change model 132.

FIG. 6 is an explanatory diagram illustrating an example of a classification result output from the area change classification unit 126. The area change classification unit 126 outputs the classification result 90, for example, illustrated in FIG. 6.

As illustrated in FIG. 6, the classification result 90 includes, for example, a second attention image 91, a first attention image 92, and a type of change 93. The classification result 90 illustrated in FIG. 6 is an example, and the classification result 90 may include information other than the information illustrated in FIG. 6. The classification result 90 may include, for example, information about the captured image (identifier, imaging time, and the like), information indicating the position of the first attention image 92 in the captured image, and the like.

The area change classification unit 126 may classify a change related to the product shelf 3 as any one of the above types, for example, by using a machine learning method (convolutional neural network or the like) in which the shelf change model 132 is created.

The above is an example of the configuration of the first change detection unit 120.

The first relationship generation unit 140 receives the classification result of the area of change and the position information of the area of change from the first change detection unit 120. Moreover, the first relationship generation unit 140 acquires the person information 134 from the first storage unit 130. Then, on the basis of the imaging time of the area of change corresponding to the position information of the area of change and the imaging time of the person tied to the person information 134, the first relationship generation unit 140 generates product-and-person relationship information, which indicates the relationship between the product corresponding to the area of change (the change in the display state of the product) and the person. Thereafter, the first relationship generation unit 140 supplies the generated product-and-person relationship information to the relationship integration unit 150.

Specifically, out of the persons imaged before the imaging time for which the area of change was detected, the first relationship generation unit 140 extracts a person who intersects with the area of change. Then, the first relationship generation unit 140 associates the person imaged at the time closest to the imaging time of the area of change among the extracted persons with the area of change.

FIG. 7 is an explanatory diagram illustrating an example of product-and-person relationship information generated by the first relationship generation unit 140. FIG. 7 illustrates a camera ID that indicates an ID of the imaging device, a person ID that indicates a person imaged by the imaging device, position information of the area of change on the product shelf, and a classification result of the change. In FIG. 7, the position information of the area of change is represented by the coordinate values of one corner of the circumscribing rectangle of the area of change and the width and height of the circumscribing rectangle. In addition, regarding the type of change, "a change caused by that a product is no longer contained in the product shelf 3" is represented as "a product decrease," and "a change caused by that a product is contained anew in the product shelf 3" as "a product increase."

The first relationship generation unit 140 may associate, for example, the generated person-and-product relationship information with the person information 134 stored in the first storage unit 130 to supply them to the relationship integration unit 150. Moreover, the first relationship generation unit 140 may add information about the captured image (identifier, imaging time, or the like) to the relationship information.

The relationship integration unit 150 receives the product-and-person relationship information from the first relationship generation unit 140. Then, in the case where the received relationship information contains relationship information of the same person, the relationship integration unit 150 integrates them. Thereafter, the relationship integration unit 150 supplies the integrated relationship information to the display detection unit 160.

The relationship integration unit 150 calculates the similarity, for example, on the basis of at least one of the color, dimensions, shape and aspect ratio of the circumscribing rectangle of the person area stored in the person information 134 of the first storage unit 130. Then, the relationship integration unit 150 determines that the person areas with the highest calculated similarity are of the same person. As described above, the relationship integration unit 150 integrates relationship information determined to be of the same person.

Figures 8, 9:
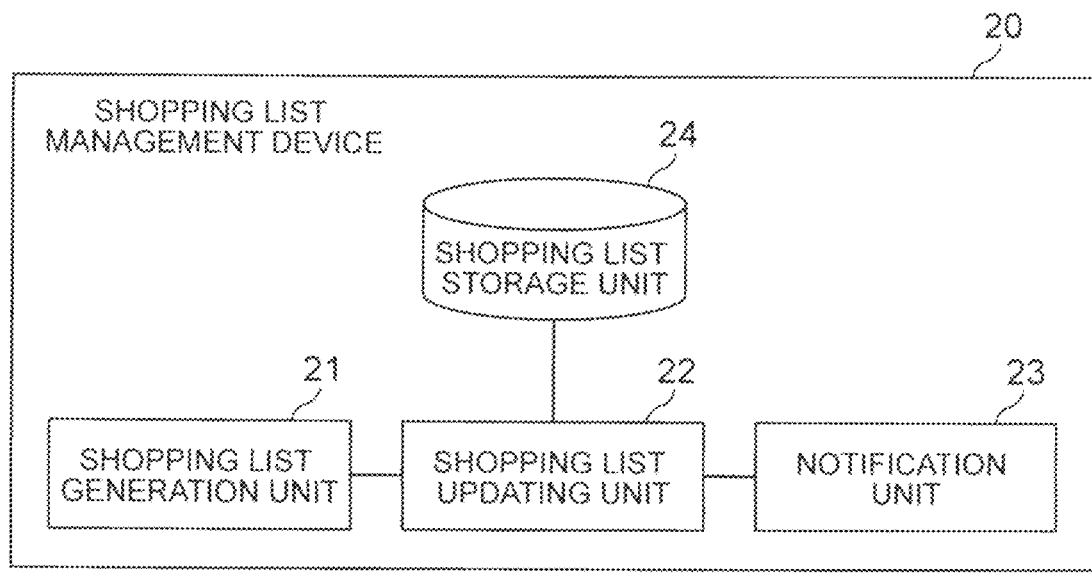
FIG. 8 It depicts an explanatory diagram illustrating an example of integrated product-and-person relationship information.
FIG. 9 It depicts a block diagram illustrating a configuration example of a shopping list management device.

FIG. 8 is an explanatory diagram illustrating an example of integrating the product-and-person relationship information illustrated in FIG. 7. In the example illustrated in FIG. 8, the relationship information of person ID=1 and that of person ID=4 illustrated in FIG. 7 are integrated into one. In addition, the relationship information of person ID=2 and that of person ID=3 illustrated in FIG. 7 are also integrated. In other words, FIG. 8 illustrates an example of a case where a person having the person ID=1 and a person having the person ID=4 illustrated in FIG. 7 are the same person, and a person having the person ID=2 and a person having the person ID=3 illustrated in FIG. 7 are the same person.

In the example illustrated in FIG. 8, as an example of the integration, two person IDs are compared with each other before integrating the relationship information and the person ID with the smaller value is used as the person ID of the relationship information having been integrated, but the person ID with the larger value may be used. In addition, for example, the person ID may be re-assigned after integrating the relationship information. Moreover, the person ID used when the person identification device 50 described later identifies a person may be used or identification information that identifies the terminal 10 carried by a person may be used.

The display detection unit 160 receives the integrated relationship information from the relationship integration unit 150 and then detects that a product has been returned to a different location than the location from which the product was taken on the basis of the relationship information integrated by the relationship integration unit 150. The display detection unit 160 detects that a product has been returned to a different location than the location from which the product was taken, for example, by comparing the location where the product was acquired with the location where the product was returned.

Hereinafter, the operation of the display detection unit 160 will be specifically described with reference to FIG. 8. The display detection unit 160 compares position information with the type of change for each person ID. In the example illustrated in FIG. 7, a person with a person ID of 1 acquires a product from the location (10, 0) of the product shelf imaged by an imaging device with a camera ID of 1, and then returns the product to the location (250, 300). In addition, the acquired product and the returned product both have the width and height of the circumscribing rectangle of (30, 50) and are determined to be the same product. Thus, the display detection unit 160 detects that the person with the person ID of 1 returned the product to the same shelf as the shelf from which the product was acquired, but to a different location. A person with a person ID of 2 returned the same product to the same location as the location where the product was acquired. Therefore, the display detection unit 160 does not detect this action as an action by which a product has been returned to a different location than the location from which the product was taken.

Thus, the display detection unit 160 detects that a product has been returned to a different location than the location from which the product was taken, for example, by detecting that the same person returned the product to a different location. Note that the display detection unit 160 detects that a product has been returned to a different location than the location from which the product was taken, for example, even in the case where the product has been returned to the same location but the appearance of the product has changed. In this way, the display detection unit 160 can be referred to as "rearrangement detection means" because it detects that the product has been returned to a different location than the location from which the product was taken and the product has been rearranged.

The above is an example of the configurations of the image processing device 100.

The terminal 10 is a device carried by a customer and is implemented by, for example, a mobile terminal, a tablet terminal, or the like. The terminal 10 stores information for identifying a customer and is used when the person identification device 50 described later associates the terminal 10 with the customer (person). The terminal 10 may, for example, display the information for identifying the customer as a label (bar code or the like) or may send the information by near field communication.

In addition, the terminal 10 notifies the customer of various information in a manner that can be perceived by a person (display, vibration, light, voice, or the like) in response to a notification from a notification unit 23 described later. The specific contents of the notification by the notification unit 23 will be described later.

The person identification device 50 is a device that identifies a person. In this exemplary embodiment, the person identification device 50 does not need to identify the characteristics of a person oneself (for example, gender, age, height, and the like), as long as the person identification device 50 is able to identify the person so as to be distinguished from other persons. For example, in the example illustrated in FIG. 8, the person identification device 50 only needs to able to identify the person with the person ID of 1, the person with the person ID of 2, and the person with the person ID of 5 as different persons. The person identification device 50 is installed, for example, at the entrance to the store to identify persons.

In this exemplary embodiment, the person identification device 50 identifies a person on the basis of the captured image. The method in which the person identification device 50 identifies a person is arbitrary. The person identification device 50 may acquire information used by the relationship integration unit 150 described above to calculate the similarity of the person (color, dimensions, shape, and aspect ratio of the circumscribing rectangle of the person area) from the image of a person who has entered the store. In addition, the person identification device 50 may identify the person by using the acquired information.

Further, the person identification device 50 may associate the identified person with the device (terminal 10) carried by the person. Specifically, the person identification device 50 may capture an image of the person when a sensor (not illustrated) installed at the entrance to the store detects the terminal 10 and may associate the person identified in the captured image with the identification information of the terminal 10. In this case, the person identification device 50 is implemented by a device including an imaging device and a sensor. The imaging device and the sensor may be implemented by pieces of hardware different from each other. Moreover, the device carried by a person is not limited to hardware such as a mobile phone, but may be a medium such as, for example, an IC card.

Specifically, the customer may start an application program installed in the terminal 10 to display the customer identification information. When the customer then causes the person identification device 50 to identify the identification information, the person identification device 50 may associate the person with the terminal 10.

FIG. 9 is a block diagram illustrating a configuration example of the shopping list management device 20. The shopping list management device 20 manages a shopping list for each person. The shopping list management device 20 includes a shopping list generation unit 21, a shopping list updating unit 22, a notification unit 23, and a shopping list storage unit 24.

The shopping list storage unit 24 stores the shopping list for each person. The shopping list storage unit 24 may store the shopping list with being linked with the person ID described above, for example. Further, the shopping list storage unit 24 may store the shopping list with being linked with an identifier given by the person identification device 50 described above when identifying the person. Moreover, if the person is linked with the terminal 10, the shopping list storage unit 24 may store the person and the terminal 10 with being linked with the shopping list.

The shopping list generation unit 21 generates a shopping list and registers it in the shopping list storage unit 24. For example, when the person identification device 50 identifies a person, the shopping list generation unit 21 may generate a shopping list that corresponds to the person. Moreover, for example, when the person identification device 50 associates the person with the terminal 10, the shopping list generation unit 21 may generate a shopping list that corresponds to the person. In this case, the shopping list is linked with the terminal 10 carried by the person, and therefore the notification unit 23, which will be described later, is able to notify the terminal 10 of changes that occur in the shopping list.

Moreover, in the case where the self-checkout system 1 does not include the person identification device 50 (that is, in the case where the terminal 10 is not associated with the shopping list), the shopping list generation unit 21 may generate a shopping list when the first relationship generation unit 140 has generated person-and-product relationship information. In this case, the shopping list generation unit 21 may also integrate the shopping lists when the relationship integration unit 150 has integrated the relationship information. In this manner, the shopping list is managed in association with each person.

The shopping list updating unit 22 updates the contents of the shopping list stored in the shopping list storage unit 24 on the basis of changes in the display states of the products. The shopping list updating unit 22 may send a shopping list to the terminal 10 for each updating of the contents of the shopping list. In this exemplary embodiment, when the product display state changes, the position information of the area of change of the product shelf and the classification of the change are specified. Therefore, the shopping list updating unit 22 specifies the product whose change in the display state is detected, on the basis of the shelving information on the product shelf on which the product has been arranged.

The shelving information indicates the arrangement position of a product prepared in advance for a product shelf of each store. The shelving information is, for example, information in which a product shelf number (row) and a column number are linked with the name of a product arranged at the position of the numbers. Further, the position where the imaging device 2 captures an image is previously linked with the position of the product shelf for management.

Therefore, the product is able to be specified by linking the product shelf area of the image captured by the imaging device 2 with the shelving information.

Figure 10:
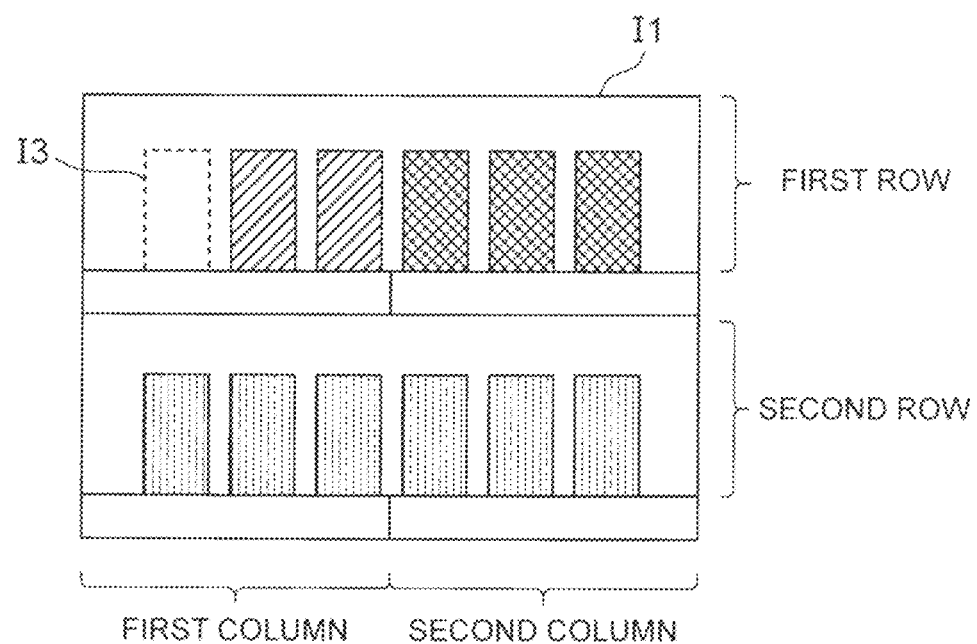
FIG. 10 It depicts an explanatory diagram illustrating an example of shelving information.

FIG. 10 is an explanatory diagram illustrating an example of the shelving information. In the example illustrated in FIG. 10, it is assumed that an image I1 is captured by a camera with the camera ID of 1, which is an imaging device. Shelving information I2 illustrated in FIG. 10 represents products arranged in the range specified by a row and a column of the product shelf. For example, it is assumed that the position information of a product I3 included in the image I1 matches position information in the first row of the relationship information illustrated in FIG. 8 (specifically, position information (10, 0, 30, 50)). In this case, the shopping list updating unit 22 specifies the product I3 as a product a linked with the first column of the first row of the shelving information I2.

The relationship information includes a classification result of the area of change. Specifically, a change in a display state can be specified from the relationship information. Therefore, the shopping list updating unit 22 specifies a product for which there has been detected a change in a display state that is a result of a person having picked up the product on the basis of the shelving information on the product shelf on which the product has been arranged. Additionally, the shopping list updating unit 22 performs a registration process for registering the specified product on the shopping list that corresponds to the person. In the above example, the change in the display state caused by the person picking up the product corresponds to "a change caused by that a product is no longer contained in the product shelf 3" and the type of change corresponds to "a product decrease."

The shopping list updating unit 22 performs a process of registering a product on a shopping list corresponding to a person as a registration process for registering the product on the shopping list. Moreover, the shopping list updating unit 22 may cause the notification unit 23 described later to notify the terminal 10 of information that the product has been registered as a registration process. At that time, the notification unit 23 may inquire the customer via the terminal 10 on whether a correct product has been added to the shopping list.

Furthermore, the shopping list updating unit 22 performs a deletion process to delete a returned product from the shopping list that corresponds to the person on the basis of a result of deletion by the display detection unit 160 and the shelving information. In this exemplary embodiment, in the case where the display detection unit 160 detects that a product has been returned to a different location than the location from which the product was taken, the shopping list updating unit 22 performs a deletion process for deleting the product (the product returned to a different location than the location from which the product was taken) from the shopping list that corresponds to the person, on the basis of the detection result and shelving information.

The shopping list updating unit 22 performs a process of deleting the product from the shopping list corresponding to the person as a deletion process for deleting the product from the shopping list. Further, the shopping list updating unit 22 may cause the notification unit 23 described later to notify the terminal 10 of information that the product has been deleted as a deletion process. At that time, the notification unit 23 may inquire the customer via the terminal 10 on whether a correct product has been deleted from the shopping list.

Furthermore, instead of immediately deleting the product from the shopping list, the shopping list updating unit 22 may set a delete flag for identifying the product that has been returned to a different location than the location from which the product was taken to a target product included in the shopping list, as a deletion process. Then, the shopping list updating unit 22 may cause the notification unit 23, which will be described later, to notify the terminal 10 of information that the delete flag has been set. At that time, similarly, the notification unit 23 may inquire of the customer via the terminal 10 on whether or not the product with the delete flag set is a product to be deleted. Then, the shopping list updating unit 22 may receive an instruction indicating whether or not to delete the product with the delete flag set, via the terminal 10 carried by the notified person, and may delete the product from the shopping list in the case of receiving an instruction of deleting the product.

The notification unit 23 notifies the terminal 10 of the information on the shopping list. As described above, the notification unit 23 may notify the terminal 10 of the product registration and deletion and the setting of a delete flag, according to the process of the shopping list updating unit 22.

Furthermore, the notification unit 23 may notify the payment device 40, which will be described later, that a payment process will be stopped in the case where there is a product with a delete flag set in the shopping list. This notification prevents an unapproved product from being paid for.

The output device 30 outputs the contents of the shopping list. The output device 30 is installed, for example, near the payment device 40, which will be described later, and may output the contents of the shopping list at the time of the payment process. If the contents of the shopping list are able to be output to the terminal 10, the self-checkout system 1 does not need to include output device 30. The output device 30 may be, for example, a display device such as a display or may be a POS (point of sales) terminal. In addition, the output device 30 is not limited thereto, but may be, for example, a speaker or a mobile terminal.

The payment device 40 performs a payment process on the basis of the contents of the shopping list. For example, in the case where the shopping list is associated with the terminal 10, the payment device 40 may notify the terminal 10 associated with the shopping list of the total amount to perform the payment process. The method in which the payment device 40 makes a payment via the personal terminal 10 is widely known, and therefore a detailed description is omitted here.

On the other hand, in the case where the shopping list is not associated with the terminal 10, the payment device 40 may cause the output device 30 to display the contents of the shopping list and the total amount to accept the payment process such as a deposit from a customer, a card payment, or the like. Since payment methods based on deposits and card payments are also widely known, a detailed description is omitted here.

In the case of receiving a notification that the payment process is stopped (specifically, a notification that a product with a delete flag set remains) from the notification unit 23 described above, the payment device 40 may stop the payment process based on the shopping list and display various alerts. The payment device 40 may notify, for example, the terminal 10 of a fact that the delete flag remains. Furthermore, the payment device 40 may prompt the customer for confirmation by displaying the product with the delete flag set on the output device 30 or audibly guiding the product with the output device 30.

The image processing device 100 (more specifically, the first acquisition unit 110, the first change detection unit 120, the first storage unit 130, the first relationship generation unit 140, the relationship integration unit 150, and the display detection unit 160) is implemented by a CPU of a computer that operates according to a program. For example, the program is stored in a storage unit (not illustrated) included in the image processing device 100, and the CPU may read the program to operate as the first acquisition unit 110, the first change detection unit 120, the first storage unit 130, the first relationship generation unit 140, the relationship integration unit 150, and the display detection unit 160 according to the program.

Moreover, the first acquisition unit 110, the first change detection unit 120, the first storage unit 130, the first relationship generation unit 140, the relationship integration unit 150, and the display detection unit 160 included in the image processing device 100 may be each implemented by dedicated hardware.

The shopping list management device 20 (more specifically, the shopping list generation unit 21, the shopping list updating unit 22, and the notification unit 23) is also implemented by the CPU of the computer that operates according to the program. For example, the program is stored in a storage unit (not illustrated) included in the shopping list management device 20, and the CPU may read the program to operate as the shopping list generation unit 21, the shopping list updating unit 22, and the notification unit 23 according to the program. The shopping list generation unit 21, the shopping list updating unit 22, and the notification unit 23 included in the shopping list management device 20 may be each implemented by dedicated hardware.

Figure 11:
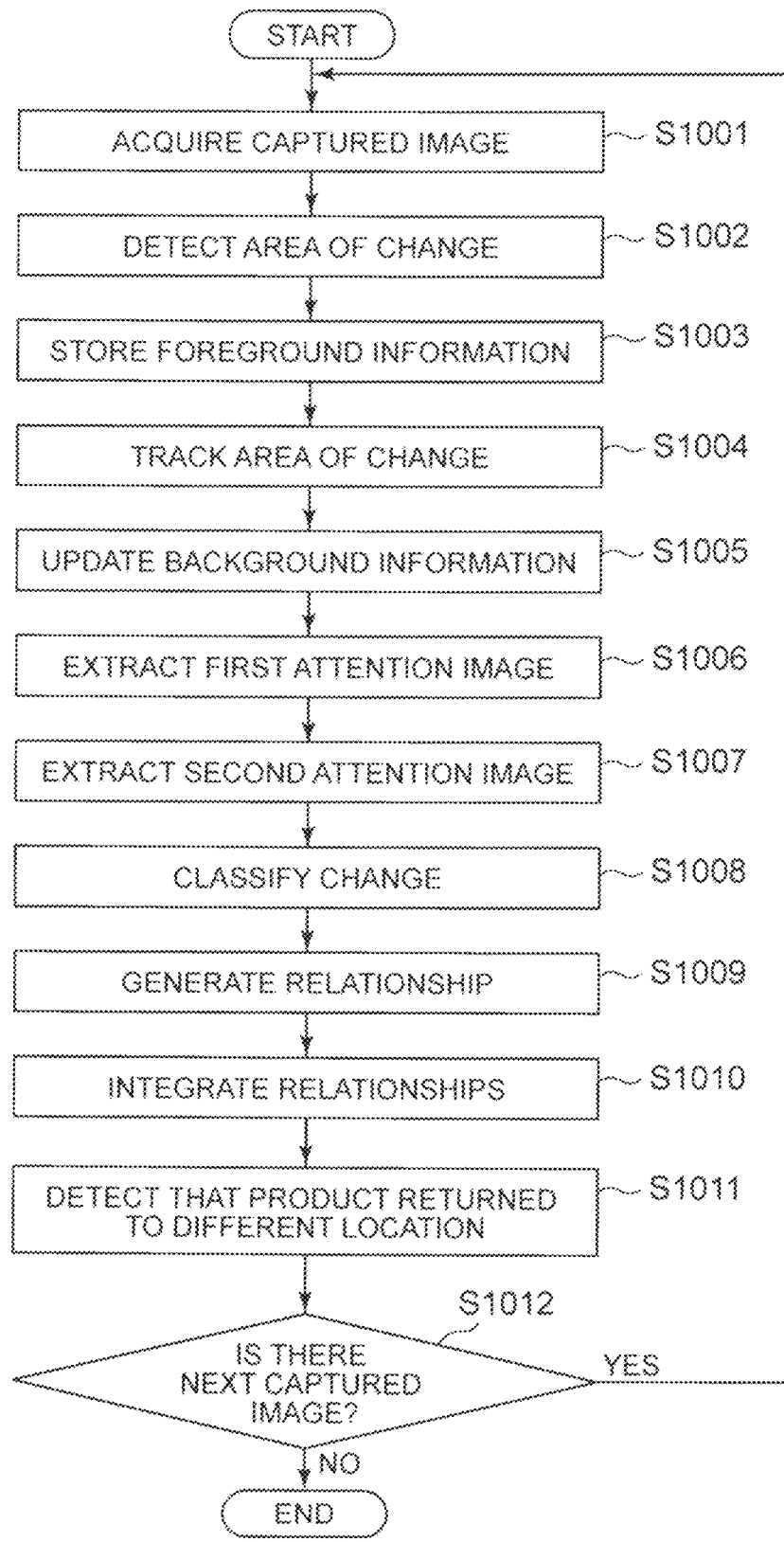
FIG. 11 It depicts a flowchart illustrating an example of operation of an image processing device 100 of a first exemplary embodiment.

Subsequently, the operation of the image processing device 100 of this exemplary embodiment will be described with reference to FIG. 11. FIG. 11 is a flowchart illustrating an example of operation of the image processing device 100 of this exemplary embodiment.

The first acquisition unit 110 acquires a captured image, which is an RGB image, from the video signal of the imaged product shelf 3 (step S1001). The first acquisition unit 110 supplies the captured image to the first change detection unit 120.

The foreground area detection unit 121 of the first change detection unit 120 uses the captured image, which is the RGB image supplied from the first acquisition unit 110, and the background information 131, which is the RGB image stored in the first storage unit 130, to detect the area changed between the two RGB images as an area of change (foreground area) (step S1002). Then, the foreground area detection unit 121 supplies the detection result of the area of change to the background information updating unit 122 and to the foreground area tracking unit 123. The foreground area detection unit 121 generates, for example, a binary image, in which the pixel value of the detected area of change is 255 and the pixel value of other areas is 0, and supplies the binary image to the background information updating unit 122 and to the foreground area tracking unit 123, as the detection result of the area of change.

The foreground area detection unit 121 stores the foreground information 133 in the first storage unit 130 (step S1003). As described above, the foreground information 133 is the detection result associated with the imaging time.

The foreground area tracking unit 123 tracks the area of change on the basis of the detection result supplied from the foreground area detection unit 121 and of the foreground information 133 (step S1004). The foreground area tracking unit 123 supplies the binary image representing the area of change that has been tracked for a predetermined time or longer to the first extraction unit 124 and to the second extraction unit 125. The foreground area tracking unit 123 supplies an update signal indicating an update of the background information 131 to the background information updating unit 122.

In the case where the moving distance of the area of change is equal to or more than a predetermined threshold as the tracking result, the foreground area tracking unit 123 determines that the object included in the area of change is a moving body and extracts the determined area of change as a person area. Thereafter, the foreground area tracking unit 123 associates the predetermined information with the person area and stores it as the person information 134 in the first storage unit.

The background information updating unit 122 updates the background information 131 on the basis of the captured image supplied from the first acquisition unit 110, the detection result of the area of change supplied from the foreground area detection unit 121, the background information 131, and the update signal supplied from the foreground area tracking unit 123 (step S1005). Note that step S1005 may be performed at an arbitrary timing after step S1004.

The first extraction unit 124 extracts, as a first attention image, the image of an area corresponding to the area of change (first attention area) indicated by the detection result in the captured image on the basis of the captured image supplied from the first acquisition unit 110 and the detection result related to the captured image supplied from the foreground area tracking unit 123 (step S1006). The first extraction unit 124 supplies the extracted first attention image to the area change classification unit 126.

The second extraction unit 125 extracts a second attention image from the background information 131 by a similar operation as the first extraction unit 124 on the basis of the detection result supplied from the foreground area tracking unit 123 and the background information 131 used to obtain the detection result, which has been acquired from the first storage unit 130 (step S1007). The second extraction unit 125 supplies the extracted second attention image to the area change classification unit 126. Note that step S1006 and step S1007 may be performed simultaneously or in reverse order.

The area change classification unit 126 classifies a change related to the product shelf 3 on the basis of the first attention image supplied from the first extraction unit 124, the second attention image supplied from the second extraction unit 125, and the shelf change model 132 stored in the first storage unit 130 (step S1008). Specifically, the change related to the product shelf 3 is a change from the state in the second attention image to the state in the first attention image.

The first relationship generation unit 140 receives the classification result of the area of change and the position information of the area of change from the area change classification unit 126 of the first change detection unit 120. Moreover, the first relationship generation unit 140 acquires the person information 134 from the first storage unit 130. Then, the first relationship generation unit 140 extracts a person who intersects with the area of change from the persons imaged at the time before the imaging time when the area of change was detected. Thereafter, the first relationship generation unit 140 associates the person, which has been imaged at the time closest to the imaging time of the area of change among the extracted persons, with the area of change (step S1009). Thereby, the first relationship generation unit 140 generates relationship information.

The relationship integration unit 150 receives the product-and-person relationship information from the first relationship generation unit 140, and if there is relationship information of the same person, the relationship integration unit 150 integrates the relationship information into one. The relationship integration unit 150 calculates the similarity on the basis of, for example, at least one of the color, dimensions, shape, and aspect ratio of the circumscribing rectangle of the person area stored in the person information 134 in the first storage unit 130. Then, the relationship integration unit 150 determines that the person areas with the highest calculated similarity are of the same person. Thereafter, the relationship integration unit 150 integrates the relationship information including the persons determined to be the same person into one (step S1010).

The display detection unit 160 receives the integrated relationship information from the relationship integration unit 150. Then, the display detection unit 160 detects that a product has been returned to a different location than the location from which the product was taken by comparing the location where the product was acquired with the location where the product was returned (step S1011). Moreover, the display detection unit 160 detects that a product has been returned to a different location than the location from which the product was taken in the case where the appearance of the product changes or the like.

The image processing device 100 determines whether the first acquisition unit 110 has received the next video signal (whether there is the next captured image) (step S1012). If there is the next captured image (YES in step S1012), the process proceeds to step S1001. On the other hand, if there is no next captured image (NO in step S1012), the image processing device 100 ends the operation.

Figure 12:
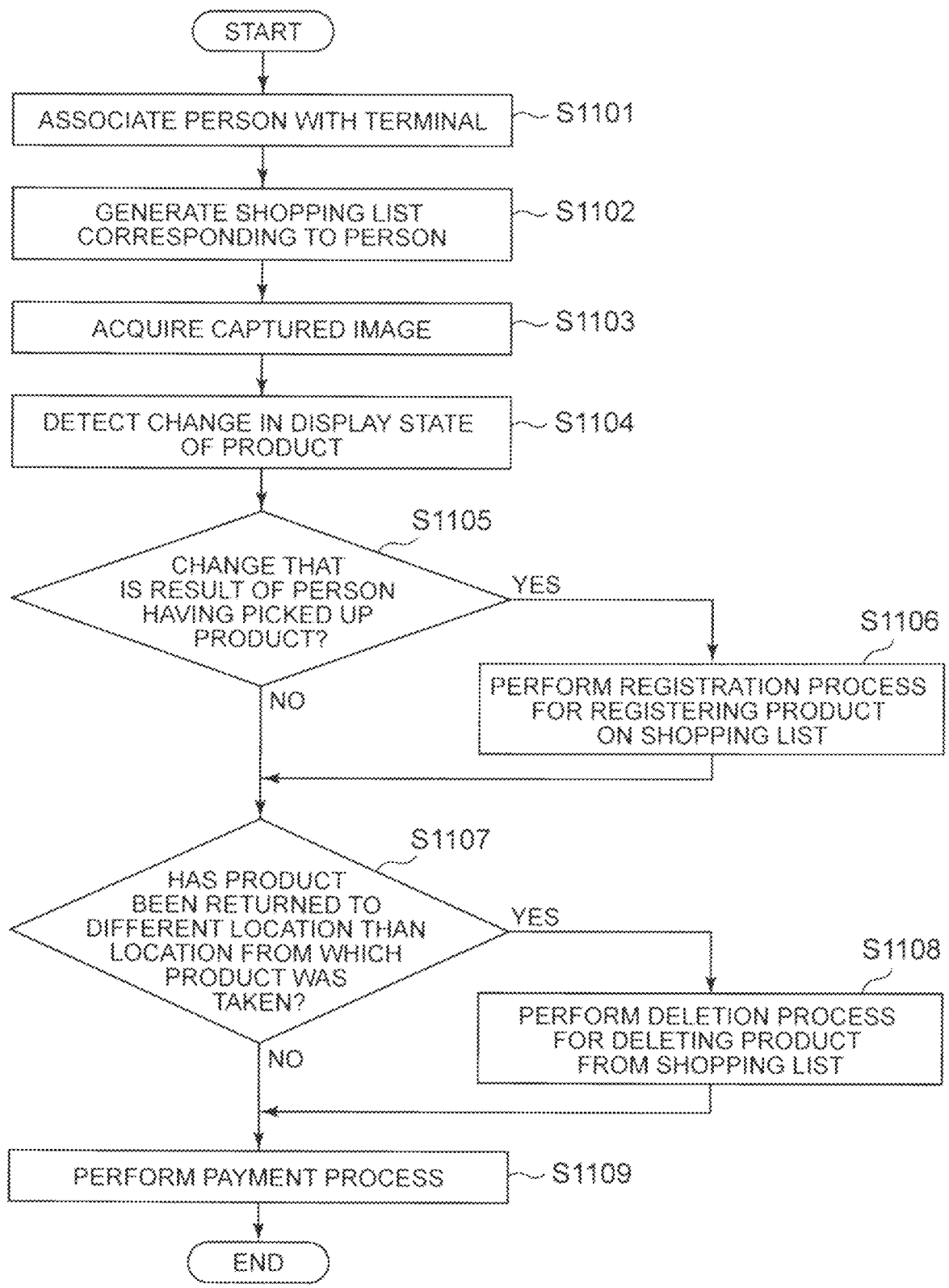
FIG. 12 It depicts a flowchart illustrating an example of operation of a self-checkout system of the first exemplary embodiment.

Subsequently, the operation of the self-checkout system 1 of this exemplary embodiment will be described with reference to FIG. 12. FIG. 12 is a flowchart illustrating an example of operation of the self-checkout system 1 of the first exemplary embodiment. First, when a customer (person) visits the store, the person identification device 50 identifies the person and associates the person with the terminal 10 (step S1101). Moreover, the shopping list generation unit 21 generates a shopping list that corresponds to the person (step S1102). After the customer enters the store, the imaging device 2 acquires a captured image (step S1103). The image processing device 100 detects a change in the display state of a product on the basis of the captured image (step S1104).

If the image processing device 100 detects a change in the display state that is a result of the person having picked up the product (YES in step S1105), the shopping list updating unit 22 specifies the product on the basis of the shelving information on the product shelf and performs a registration process for registering the specified product on the shopping list that corresponds to the person (step S1106). On the other hand, unless the image processing device 100 detects a change in the display state that is a result of the person having picked up the product (NO in step S1105), the process proceeds to step S1107.

On the other hand, if the image processing device 100 detects that a product has been returned to a different location than the location from which the product was taken (YES in step S1107), the shopping list updating unit 22 performs a deletion process for deleting the product that has been returned to a different location than the location from which the product was taken from the shopping list that corresponds to the person, on the basis of the detection result and the shelving information (step S1108). Also in the case where the image processing device 100 detects a change in the display state that is a result of the person having returned the product, the shopping list updating unit 22 specifies the product on the basis of the shelving information on the product shelf and deletes the specified product from the shopping list that corresponds to the person. On the other hand, unless it is detected that a product has been returned to a different location than the location from which the product was taken (NO in step S1107), the process proceeds to step S1109.

The payment device 40 performs the payment process on the basis of the contents of the shopping list (step S1109).

As described above, in this exemplary embodiment, the image processing device 100 (more specifically, the first change detection unit 120) detects a change in the display state of a product on the basis of the captured images of the products. Moreover, the image processing device 100 (more specifically, the display detection unit 160) detects that a product has been returned to a different location than the location from which the product was taken, on the basis of a detected change in the display state of the product and a person included in the captured image. Then, the shopping list management device 20 (more specifically, the shopping list updating unit 22) specifies the product for which there has been detected a change in the display state that is a result of a person having picked up the product, on the basis of the shelving information on the product shelf on which the product has been arranged, and performs a registration process for registering the specified product on the shopping list that corresponds to the person. Moreover, the shopping list management device 20 (more specifically, the shopping list updating unit 22) performs a deletion process for deleting the product that has been returned to a different location than the location from which the product was taken from the shopping list that corresponds to the person, on the basis of a result of the detection by the display detection unit 160 and the shelving information. Therefore, even in the case where a product has been returned to a different location than the location from which the product was taken, products purchased by customers can be managed properly.

In this exemplary embodiment, there has been described a method in which the shopping list updating unit 22 deletes a product that has been returned to a different location than the location from which the product was taken from the shopping list that corresponds to the person if the image processing device 100 detects that the product has been returned to the different location than the location from which the product was taken. On the other hand, depending on the product layout, the same product may be arranged in a plurality of locations. Such a situation can be understood from the shelving information. Therefore, even in the case where the display detection unit 160 detects products of the same type displayed in a plurality of locations on the basis of the shelving information and a product has been returned to a different location than the location from which the product was taken, but in the case where products of the same type as the returned product are displayed in the different location, the display detection unit 160 may detect that the product has been returned to the same location.

In addition, as described above, the shelf change model 132 is a model that represents a change related to the product shelf 3. Therefore, the first change detection unit 120 may classify the change related to the product shelf 3 in the area detected as an area of change as a type of a product being taken from the product shelf 3 or a product being added.

Therefore, the image processing device 100 of this exemplary embodiment is able to specify not only that the product on the product shelf 3 has changed, but also what type of change has occurred. As a result, the image processing device 100 is able to more accurately determine the state of the product shelf 3 such as whether the product has been taken or the product shelf 3 is refilled.

From the classification result and the person detection result, the image processing device 100 described in this exemplary embodiment is able to determine, for each person, whether the product displayed on the product shelf 3 has been taken or the product has been returned to the product shelf 3. As a result, the image processing device 100 is able to detect that a product has been returned to a different location than the location from which the product was taken, as described above. For example, if a product has been returned to a different location than the location from which the product was taken, such as a case where a refrigerated product is returned to a shelf at room temperature, a sales opportunity loss or a product disposal loss occurs, which greatly affects store sales. Therefore, when such a situation occurs, it is preferable to promptly perform a product management work to eliminate the situation. The use of the image processing device 100 of this exemplary embodiment enables a reduction in the occurrence of the sales opportunity loss and the product disposal loss caused by products being returned to different locations than the locations from which the products were taken.

In this exemplary embodiment, there has been described a case where the imaging device 2 images the product shelf 3. The target to be imaged by the imaging device 2, however, is not limited to the product shelf 3. The imaging device 2 may image, for example, products stacked on a wagon. Specifically, the captured image captured by the imaging device 2 may be a captured image of products stacked on a wagon. The image processing device 100 may detect the area of change by comparing the captured image of the products stacked on the wagon with the background image. As described above, the image processing device 100 is able to use the captured image of products displayed in various display methods, without limiting the captured image to an image of products displayed on the product shelf so that all faces of the products can be seen.

Exemplary Embodiment 2

Subsequently, a second exemplary embodiment of the present invention will be described. In the second exemplary embodiment, description will be made on a self-checkout system 1 that monitors different product shelves 3 with a plurality of imaging devices 2. As will be described later, the image processing device 200 in this exemplary embodiment detects that a product has been returned to a different location than the location from which the product was taken, on the basis of a result of monitoring the different product shelves 3. In other words, according to the image processing device 200 described in this exemplary embodiment, even in the case where the product shelf 3 where the product was acquired is different from the product shelf 3 to which the product has been returned, it is possible to detect that the product has been returned to a different location than the location from which the product was taken.

The image processing device 200 in this exemplary embodiment is communicatively connected to a terminal 10, an imaging device 2, a shopping list management device 20, an output device 30, a payment device 40, and a person identification device 50, similarly to the image processing device 100 illustrated in FIG. 1 and described in the first exemplary embodiment. The terminal 10, the imaging device 2, the shopping list management device 20, the output device 30, the payment device 40, and the person identification device 50 of this exemplary embodiment are the same as those of the first exemplary embodiment.

Figure 13:
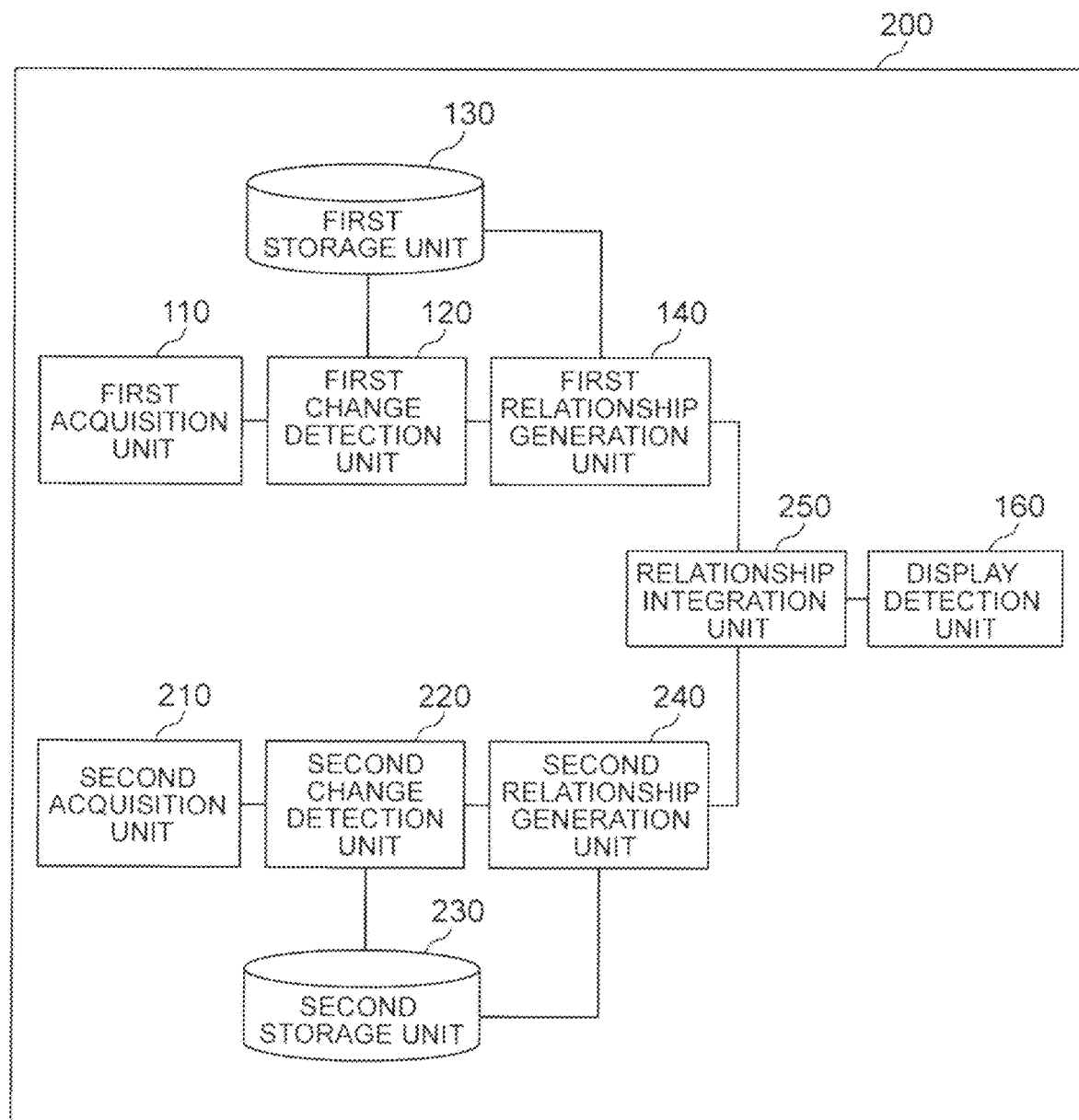
FIG. 13 It depicts an explanatory diagram illustrating a configuration example of an image processing device 200.

FIG. 13 is an explanatory diagram illustrating a configuration example of the image processing device 200. The image processing device 200 of this exemplary embodiment includes a first acquisition unit 110, a second acquisition unit 210, a first change detection unit 120, a second change detection unit 220, a first storage unit 130, a second storage unit 230, a first relationship generation unit 140, a second relationship generation unit 240, a relationship integration unit 250, and a display detection unit 160. As described above, the image processing device 200 of this exemplary embodiment includes the relationship integration unit 250, instead of the relationship integration unit 150 included in the image processing device 100. Furthermore, the image processing device 200 includes a second acquisition unit 210, a second change detection unit 220, a second storage unit 230, and a second relationship generation unit 240 in addition to the configuration of the image processing device 100.

In the above, the same reference numerals are given to the elements having the same functions as the elements included in the drawings described in the first exemplary embodiment described above. The characteristic configuration of this exemplary embodiment will be described below.

The second acquisition unit 210 acquires RGB images by the same operation as in the first acquisition unit 110. Then, the second acquisition unit 210 supplies the RGB images to the second change detection unit 220. For example, the second acquisition unit 210 acquires a video signal from an imaging device 2 for monitoring product shelves 3, which is different from the imaging device 2 that is the source of sending a video signal acquired by the first acquisition unit 110.

The second storage unit 230 has the same configuration as the first storage unit 130. Therefore, detailed description thereof is omitted. The second storage unit 230 may be the same storage device as the first storage unit 130 or may be a different storage device.

The second change detection unit 220 has the same configuration as the first change detection unit 120. The second change detection unit 220 detects an area of change related to a product shelf 3 by the same operation as in the first change detection unit 120. Furthermore, on the basis of the detected area of change and a shelf change model 132, which is a model of change related to the product shelf 3 learned in advance, the second change detection unit 220 classifies the change related to the product shelf 3 in the area of change. Thereafter, the second change detection unit 220 associates the position information of the first attention area with the imaging time and supplies them to the second relationship generation unit 240. In addition, the second change detection unit 220 supplies the result of classifying the change related to the product shelf 3 in the area of change to the second relationship generation unit 240.

The second relationship generation unit 240 has the same configuration as the first relationship generation unit 140. The second relationship generation unit 240 generates product-and-person relationship information by the same operation as in the first relationship generation unit. Then, the second relationship generation unit 240 supplies the generated relationship information to the relationship integration unit 250.

FIG. 14 is an explanatory diagram illustrating an example of product-and-person relationship information generated by the first relationship generation unit 140 and the second relationship generation unit 240. Similarly to FIG. 7, FIG. 14 illustrates a camera ID that indicates an ID of the imaging device, a person ID that indicates a person imaged by the imaging device, position information of the area of change on the product shelf, and a classification result of the change. In the example illustrated in FIG. 14, it is illustrated that a person with a person ID of 1 and a person with a person ID of 2 were imaged by the imaging device with a camera ID of 1 and that a person with a person ID of 3 and a person with a person ID of 4 were imaged by the imaging device with a camera ID of 2. In the example illustrated in FIG. 14, for example, the information on the camera ID of 1 is the information generated by the first relationship generation unit 140, and the information on the camera ID of 2 is the information generated by the second relationship generation unit 240.

The relationship integration unit 250 receives the product-and-person relationship information from the first relationship generation unit 140 and from the second relationship generation unit 240, respectively. If there is relationship information of the same person, the relationship integration unit 250 integrates those pieces of relationship information into one. Then, the relationship integration unit 250 supplies the integrated relationship information to the display detection unit 160. The relationship integration unit 250 integrates a plurality of pieces of relationship information by the same operation as in, for example, the relationship integration unit 150.

FIG. 15 is an explanatory diagram illustrating an example in which the relationship integration unit 250 integrates the product-and-person relationship information illustrated in FIG. 14. In the example illustrated in FIG. 15, the relationship information of a person ID of 1 and that of a person ID of 3 in FIG. 14 are integrated into one.

The display detection unit 160 receives the integrated relationship information from the relationship integration unit 250 and detects that a product has been returned to a different location than the location from which the product was taken by comparing the location where the product was acquired with the location to which the product has been returned or the like.

The operation of the display detection unit 160 is the same as the operation in the first exemplary embodiment. For example, the display detection unit 160 compares position information and the type of change for each person ID. Specifically, in the example illustrated in FIG. 15, a person with the person ID of 1 acquires a product from the location (10, 0, 30, 50) in the product shelf imaged by the imaging device with the camera ID of 1 and then returns the product to a location (100, 250, 50, 70) in the product shelf imaged by the imaging device with the camera ID of 2. Thereby, the display detection unit 160 detects that the person with the person ID of 1 has returned the product to a shelf other than the shelf where the person acquired the product.

The above is an example of a characteristic configuration of the image processing device 200.

Figure 16:
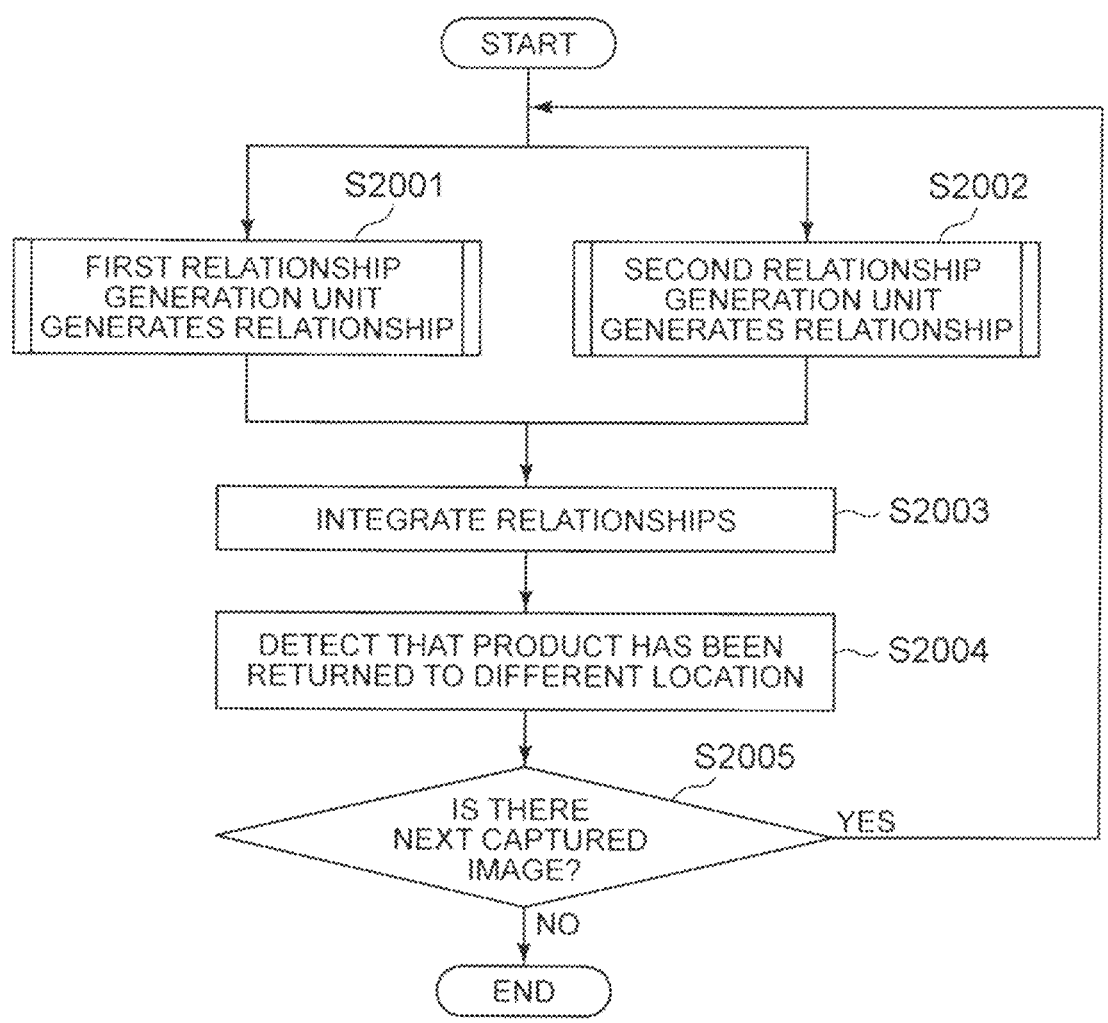
FIG. 16 It depicts a flowchart illustrating an example of operation of an image processing device 200 of a second exemplary embodiment FIG. 17 It depicts an explanatory diagram of a configuration example of a third exemplary embodiment of a self-checkout system according to the present invention.

Subsequently, the operation of the image processing device 200 of this exemplary embodiment will be described with reference to FIG. 16. FIG. 16 is a flowchart illustrating an example of operation of the image processing device 200 of this exemplary embodiment.

Referring to FIG. 16, the image processing device 200 performs the same processes as the processes of steps S1001 to S1009 illustrated in FIG. 11, by which the first relationship generation unit 140 generates the relationship (step S2001). Similarly, the image processing device 200 performs the same processes as the processes of steps S1001 to S1009, by which the second relationship generation unit 240 generates the relationship (step S2002). The process of step S2001 and the process of step S2002 may be performed in parallel or either one may be performed first.

The relationship integration unit 250 receives the product-and-person relationship information from the first relationship generation unit 140 and from the second relationship generation unit 240, respectively. Then, if there is product-and-person relationship information of the same person in the same imaging device 2 or among a plurality of imaging devices 2, the relationship integration unit 250 integrates the relationship information into one (step S2003). Note that the relationship integration unit 250 determines the same person by the same operation as for the relationship integration unit 150, for example.

The display detection unit 160 detects that a product has been returned to a different location than the location from which the product was taken, on the basis of the relationship information received from the relationship integration unit 150 (step S2004). The image processing device 200 determines whether the first acquisition unit 110 or the second acquisition unit 210 has received the next video signal (whether there is the next captured image) (step S2005). If there is the next captured image (YES in step S2005), the process proceeds to step S2001 and to step S2002. On the other hand, unless there is the next captured image (NO in step S2005), the image processing device 200 ends the operation.

The processes of steps S2004 and S2005 are the same as the processes of steps S1011 and S1012 of FIG. 11 described in the first exemplary embodiment.

As described above, the image processing device 200 of this exemplary embodiment includes the first relationship generation unit 140 and the second relationship generation unit 240. Moreover, the relationship integration unit 250 integrates the relationship information generated by the first relationship generation unit 140 and the relationship information generated by the second relationship generation unit. In other words, the relationship integration unit 250 integrates product-and-person relationship information regarding different product shelves 3 imaged by a plurality of imaging devices 2. As a result, not only the same effect as the first exemplary embodiment is obtained, but also the image processing device 200 is able to detect that a product has been returned to a different location than the location from which the product was taken, even in the case where a shelf from which a customer acquired the product is different from a shelf to which the customer returned the product. This makes it possible to reduce a sales opportunity loss and a product disposal loss caused by a defective product display over a wider area in the store than in the first exemplary embodiment.

In the second exemplary embodiment, description has been made on a case where the image processing device 200 includes the first processing unit, which includes the first acquisition unit 110, the first change detection unit 120, the first storage unit 130, and the first relationship generation unit 140, and the second processing unit, which includes the second acquisition unit 210, the second change detection unit 220, the second storage unit 230, and the second relationship generation unit 240. In other words, in the second exemplary embodiment, description has been made on a case where the image processing device 200 has two different kinds of processing units. The number of different kinds of processing units of the image processing device 200, however, is not limited to two. The image processing device 200 may have, for example, three or more arbitrary number of different kinds of processing units. In other words, the image processing device 200 may be configured to process captured images sent from the imaging device 2 that monitors three or more plurality of product shelves 3 different from each other.

Exemplary Embodiment 3

Subsequently, a third exemplary embodiment of the present invention will be described. In the third exemplary embodiment, description will be made on the configuration of the image processing device 100 described in the first exemplary embodiment and further on an image processing device 300 having a configuration for generating a flow line data of a customer. As will be described later, the image processing device 300 uses the generated flow line data to generate relationship information. This makes it possible to detect that a product has been returned to a different location than the location from which the product was taken with higher accuracy.

Figure 17:
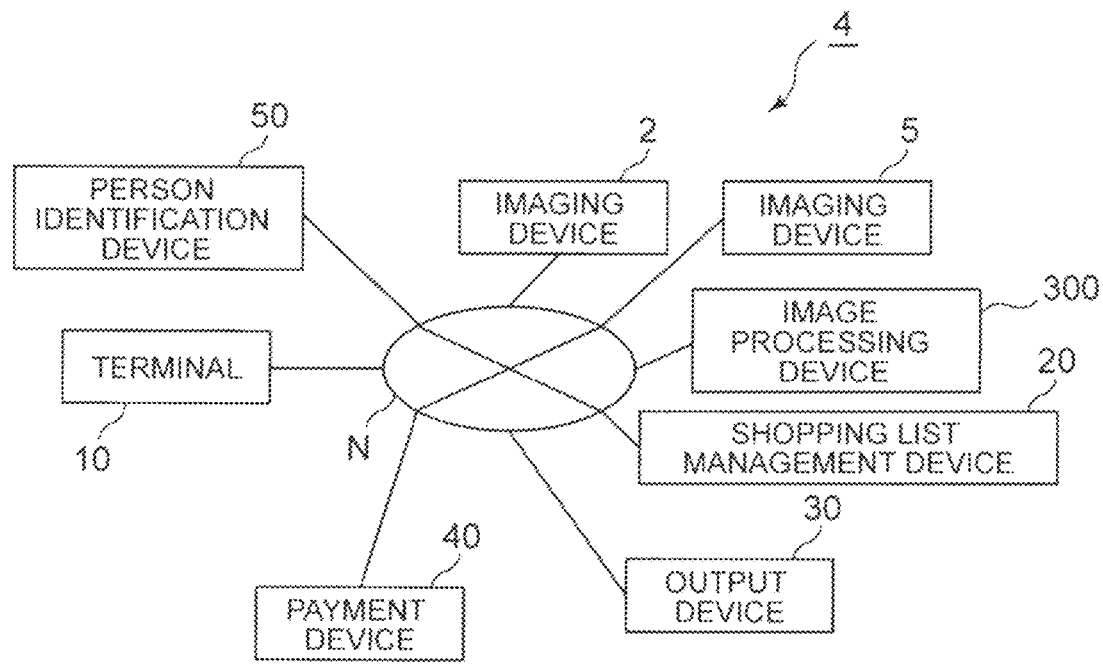

FIG. 17 is an explanatory diagram illustrating a configuration example of the third exemplary embodiment of the self-checkout system according to the present invention. A self-checkout system 4 of this exemplary embodiment includes an imaging device 5 that images an aisle in a store similarly to a general security camera, in addition to the imaging device 2 that images a product shelf 3. Furthermore, similarly to the imaging device 2, the imaging device 5 is communicatively connected to a terminal 10, a shopping list management device 20, an output device 30, a payment device 40, a person identification device 50, and an image processing device 300 via a network N. The terminal 10, the imaging device 2, the shopping list management device 20, the output device 30, the payment device 40, and the person identification device 50 of this exemplary embodiment are the same as those of the first exemplary embodiment.

The imaging device 5 is a security camera installed in, for example, a store or the like. The imaging device 5 is installed at a position, for example, where each aisle in the store can be imaged. The configuration of the imaging device 5 may be the same as the configuration of the imaging device 2.

The self-checkout system 4 may have one imaging device 5 or a plurality of imaging devices 5. In other words, the self-checkout system 4 may image each aisle in the store with one imaging device 5, or may image respective aisles in the store with a plurality of imaging devices 5. In this exemplary embodiment, description will be made on a case where the self-checkout system 4 has an imaging device 2 and another imaging device 5. The self-checkout system 4, however, may acquire flow line data of a customer on the basis of captured images captured by a plurality of imaging devices 2. Specifically, the self-checkout system 4 may acquire the flow line data of the customer on the basis of the captured images of the product shelves 3 captured by the plurality of imaging devices 2.

The image processing device 300 generates flow line data indicating a customer's moving path in the store from the RGB image captured by the imaging device 5. Then, the image processing device 300 generates product-and-person relationship information on the basis of the generated flow line data and the area of change of the product shelf 3.

Figure 18:
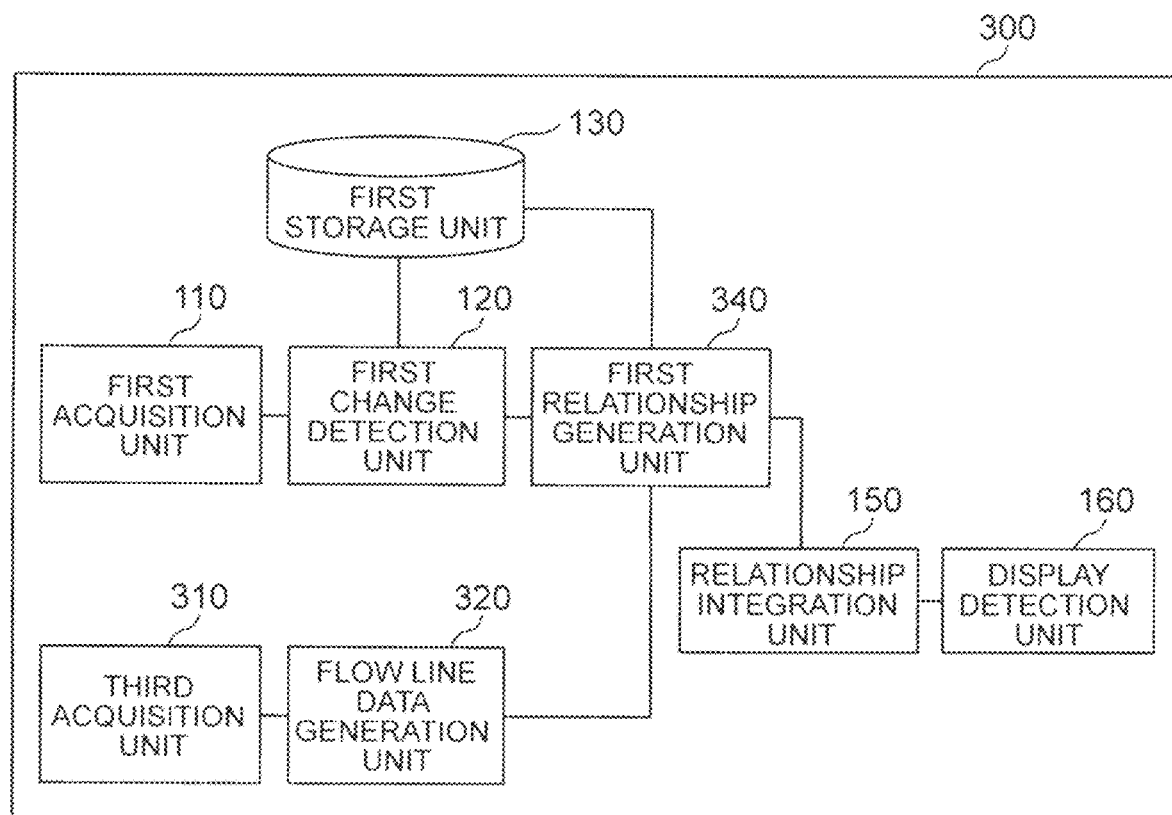
FIG. 18 It depicts an explanatory diagram illustrating a configuration example of an image processing device 300.

FIG. 18 is a block diagram illustrating a configuration example of the image processing device 300. As illustrated in FIG. 18, the image processing device 300 of this exemplary embodiment includes a first acquisition unit 110, a first change detection unit 120, a first storage unit. 130, a first relationship generation unit 340, a third acquisition unit 310, a flow line data generation unit 320, a relationship integration unit 150, and a display detection unit 160. In this manner, the image processing device 300 of this exemplary embodiment includes the first relationship generation unit 340, instead of the first relationship generation unit 140 of the image processing device 100. Furthermore, the image processing device 300 includes the third acquisition unit 310 and the flow line data generation unit 320 in addition to the configuration of the image processing device 100.

In the above, the same reference numerals are given to the elements having the same functions as the elements included in the drawings described in the first exemplary embodiment and the second exemplary embodiment described above. The characteristic configuration of this exemplary embodiment will be described below.

The third acquisition unit 310 acquires an RGB image from the imaging device 5 and supplies the RGB image to the flow line data generation unit 320 by the same operation as in the first acquisition unit 110. The RGB image acquired by the third acquisition unit 310 is an image of an aisle in the store, similarly to a general security camera.

The flow line data generation unit 320 uses the RGB image captured by at least one imaging device 5 to generate flow line data of a person in the store. The flow line data generated by the flow line data generation unit 320 is information including, for example, a person ID used to identify a customer, and the product shelf ID, which is an identifier of the product shelf 3 that the customer visited. The method in which the flow line data generation unit 320 generates flow line data is not particularly limited. The flow line data generation unit 320 may generate flow line data by using, for example, the method described in PTL 2. In other words, the flow line data generation unit 320 performs face recognition of persons to detect persons, from which the same data is acquired, as the same person or extracts information indicating the characteristics of customers such as clothes to detect the same person in order to identify the customers in the captured image. Furthermore, the flow line data generation unit 320 determines that the customer has visited the product shelf 3 by using criteria such that the customer stays in front of the product shelf 3 for a certain period of time, that a distance between the customer and the product shelf 3 is equal to or less than a predetermined distance, or the like. Then, the flow line data generation unit 320 generates flow line data by linking the person ID for identifying the customer with the product shelf ID of the product shelf visited by the customer. Note that the flow line data generation unit 320 may generate flow line data by using a method other than those exemplified above.

FIG. 19 is an explanatory diagram illustrating an example of flow line data generated by the flow line data generation unit 320. The flow line data illustrated in FIG. 19 includes a person ID that indicates a person, a product shelf ID indicating the product shelf visited by the person, and a camera ID indicating the imaging device that is imaging the product shelf. The example in FIG. 19 illustrates that three persons visited a product shelf A and that a person with a person ID of 1 and a person with a person ID of 2 visited the product shelf A twice. Although the time when a person visited the product shelf is not specified in the example illustrated in FIG. 19, the flow line data may include the time when each product shelf was visited. The example in FIG. 19 illustrates that product shelf A is visited in order from the top row and from the oldest.

The flow line data generation unit 320 generates flow line data as illustrated in FIG. 19, for example. Then, the flow line data generation unit 320 associates the generated flow line data with the time of the captured image of the flow line data and supplies them to the first relationship generation unit 340. In other words, the flow line data generation unit 320 supplies the first relationship generation unit 340 with the time when each person in the flow line data visited each product shelf included in the flow line data.

The first relationship generation unit 340 receives the classification result of an area of change and the position information of the area of change from the first change detection unit 120. Further, the first relationship generation unit 340 acquires flow line data from the flow line data generation unit 320. Then, the first relationship generation unit 340 generates product-and-person relationship information corresponding to the area of change on the basis of the imaging time of the area of change tied to the position information of the area of change and the imaging time tied to the flow line data. Thereafter, the first relationship generation unit 340 supplies the generated product-and-person relationship information to the relationship integration unit 150.

Specifically, the first relationship generation unit 340 associates the area of change with a person who visited the product shelf at the time closest to the imaging time of the area of change from the flow line data generated at the time before the imaging time when the area of change was detected.

FIG. 20 is an explanatory diagram illustrating an example of product-and-person relationship information generated by the first relationship generation unit 340. FIG. 20 illustrates the camera ID that indicates an ID of an imaging device, the person ID that indicates a person imaged by the imaging device, the product shelf ID that indicates a product shelf, the position information of the area of change of that product shelf, and a classification result of the change.

As described above, the first relationship generation unit 340 generates relationship information by using flow line data, instead of the person information 134. Note that the first relationship generation unit 340 may also use the person information 134 when generating relationship information.

The relationship integration unit 150 receives the relationship between the product and person from the first relationship generation unit 340, and if there are relationships of the same person, the relationship integration unit 150 integrates the relationships. Then, the relationship integration unit 150 supplies the integrated relationship to the display detection unit 160.

Specifically, the relationship integration unit 150 integrates the relationships of the same person on the basis of the person ID. FIG. 21 is an explanatory diagram illustrating an example that the product-and-person relationships illustrated in FIG. 20 are integrated. In the example illustrated in FIG. 21, the pieces of relationship information of a person with the person ID of 1 in FIG. 20 are integrated into one, and the pieces of relationship information of a person with the person ID of 2 are also integrated into one.

The operation of the display detection unit 160 is the same as those described in the first exemplary embodiment and the second exemplary embodiment. Therefore, the description thereof is omitted.

The above is an example of a characteristic configuration of the image processing device 300.

Figure 22:
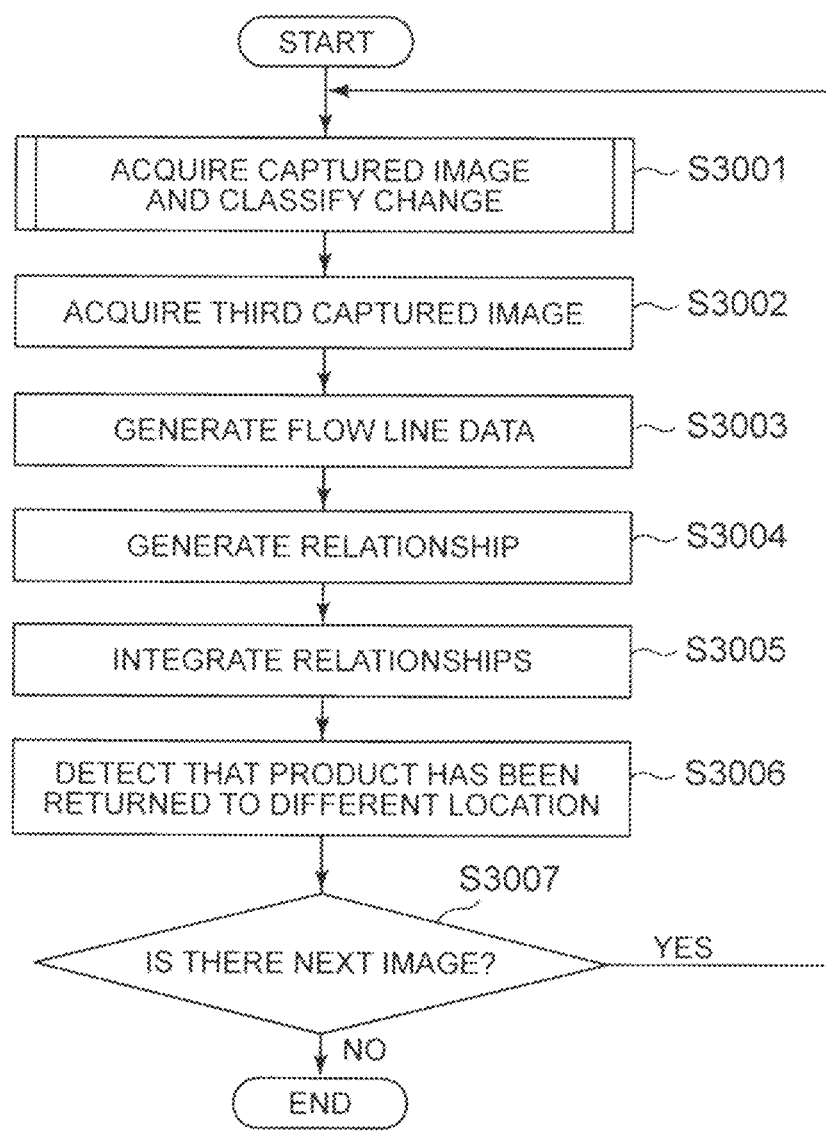
FIG. 22 It depicts a flowchart illustrating an example of operation of an image processing device 300 of a third exemplary embodiment.

Subsequently, with reference to FIG. 22, the operation of the image processing device 300 of this exemplary embodiment will be described. FIG. 22 is a flowchart illustrating an example of operation of the image processing device 300 of this exemplary embodiment.

Referring to FIG. 22, the image processing device 300 performs the same processes as steps S1001 to S1008 illustrated in FIG. 11, whereby the area change classification unit 126 classifies a change (step S3001).

The third acquisition unit 310 acquires a captured image (third captured image), which is an RGB image, from a video signal sent from the imaging device 5 that has imaged an aisle in the store (step S3002). The third acquisition unit 310 supplies the captured image, which has been acquired, to the flow line data generation unit 320.

The flow line data generation unit 320 generates flow line data of a person in the store by using an RGB image captured by at least one imaging device (step S3003). Then, the flow line data generation unit 320 associates the generated flow line data with the time of the captured image of the flow line data and supplies them to the first relationship generation unit 340.

Note that the order of performing processes of steps S3002 and S3003 may be interchanged with the order of performing the process of step S3001, or alternatively, the processes of both may be performed simultaneously.

The first relationship generation unit 340 receives the classification result of an area of change and the position information of the area of change from the first change detection unit 120. Furthermore, the first relationship generation unit 340 acquires flow line data from the flow line data generation unit 320. Then, the first relationship generation unit 340 generates product-and-person relationship information corresponding to the area of change on the basis of the imaging time of the area of change tied to the position information of the area of change and of the imaging time tied to the flow line data (step S3004). Specifically, the first relationship generation unit 340 associates the area of change with a person who visited the product shelf at the time closest to the imaging time of the area of change from the flow line data generated at the time before the imaging time when the area of change was detected. Then, the first relationship generation unit 340 supplies the generated product-and-person relationship information to the relationship integration unit 150.

Thereafter, the image processing device 300 performs the processes of steps S3005 to S3007, which are the same processes as steps S1010 to S1012 illustrated in FIG. 11.

As described above, the image processing device 300 of this exemplary embodiment includes the third acquisition unit 310 and the flow line data generation unit 320. With this configuration, the flow line data generation unit 320 generates flow line data on the basis of the RGB image supplied from the third acquisition unit 310. Furthermore, on the basis of the area of change detected from the RGB image of the product shelf 3, the classification result of classifying the area of change, and the flow line data generated from the RGB image of the store aisle, the image processing device 300 generates product-and-person relationship information. The whole body of a person is imaged in the captured image of the store aisle, which is imaged by the imaging device 5 and used to generate the flow line data. Therefore, it is easier to identify the person in the captured image than the RGB image of the product shelf 3. In other words, if the relationship information is generated by using the flow line data as in the image processing device 300, relationship information can be expected to be generated with higher accuracy than in the case where the relationship information is generated by using the person information 134. Therefore, the image processing device 300 of this exemplary embodiment is able to integrate relationship information with higher accuracy than the image processing device 100 of the first exemplary embodiment. This increases the accuracy of detecting that a product has been returned to a different location than the location from which the product was taken. Therefore, the image processing device 300 is able to reduce a sales opportunity loss, a product disposal loss, and the like, which will be caused by a defective product display, in comparison with the image processing device 100.

Figure 23:
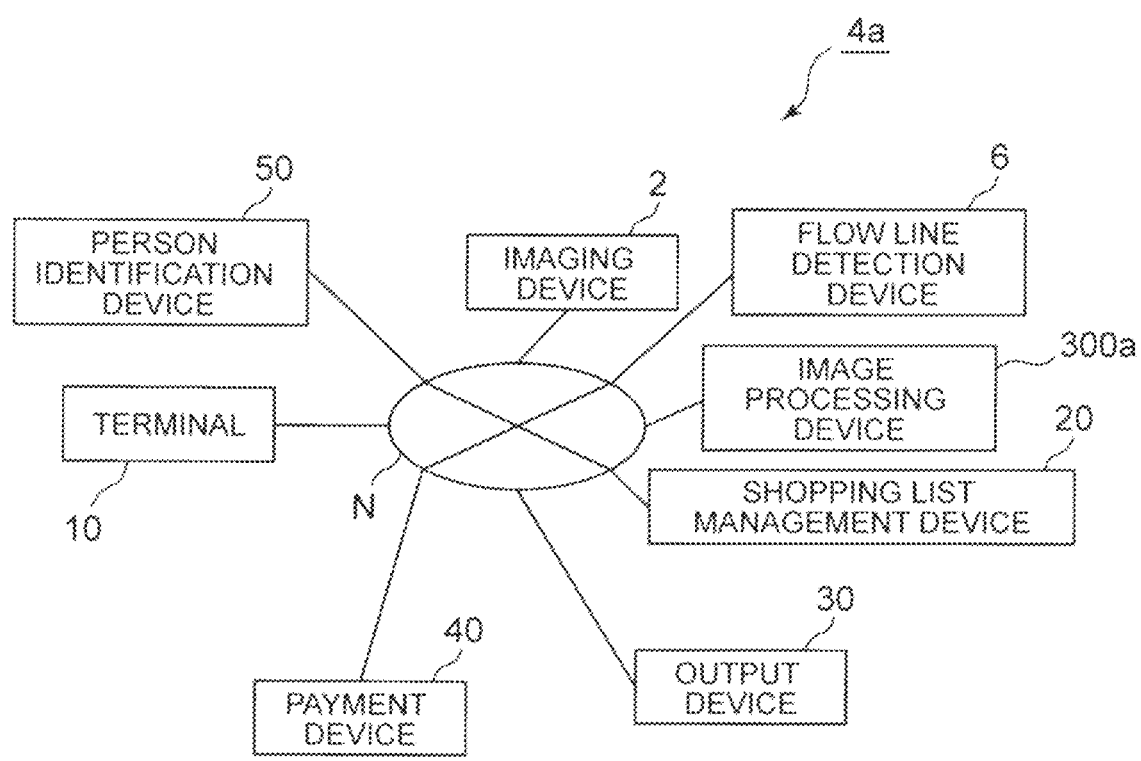
FIG. 23 It depicts a block diagram illustrating a modification of a self-checkout system of the third exemplary embodiment.

Subsequently, a modification of the third exemplary embodiment will be described. In the third exemplary embodiment, the imaging device 5 images the aisle in the store to generate the flow line data of the customer. The method of generating the flow line data, however, is not limited to the method with an image. FIG. 23 is a block diagram illustrating the modification of the self-checkout system according to the third exemplary embodiment. The self-checkout system 4a illustrated in FIG. 23 includes a flow line detection device 6 that detects the flow line of a customer, instead of the imaging device 5 included in the self-checkout system 4 of the third exemplary embodiment. The self-checkout system 4a illustrated in FIG. 23 includes an image processing device 300a, instead of the image processing device 300 included in the self-checkout system 4 of the third exemplary embodiment.

The flow line detection device 6 is a device that detects the position of a terminal 10 carried by the customer. The flow line detection device 6 detects, for example, a near field radio transmission from the terminal 10 to detect the position of the customer. For example, if the person identification device 50 authenticates the terminal 10 at a predetermined location (for example, an entrance, or the like) in the store, the flow line detection device 6 follows the authenticated person and detects the flow line of the person. The shopping list generation unit 21 may generate a shopping list that corresponds to the person who carries the authenticated terminal 10 at the timing of this authentication.

Figures 24, 25:
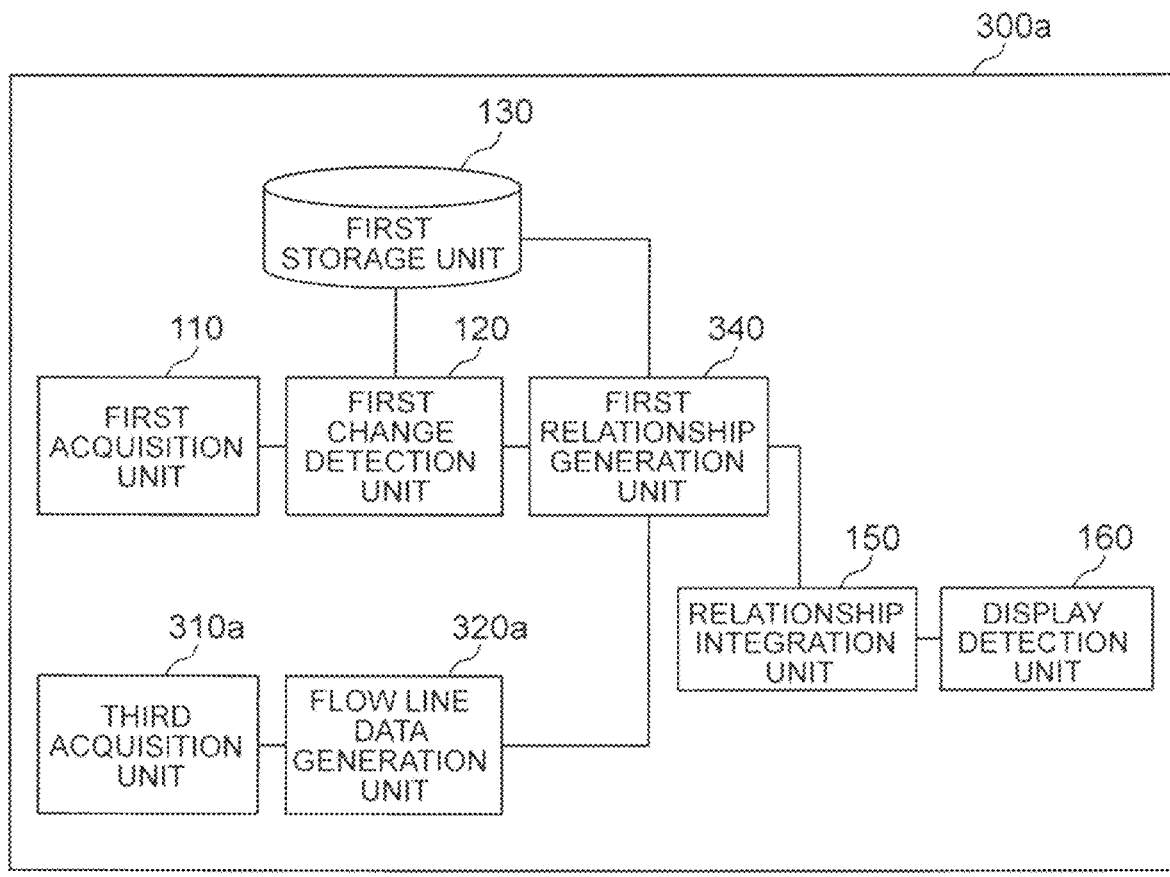

FIG. 24 is a block diagram illustrating a configuration example of the image processing device 300a. As illustrated in FIG. 24, the image processing device 300a of this exemplary embodiment includes a first acquisition unit 110, a first change detection unit 120, a first storage unit 130, a third acquisition unit 310a, a flow line data generation unit 320a, a first relationship generation unit 340, a relationship integration unit 150, and a display detection unit 160. As described above, the image processing device 300a of this modification includes a third acquisition unit 310a and a flow line data generation unit 320a, instead of the third acquisition unit 310 and the flow line data generation unit 320 of the image processing device 300.

The third acquisition unit 310a acquires the position information of the customer from the flow line detection device 6. The position information of the customer includes, for example, the identification information of the terminal 10. The flow line data generation unit 320a generates the flow line data of a person in the store. The flow line data generated by the flow line data generation unit 320a is information including, for example, the identification information of the terminal 10 carried by the customer and the product shelf ID which is the identifier of the product shelf 3 visited by the customer. The method in which the flow line data generation unit 320a generates the flow line data is not particularly limited. Similarly to the third exemplary embodiment, the flow line data generation unit 320a determines that the customer has visited the product shelf 3 by using criteria such that the customer stays in front of the product shelf 3 for a certain period of time, that a distance between the customer and the product shelf 3 is equal to or less than a predetermined distance, or the like. Then, the flow line data generation unit 320a generates flow line data by linking the identification information of the terminal 10 carried by the customer with the product shelf ID of the product shelf visited by the customer.

FIG. 25 is an explanatory diagram illustrating another example of flow line data. As illustrated in FIG. 25, the flow line data generation unit 320a generates flow line data with the identification information of the terminal 10 linked with the product shelf ID. Further, the flow line data generation unit 320a associates the generated flow line data with the acquisition time of the flow line data and supplies them to the first relationship generation unit 340. In other words, the flow line data generation unit 320a supplies the first relationship generation unit 340 with the time when each person in the flow line data visited each product shelf included in the flow line data. The subsequent processes are the same as those of the third exemplary embodiment. In other words, in this modification, the display detection unit 160 detects that a product has been returned to a different location than the location from which the product was taken, on the basis of the detected change in the display state of the product and the person whose in-store flow line has been detected.

As described above, in this modification, flow line data is generated on the basis of the position information of a person detected by the flow line detection device 6, and the image processing device 300a (more specifically, the display detection unit 160) detects that a product has been returned to a different location than the location from which the product was taken, on the basis of the detected change in the display state of the product and the person whose in-store flow line has been detected. This increases the accuracy of detecting that a product has been returned to a different location than the location from which the product was taken. Therefore, the image processing device 300a is able to reduce a sales opportunity loss, a product disposal loss, and the like, which will be caused by a defective product display, in comparison with the image processing device 100.

Exemplary Embodiment 4

Subsequently, a fourth exemplary embodiment of the present invention will be described. The fourth exemplary embodiment describes an image processing device 400 having a configuration of generating flow line data of a customer, which has been described in the third exemplary embodiment, in addition to the configuration of the image processing device 200 described in the second exemplary embodiment. In other words, this exemplary embodiment describes an image processing device in which the respective components described in the second exemplary embodiment are combined with the respective components described in the third exemplary embodiment.

The image processing device 400 of this exemplary embodiment is communicatively connected to a terminal 10, an imaging device 2, a shopping list management device 20, an output device 30, a payment device 40, and a person identification device 50, similarly to the image processing device 100 illustrated in FIG. 1 and described in the first exemplary embodiment.

Figure 26:
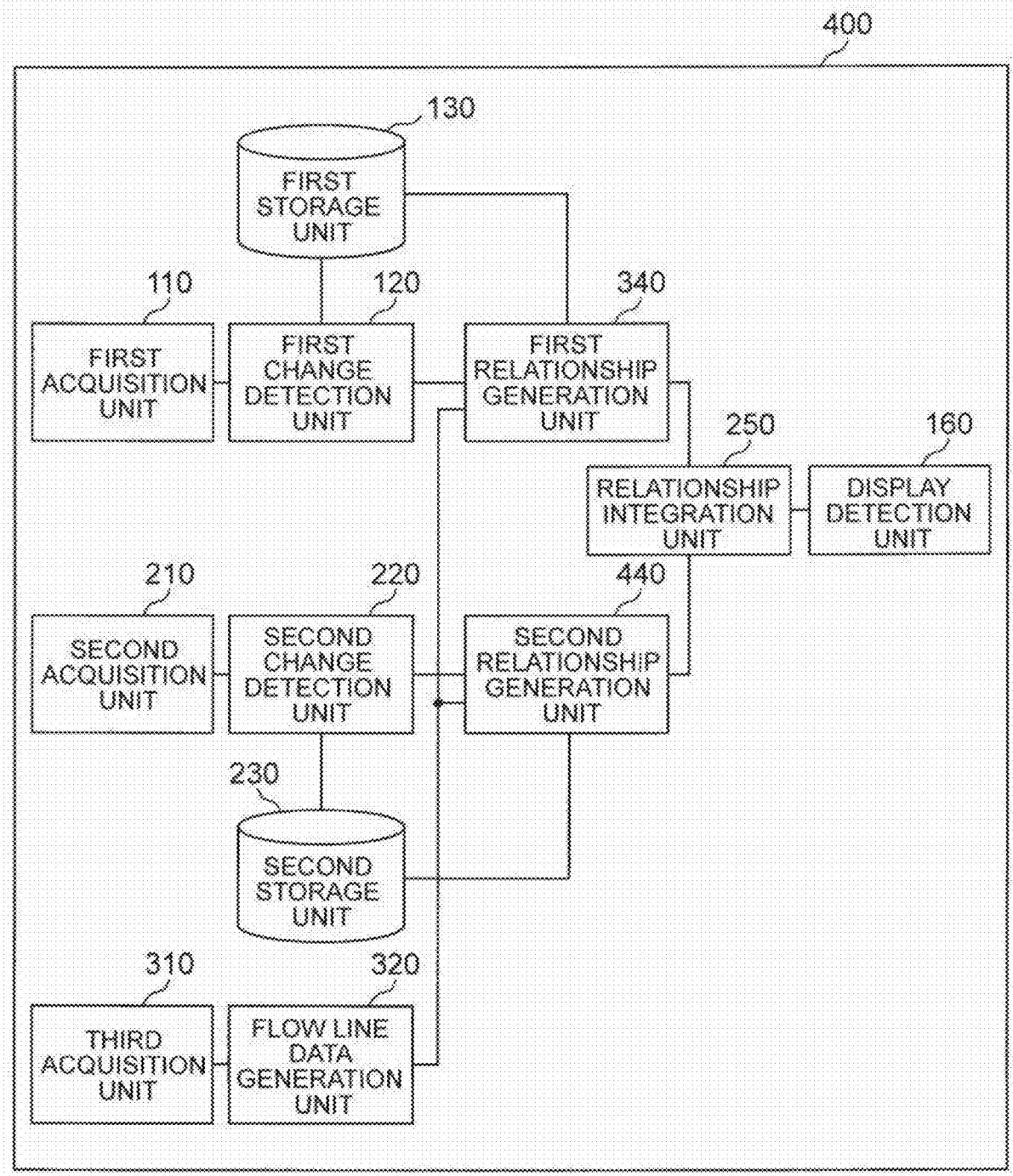
FIG. 26 It depicts an explanatory diagram illustrating a configuration example of an image processing device 400.

FIG. 26 is an explanatory diagram illustrating a configuration example of the image processing device 400. The image processing device 400 of this exemplary embodiment includes a first acquisition unit 110, a second acquisition unit 210, a first change detection unit 120, a second change detection. unit 220, a first storage unit 130, a second storage unit 230, a first relationship generation unit 340, a second relationship generation unit 440, a third acquisition unit 310, a flow line data generation unit 320, a relationship integration unit 250, and a display detection unit 160. As described above, the image processing device 400 of this exemplary embodiment has a configuration included in the image processing device 200 described in the second exemplary embodiment, and also includes the third acquisition unit 310 and the flow line data generation unit 320. In other words, the image processing device 400 of this exemplary embodiment includes the first relationship generation unit 340, instead of the first relationship generation unit 140 of the image processing device 200, and includes the second relationship generation unit 440, instead of the second relationship generation unit 240. Furthermore, the image processing device 400 includes a third acquisition unit 310 and a flow line data generation unit 320.

In the above, the same reference numerals are given to the elements having the same functions as the elements included in the drawings described in the first exemplary embodiment, the second exemplary embodiment, and the third exemplary embodiment described above. A characteristic configuration of this exemplary embodiment will be described.

The second relationship generation unit 440 receives the classification result of an area of change and the position information of the area of change from the second change detection unit 220. The second relationship generation unit 440 also receives the flow line data from the flow line data generation unit 320. Then, the second relationship generation unit 440 generates product-and-person relationship information by the same operation as in the first relationship generation unit 340 and supplies the generated relationship information to the relationship integration unit 250.

Thus, the second relationship generation unit 440 generates the relationship information by using the flow line data, similarly to the first relationship generation unit 340. The processes after the first relationship generation unit 340 and the second relationship generation unit 440 generate relationship information are the same as those described in the second exemplary embodiment. Therefore, detailed description is omitted.

The above is an example of the characteristic configuration of the image processing device 400.

Figure 27:
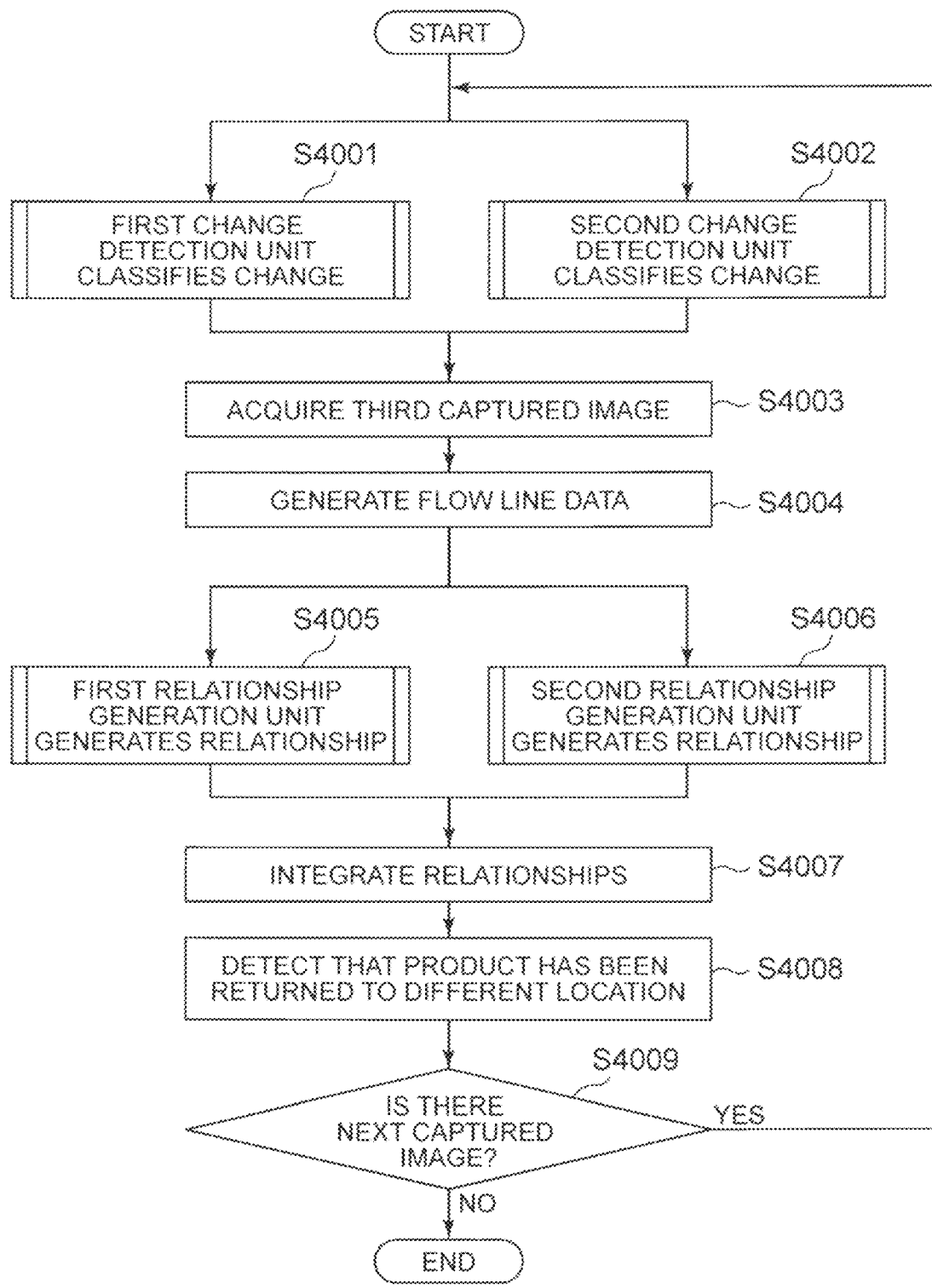
FIG. 27 It depicts a flowchart illustrating an example of operation of an image processing device 400 of a fourth exemplary embodiment.

Subsequently, the operation of the image processing device 400 of this exemplary embodiment will be described with reference to FIG. 27. FIG. 27 is a flow chart illustrating an example of operation of the image processing device 400 of this exemplary embodiment.

Referring to FIG. 27, the image processing device 400 performs the same processes as in steps S1001 to S1008 illustrated in FIG. 11, whereby the first change detection unit 120 classifies changes (step S4001). Similarly, the second change detection unit 220 classifies changes (step S4002).

The third acquisition unit 310 acquires a captured image (third captured image), which is an RGB image, from a video signal sent from the imaging device 5 that has imaged the aisle in the store (step S4003). The third acquisition unit 310 supplies the captured image, which has been acquired, to the flow line data generation unit 320.

The flow line data generation unit 320 generates flow line data of a person in the store by using an RGB image captured by at least one imaging device (step S4004). Then, the flow line data generation unit 320 associates the generated flow line data with the time of the captured image of the flow line data and supplies them to the first relationship generation unit 340.

The processes of steps S4003 and S4004 are the same as the processes of steps S3002 and S3003 described in the third exemplary embodiment. Note that the order of performing the processes of steps S4003 and S4004 may be interchanged with the order of performing the process of step S4001 or the process of step S4002, or alternatively, the processes of both may be performed simultaneously.

The first relationship generation unit 340 generates relationship information by using the flow line data (step S4005). The second relationship generation unit 440 also uses the flow line data to generate relationship information (step S4006).

The process of step S4005 and the process of step S4006 are the same as the process of step S3004 described in the third exemplary embodiment. Either the process of step S4005 or the process of step S4006 may be performed first, or both may be performed simultaneously.

Thereafter, the image processing device 400 performs the processes of steps S4007 to S4009, which are the same processes as those of steps S1010 to S1012 illustrated in FIG. 11.

As described above, the image processing device 400 of this exemplary embodiment includes the second relationship generation unit 440, instead of the second relationship generation unit 240 of the image processing device 200 of the second exemplary embodiment. Further, the image processing device 400 includes the third acquisition unit 310 and the flow line data generation unit 320. Therefore, the image processing device 400 of the exemplary embodiment is able to reduce a sales opportunity loss, a product disposal loss, and the like, which will be caused by a defective product display, over a wide area in the store similarly to the image processing device 200 of the second exemplary embodiment described above. Furthermore, the image processing device 400 is able to integrate the product-and-person relationship information with high accuracy, similarly to the image processing device 300 of the third exemplary embodiment described above. The ability to integrate the relationship information with high accuracy improves the accuracy of detecting that a product has been returned to a different location than the location from which the product was taken. Therefore, the use of the image processing device 400 of this exemplary embodiment enables a reduction in a sales opportunity loss, a product disposal loss, or the like, which will be caused by a defective product display, in comparison with the image processing device 200.

Exemplary Embodiment 5

Subsequently, a fifth exemplary embodiment of the present invention will be described. The fifth exemplary embodiment describes an image processing device 500 including an informing unit 510, in addition to the configuration of the image processing device 100 described in the first exemplary embodiment. The informing unit 510, which is included in the image processing device 500, is able to inform a store worker or the like that a product has been returned to a different location than the location from which the product was taken, for example, when it is detected by a display detection unit 160.

The image processing device 500 of this exemplary embodiment is communicatively connected to a terminal 10, an imaging device 2, a shopping list management device 20, an output device 30, a payment device 40, and a person identification device 50, similarly to the image processing device 100 illustrated in FIG. 1 and described in the first exemplary embodiment.

Figure 28:
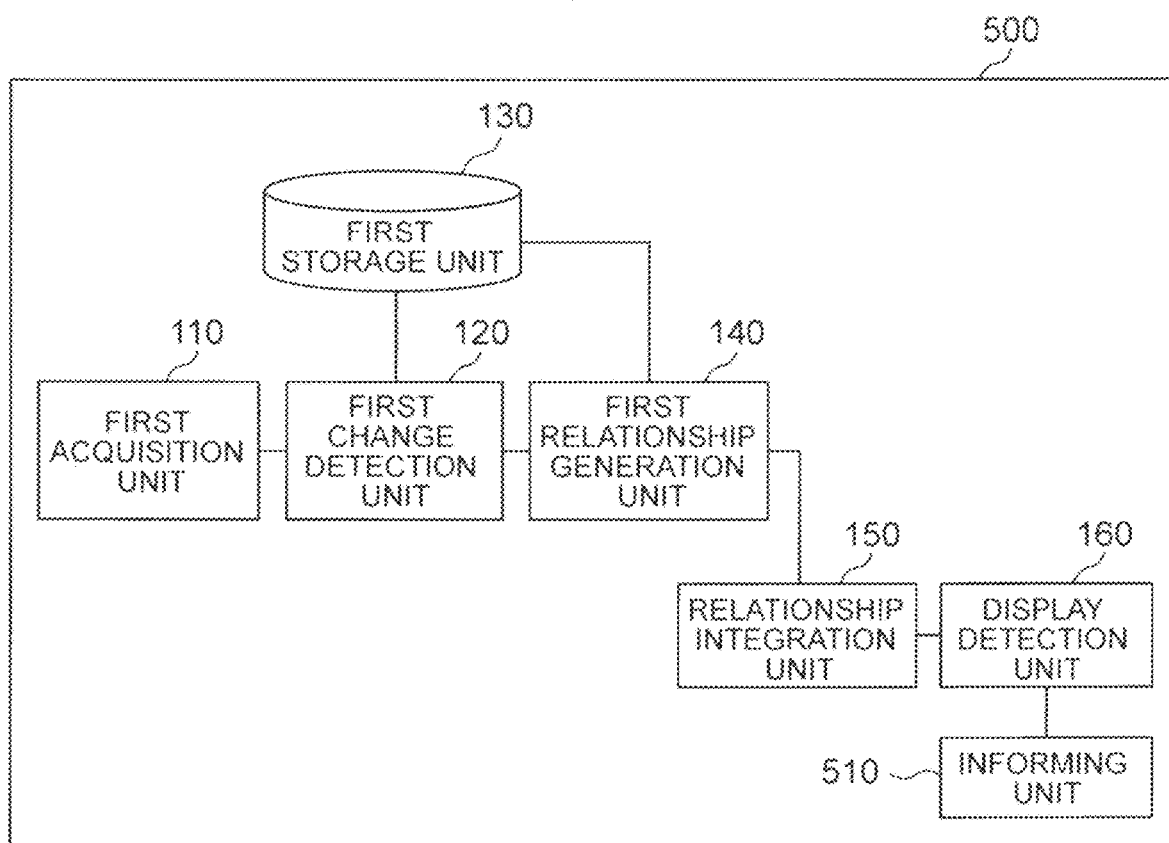
FIG. 28 It depicts an explanatory diagram illustrating a configuration example of an image processing device 500.

FIG. 28 is an explanatory diagram illustrating a configuration example of the image processing device 500. The image processing device 500 of the exemplary embodiment includes a first acquisition unit 110, a first change detection unit 120, a first storage unit 130, a first relationship generation unit 140, a relationship integration unit 150, a display detection unit 160, and an informing unit 510. As described above, the image processing device 500 of this exemplary embodiment has the configuration included in the image processing device 100 described in the first exemplary embodiment and also includes the informing unit 510.

In the above, the same reference numerals are given to the elements having the same functions as the elements included in the drawings described in the first, second, third, and fourth exemplary embodiments described above. The characteristic configuration of this exemplary embodiment will be described below.

The display detection unit 160 receives the integrated relationship information from the relationship integration unit 150 and compares the location where the product was acquired with the location to which the product has been returned to detect that the product has been returned to a different location than the location from which the product was taken. The display detection unit 160 supplies a signal indicating, for example, the detection result to the informing unit 510. The signal indicating the detection result may be 1 if it is detected that the product has been returned to a different location than the location from which the product was taken and may be 0 unless it is detected that the product has been returned to a different location than the location from which the product was taken.

The informing unit 510 receives the detection result from the display detection unit 160. Then, if the received detection result is a signal indicating that the product has been returned to a different location than the location from which the product was taken, the informing unit 510 informs, for example, the terminal (not illustrated) carried by a store worker that it is detected that a product has been returned to a different location than the location from which the product was taken. Moreover, if the received detection result is a signal indicating that the product has been returned to a different location than the location from which the product was taken, the informing unit 510 may inform, for example, a POS (point of sales) terminal in the store that it is detected that a product has been returned to a different location than the location from which the product was taken. In this case, the informing unit 510 may also inform a headquarters computer that it is detected that a product has been returned to a different location than the location from which the product was taken. In addition, if the received detection result is a signal indicating that a product has been returned to a different location than the location from which the product was taken, the informing unit 510 may store a fact that it is detected that a product has been returned to a different location than the location from which the product was taken into a storage medium installed in the store or in the headquarters. Furthermore, the informing unit 510 may inform a predetermined lamp (not illustrated) or the like that it is detected that a product has been returned to a different location than the location from which the product was taken.

The informing unit 510 performs informing with one of the above examples or a combination of two or more examples. The informing unit 510 is implemented by, for example, the CPU of a computer operating according to a program.

The above is an example of a characteristic configuration of the image processing device 500.

Figure 29:
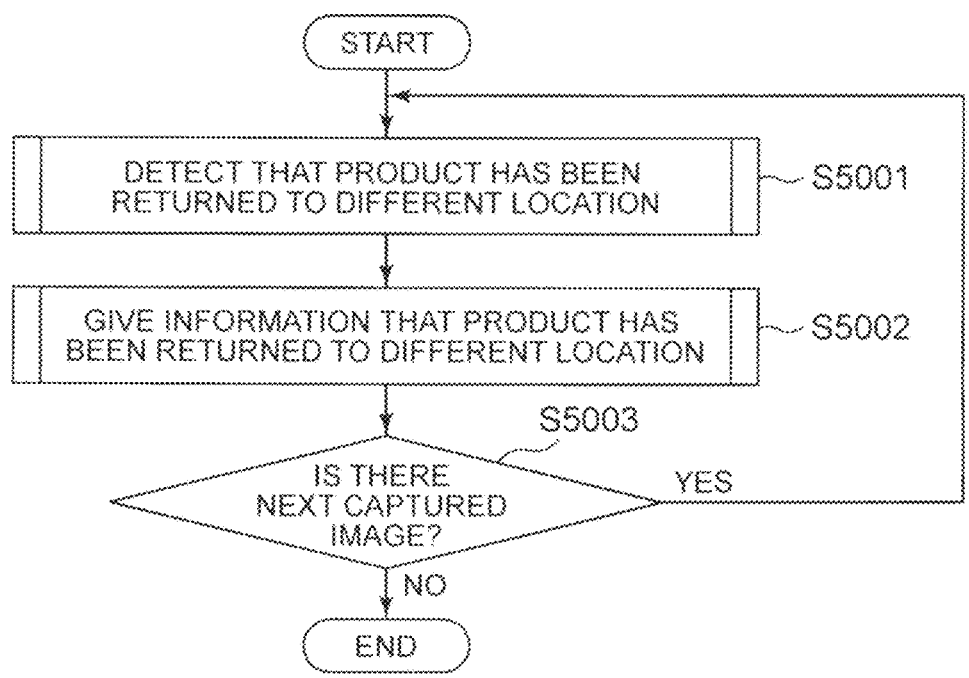
FIG. 29 It depicts a flowchart illustrating an example of operation of an image processing device 500 of a fifth exemplary embodiment.

Subsequently, description will be made on an example of operation of the image processing device 500 of the exemplary embodiment, with reference to FIG. 29. FIG. 29 is a flowchart illustrating an example of operation of the image processing device 500.

Referring to FIG. 29, the image processing device 300 performs the same processes as those of steps S1001 to S1011 illustrated in FIG. 11, by which the display detection unit 160 detects that a product has been returned to a different location than the location from which the product was taken (step S5001). The display detection unit 160 supplies, for example, the signal indicating the detection result to the informing unit 510.

After the end of step S5011, the informing unit 510 receives the detection result from the display detection unit 160. If the received detection result is a signal indicating that a product has been returned to a different location than the location from which the product was taken, the informing unit 510 informs the terminal carried by a store worker of the detection (step S5002).

Then, the image processing device 500 performs step S5003, which is the same process as step S1012 illustrated in FIG. 11.

As described above, the image processing device 500 of this exemplary embodiment has a configuration in which the informing unit 510 is added to the image processing device 100. With this configuration, it is possible to promptly inform a store worker that a product has been returned to a different location than the location from which the product was taken, when the product has been returned to the different location. This enables a reduction in a sales opportunity loss or a product disposal loss caused by a defective product display.

The informing unit 510 may be configured to hold the timing of informing in the case where the situation in the store satisfies predetermined conditions.

The informing unit 510 may be configured to determine whether to put the informing on hold, for example, depending on the customer's stay situation in the store. The informing unit 510 may put the informing on hold while it can be determined that there are customers lined up at the cash register (a predetermined number or more of customers lined up) on the basis of the captured image acquired by, for example, the imaging device 2 or the like. Furthermore, the informing unit 510 may put the informing on hold, for example, on the basis of the captured image acquired by the imaging device 2 or the like, while it is determined that a customer stays in front of the product shelf 3, which is a work target, for which it is detected that a product has been returned to a different location than the location from which the product was taken. Moreover, in the case where the image processing device 500 is able to acquire flow line data, the informing unit 510 may put the informing on hold if it is determined that a customer is coming to the front of the product shelf 3, which is a work target, for which it is detected that a product has been returned to a different location than the location from which the product was taken, for example, on the basis of the flow line data. Thus, the informing unit 510 may put the informing on hold if the customer's stay situation such as the number of customers present in the store or the location of the customer satisfies the predetermined conditions. Note that the informing unit

510 may perform the informing if there is no reason to put the informing on hold or if the reason is eliminated.

The informing unit 510 may determine the urgency of the informing on the basis of the product shelf 3 to which the product has been returned, the type and property of the product returned to the different location, a relationship between the product returned to the different location and the product shelf 3 to which the product has been returned, and the like and may control the timing of informing on the basis of the urgency of the informing. For example, if fresh foods, frozen foods, ice cream, and the like have been returned to non-frozen or non-refrigerated corners, it is assumed that its influence will grow unless the informing is immediately performed. Furthermore, in the case where the relationship between the product and the product shelf 3 to which the product has been returned is unfavorably predetermined such as, for example, in the case where non-food such as detergent is returned to the corner of fresh foods, it is desirable to correct it promptly. If it is determined that the need for the informing is urgent according to the type or the like of the product that has been returned to a different location, the informing unit 510 may immediately perform the informing. In other words, if there is an urgency in the need for the informing as described above, for example, even if the conditions for holding as described above are satisfied, the informing unit 510 performs the informing without putting it on hold. On the other hand, if there is no urgency described above, the informing unit 510 may put the informing on hold until the conditions for holding are not satisfied. In this manner, the informing unit 510 may acquire information indicating the urgency of informing and control the timing of informing on the basis of the acquired information. The type and property of the product that has been returned to a different location than the location from which the product was taken, such as a fresh food or a frozen food and the like, may be determined on the basis of the first attention image or the like by, for example, the area change classification unit 126, the first extraction unit 124, or the like. Regarding the type and property of the product, for example, the display detection unit 160 may detect that the product has been returned to a different location than the location from which the product was taken, and then a captured image may be acquired from the information (identifier, imaging time, and the like) related to the captured image given to the relationship information to determine the type and property of the product on the basis of the acquired captured image.

As described above, the informing unit 510 determines the urgency according to the customer's stay situation in the store and the type and property or the like of the product and then controls the timing of informing according to the urgency of the informing. At that time, the informing unit 510 may control the timing of informing on the basis of information other than the above examples.

In this exemplary embodiment, there has been described the case where the image processing device 100 described in the first exemplary embodiment includes the informing unit 510. Any of the above-described image processing units other than the image processing device 100, however, may include the informing unit 510. For example, the image processing device 200 described in the second exemplary embodiment, the image processing device 300 described in the third exemplary embodiment, or the image processing device 400 described in the fourth exemplary embodiment may include the informing unit 510. In the case where the image processing device 200, the image processing device 300, or the image processing device 400 includes the informing unit 510, the processing performed by the informing unit 510 is the same as in the case where the image processing device 100 includes the informing unit 510. In any of the above cases, various modifications described in this exemplary embodiment can be adopted.

<Modification of Foreground Area Detection Unit>

Subsequently, description will be made on a modification of the processing of the foreground area detection unit included in the first change detection unit 120 or in the second change detection unit 220 in the image processing device of each exemplary embodiment described above.

In this modification, the foreground area detection unit included in the first change detection unit 120 or in the second change detection unit 220 further uses pre-registered shelf area information to specify that the physical objects included in the area of change are those other than products in the product shelf 3.

In this modification, description will be made on a modification of the foreground area detection unit 121 of the image processing device 100 in the first exemplary embodiment. This modification, however, is applicable to any of the image processing device 200, the image processing device 300, the image processing device 400, the image processing device 500, and a device other than the image processing device 100 including the informing unit 510.

Figure 30:
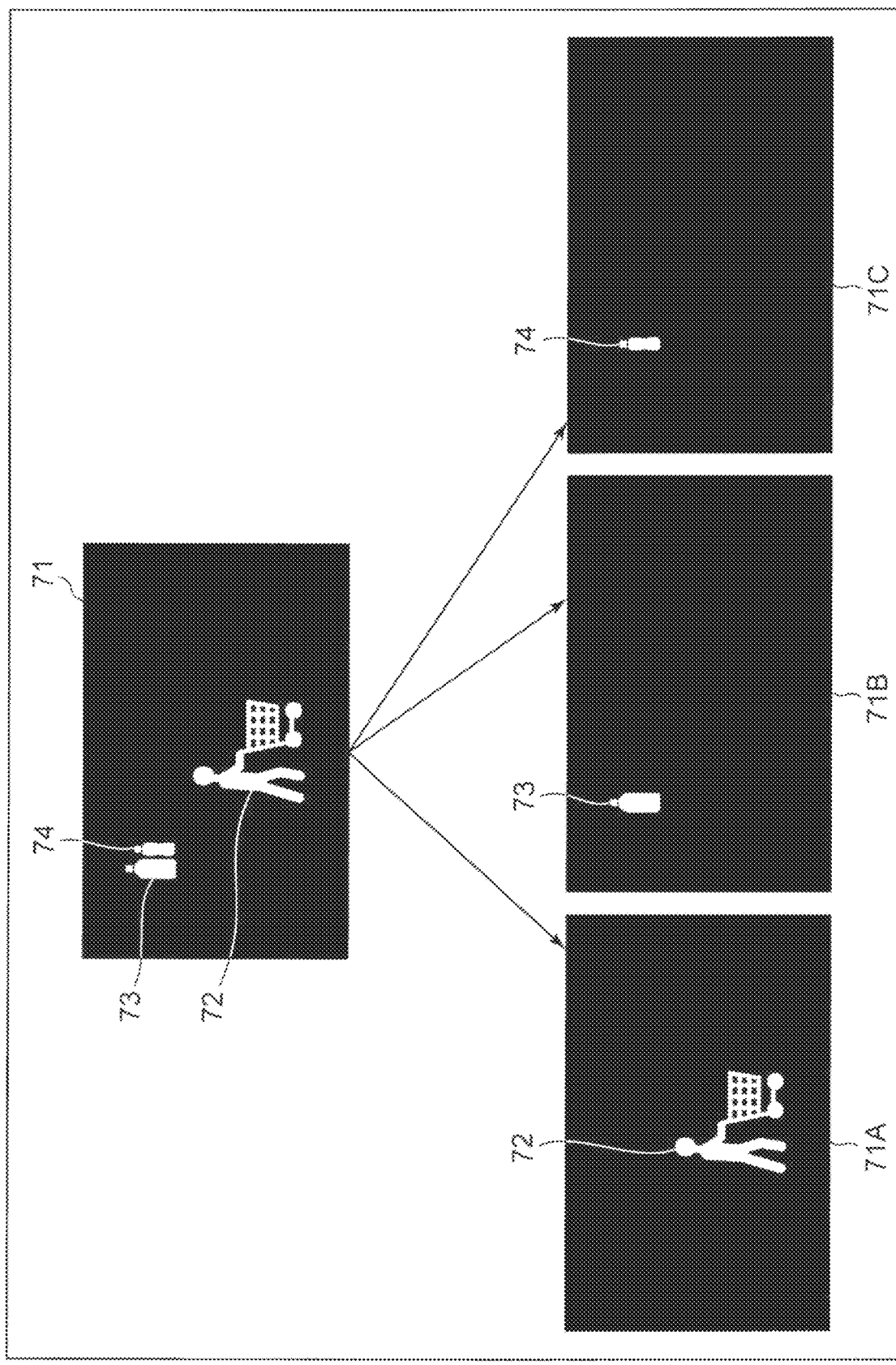
FIG. 30 It depicts an explanatory diagram illustrating an example of operation of detecting a foreground area.
Figure 31:
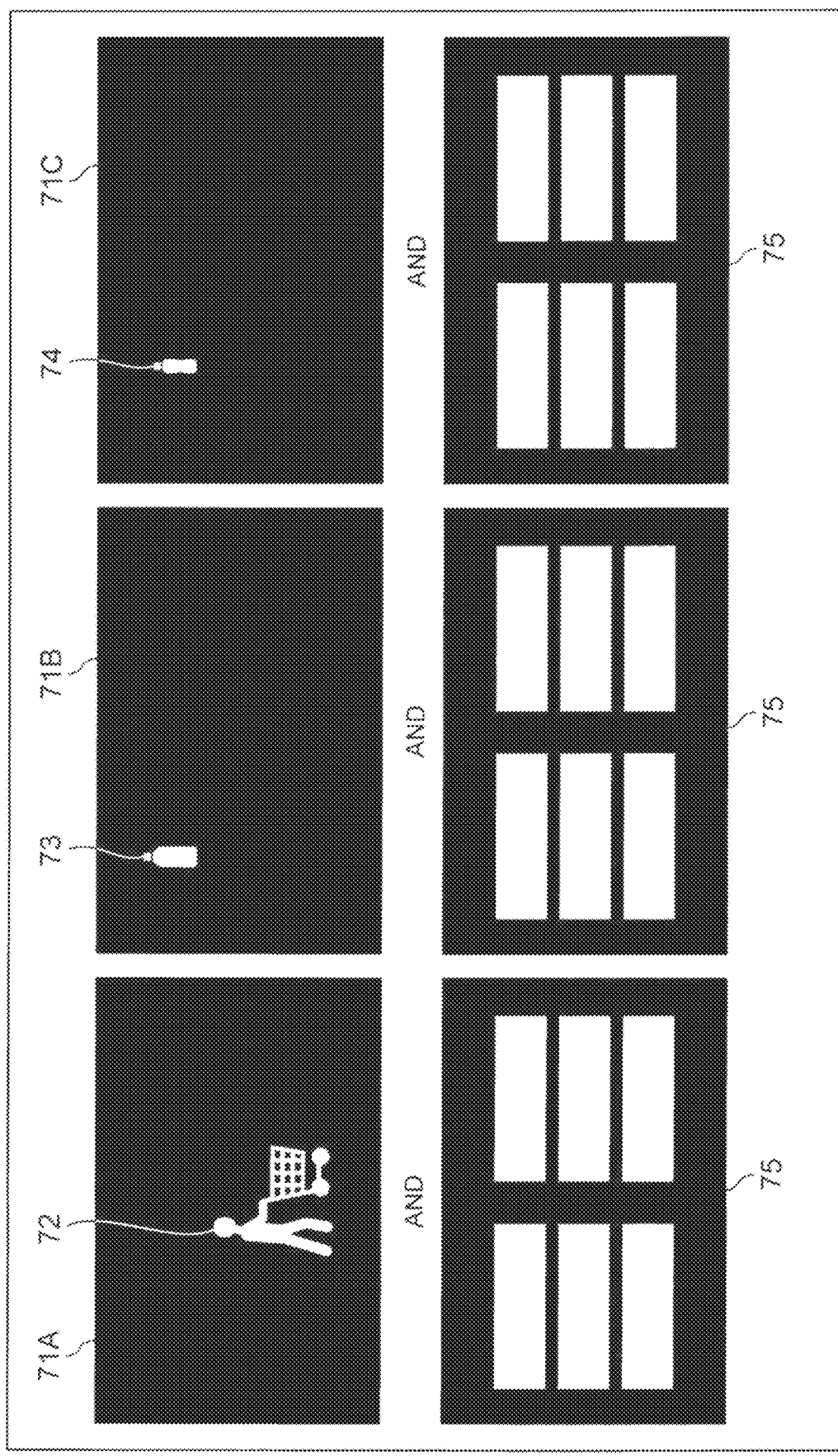
FIG. 31 It depicts an explanatory diagram illustrating an example of operation of detecting a foreground area.
Figure 32:
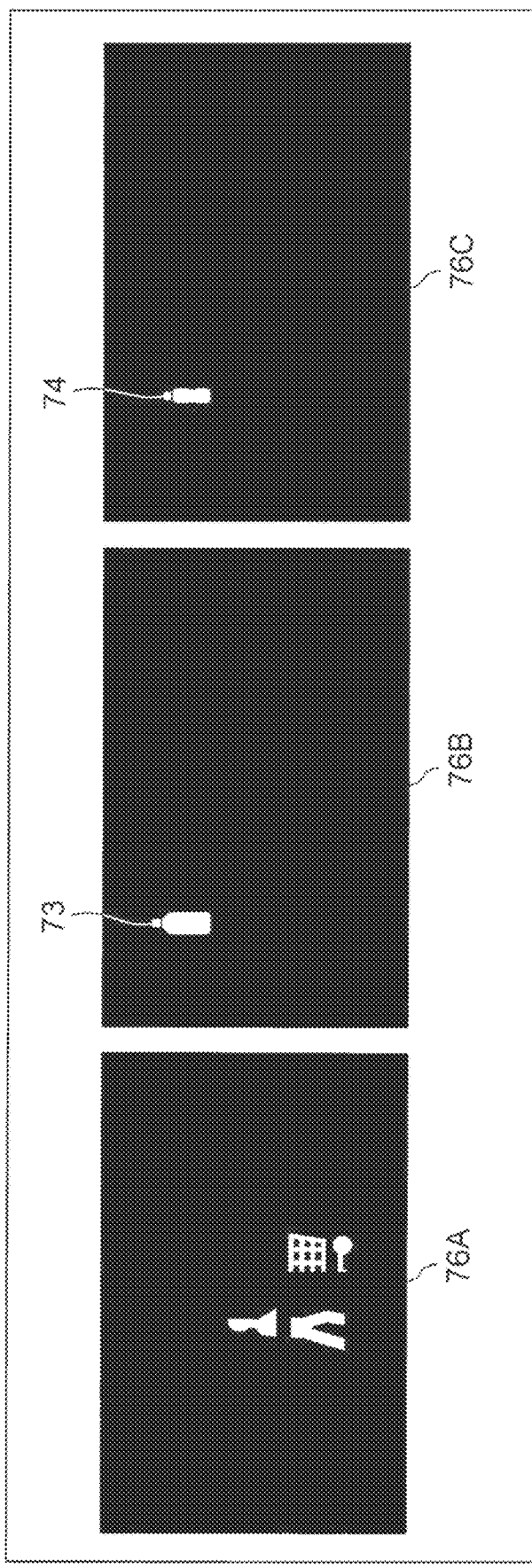
FIG. 32 It depicts an explanatory diagram illustrating an example of operation of detecting a foreground area.

FIGS. 30, 31 and 32 are explanatory diagrams each illustrating an example of operation in which the foreground area detection unit 121 in this modification detects the foreground area.

It is supposed that the foreground area detection unit 121, for example, detects the area of change by comparing the captured image supplied from the first acquisition unit 110 with the background information 131 and generates a detection result 71, which is a binary image indicating the area of change illustrated in FIG. 30. It is assumed that this detection result includes three areas of change, namely, an area of change 72, an area of change 73, and an area of change 74. In such a case, the foreground area detection unit 121 generates a detection result 71A, a detection result 71B, and a detection result 71C, which are separate binary images for the respective areas of change, by a general labeling method with respect to the detection result 71.

In other words, in the case where the detection result includes a plurality of areas of change, the foreground area detection unit 121 generates a plurality of binary images in which each area of change is included in each separate binary image.

Then, the foreground area detection unit 121 determines whether the area of change is the area in which the change related to the change of a product is detected, on the basis of the pre-registered shelf area information and each of the plurality of binary images, where the shelf area information indicates the area in which the product on the product shelf 3 is displayed.

The self-checkout system 1 is monitoring products on the product shelf 3. Therefore, the area where the products are displayed, which is indicated by the shelf area information, can be referred to as "monitored area." Moreover, the shelf area information can also be referred to as "monitored area information." The shelf area information is, for example, an image having the same size as the captured image acquired by the first acquisition unit 110, and may be a binary image with the pixel value of 255 for the monitored area of the product shelf 3 to be monitored and with the pixel value of 0 for others. Furthermore, the number of monitored areas included in the shelf area information may be, for example, one or more. The shelf area information may be stored, for example, in the first storage unit 130 in advance. The shelf area information includes information that specifies the product shelf 3 included in the captured image acquired by the first acquisition unit 110.

The foreground area detection unit 121 performs an AND operation for each corresponding pixel by using the shelf area information related to the product shelf 3 included in the captured image acquired by the first acquisition unit 110. For example, in the case of using the shelf area information 75 illustrated in FIG. 31, the foreground area detection unit 121 performs an AND operation for each corresponding pixel with the detection result 71A, the detection result 71B, or the detection result 71C. In the example illustrated in FIG. 31, a monitored area in the shelf area information 75 is expressed in white, and therefore the shelf area information 75 includes six monitored areas.

A calculation result 76A illustrated in FIG. 32 is a result of the AND operation between the shelf area information 75 and the detection result 71A. Moreover, a calculation result 76B is a result of the AND operation between the shelf area information 75 and the detection result 71B. Furthermore, a calculation result 76C is a result of the AND operation between the shelf area information 75 and the detection result 71C.

Objects other than products such as persons or carts span the areas of a plurality of shelves. Therefore, as a result of the AND operation between the detection result 71A and the shelf area information 75, the part with the pixel value of 255 (white part) that represents an area of change is divided into a plurality of areas, as in the calculation result 76A illustrated on the left side of FIG. 32. On the other hand, the parts (white parts) that represent the areas of change in the calculation result 76B and the calculation result 76C are the same as those in the detection result 71B and the detection result 71C, respectively, and each of the parts is a continuous area (a set of pixels with a pixel value of 255 and with any of the pixels adjacent to those pixels having a pixel value of 255).

The products displayed in the display area (monitored area) of the product shelf 3 do not span the plurality of monitored areas. Therefore, if the area of change is divided into a plurality of areas as in the calculation result 76A, the foreground area detection unit 121 determines that the change in this area of change is a change of an object other than a product. In such a case, the foreground area detection unit 121 does not add this change on the detection result supplied to the foreground area tracking unit 123. In other words, the foreground area detection unit 121 supplies the detection result 71B and the detection result 71C to the foreground area tracking unit 123.

With this configuration, the foreground area tracking unit 123 is able to supply the changes in the products displayed on the product shelf 3 to the first extraction unit 124 and to the second extraction unit 125. In other words, the area change classification unit 126 is able to perform the classifying process of changes in the products displayed on the product shelf 3, thereby preventing a reduction in the accuracy of classifying the changes in the products, which may be caused by an influence of an object other than the products. Moreover, the foreground area detection unit 121 is able to classify the change in the area of change as a change in an object other than the product before the classification process is performed by the area change classification unit 126, thereby enabling a reduction in the amount of throughput of the area change classification unit 126.

Subsequently, a concrete example of the present invention will be described. In a first concrete example, there is described an example of operation of the self-checkout system in the case where a customer carries the terminal 10. In the second concrete example, there is described an example of operation of the self-checkout system in the case where a customer does not carry the terminal 10.

Figure 33:
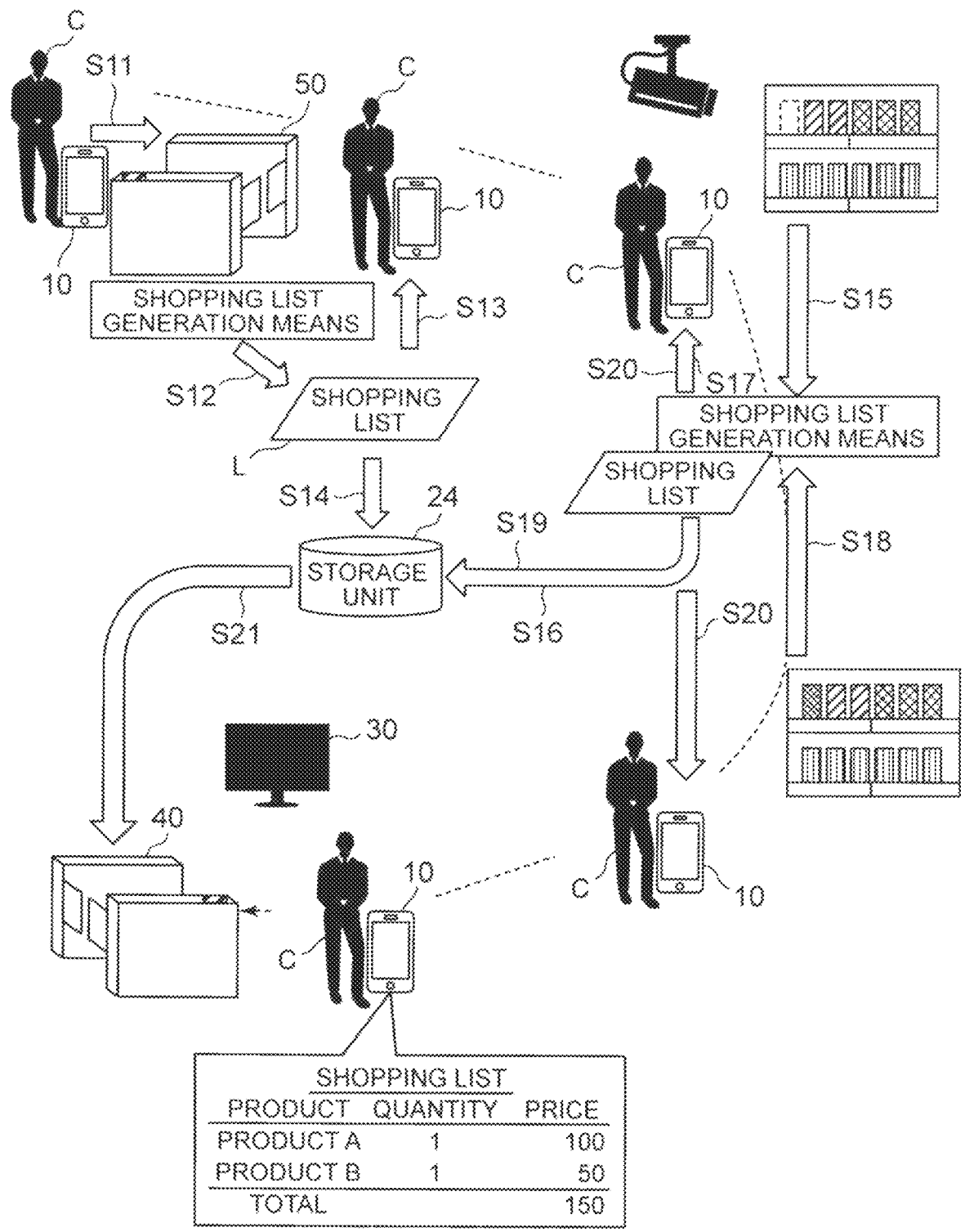
FIG. 33 It depicts an explanatory diagram illustrating an example of operation of a self-checkout system in a first concrete example.

FIG. 33 is an explanatory diagram illustrating an example of operation of the self-checkout system in the first concrete example. First, when a customer C visits the store, the person identification device 50 identifies the person via the terminal 10 carried by the customer (step S11). Thereafter, the person is uniquely managed with the identification ID that identifies the terminal 10. Further, a shopping list generation means (the shopping list generation unit 21 in the exemplary embodiment) generates a shopping list L corresponding to the identification ID (step S12). A notification unit 23 sends the generated shopping list L to the terminal 10 (step S13). Furthermore, the notification unit 23 stores the generated shopping list L in the shopping list storage unit 24 (step S14).

Thereafter, a change detection means (the first change detection unit 120 in the exemplary embodiment) detects a change in the display state of the product on the basis of the captured image of the product (step S15). A shopping list generation means (the shopping list updating unit 22 in the exemplary embodiment) specifies the product on the basis of the shelving information on the product shelf and performs a registration process for registering the specified product on the shopping list L corresponding to the person (step S16). The notification unit 23 notifies the terminal 10 of the contents of the shopping list L on which the product is registered (step S17).

Furthermore, the rearrangement detection means (the display detection unit 160 in the exemplary embodiment) detects that the product has been returned to a different location than the location from which the product was taken, on the basis of the change in the display state of the product detected by the change detection means and of the person included in the captured image or the person whose in-store flow line has been detected (step S18). The method of detecting the flow line is arbitrary, and therefore it may be a method in which the imaging device 2 described above detects the person, a method in which the imaging device 5 detects the flow line, or a method in which the flow line detection device 6 detects the flow line. Further, in this case, the shopping list generation means (the shopping list updating unit 22 in the exemplary embodiment) performs a deletion process for deleting the product that has been returned to a different location than the location from which the product was taken from the shopping list L corresponding to the person, on the basis of the detection result and the shelving information (step S19). The notification unit 23 notifies the terminal 10 of the contents of the shopping list L from which the product was deleted (step S20). The notification unit 23 may notify the terminal 10 of the shopping list L in which a deletion flag is set to the product.

When the customer is to leave the store, the payment device 40 performs a payment process on the basis of the contents of the shopping list L corresponding to the person (step S21). At this time, the output device 30 may display the contents of the shopping list L.

Figure 34:
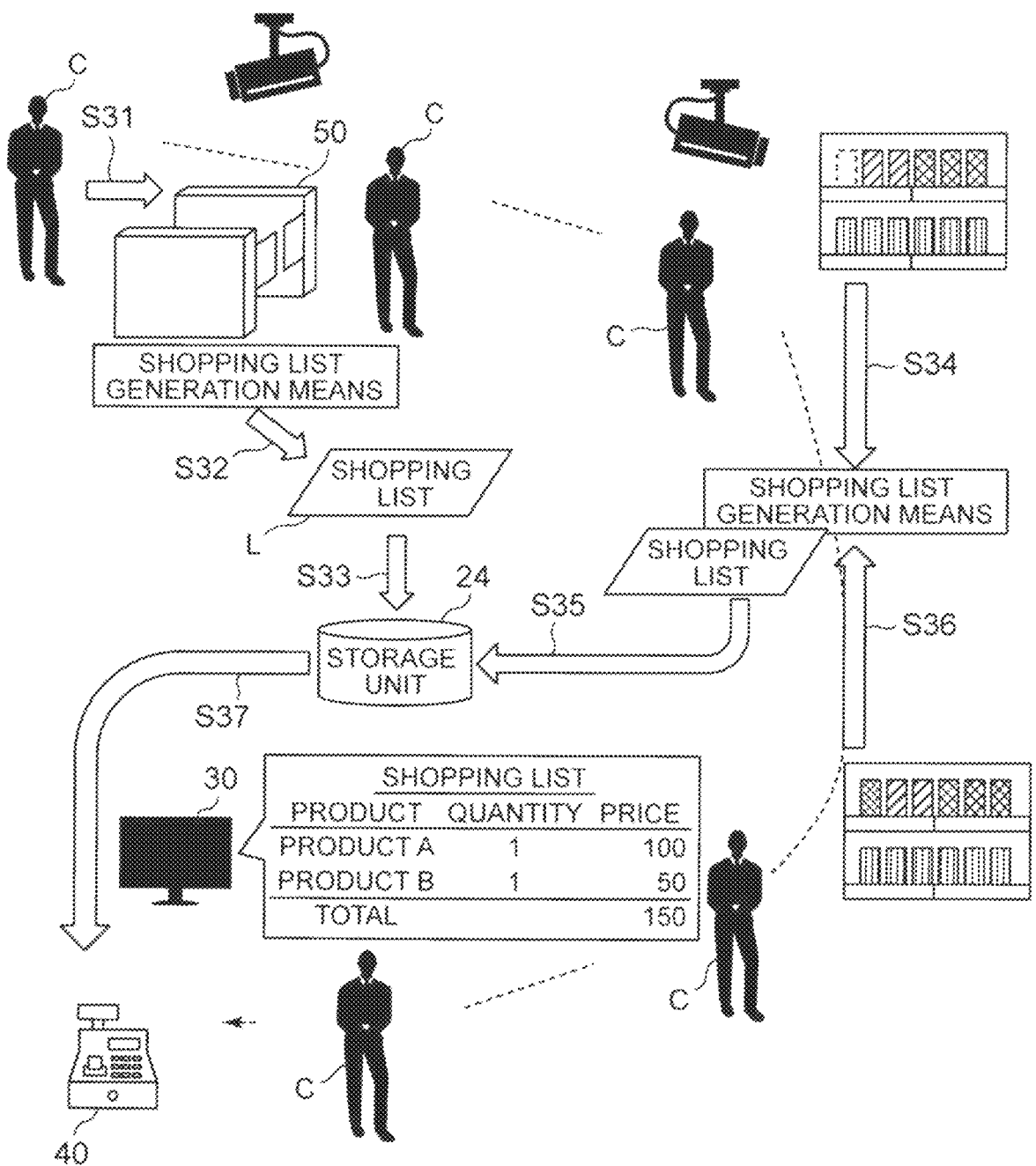
FIG. 34 It depicts an explanatory diagram illustrating an example of operation of a self-checkout system in a second concrete example.

FIG. 34 is an explanatory diagram illustrating an example of operation of a self-checkout system in the second concrete example. First, when a customer visits the store, the person identification device 50 identifies a person C from an image captured by the imaging device 2 (step S31). Thereafter, the person is uniquely identified with the identification ID that identifies the person. Further, a shopping list generation means (the shopping list generation unit 21 in the exemplary embodiment) generates the shopping list L corresponding to the identification ID (step S32). Moreover, the notification unit 23 stores the generated shopping list L in the shopping list storage unit 24 (step S33).

Thereafter, in the same manner as the first concrete example, a change detection means (the first change detection unit 120 in the exemplary embodiment) detects the change in the display state of the product on the basis of the captured image of the product (step S34). A shopping list generation means (the shopping list updating unit 22 in the exemplary embodiment) specifies the product on the basis of the shelving information on the product shelf and performs a registration process for registering the specified product on the shopping list that corresponds to the person (step S35). Specifically, the shopping list generation means adds the product to the shopping list L stored in the shopping list storage unit 24.

Furthermore, similarly to the first concrete example, a shopping list generation means (the shopping list updating unit 22 in the exemplary embodiment) performs a deletion process for deleting the product that has been returned to a different location than the location from which the product was taken from the shopping list L corresponding to the person (step S36). Specifically, the shopping list generation means deletes the product from the shopping list L stored in the shopping list storage unit 24.

When the customer is to leave the store, the payment device 40 performs a payment process on the basis of the contents of the shopping list L corresponding to the person C (step S37). Specifically, the output device 30 displays the contents of the shopping list and the total amount, and the payment device 40 performs a payment process based on a deposit or a card payment from the person.

<About Hardware Configuration>

Figure 35:
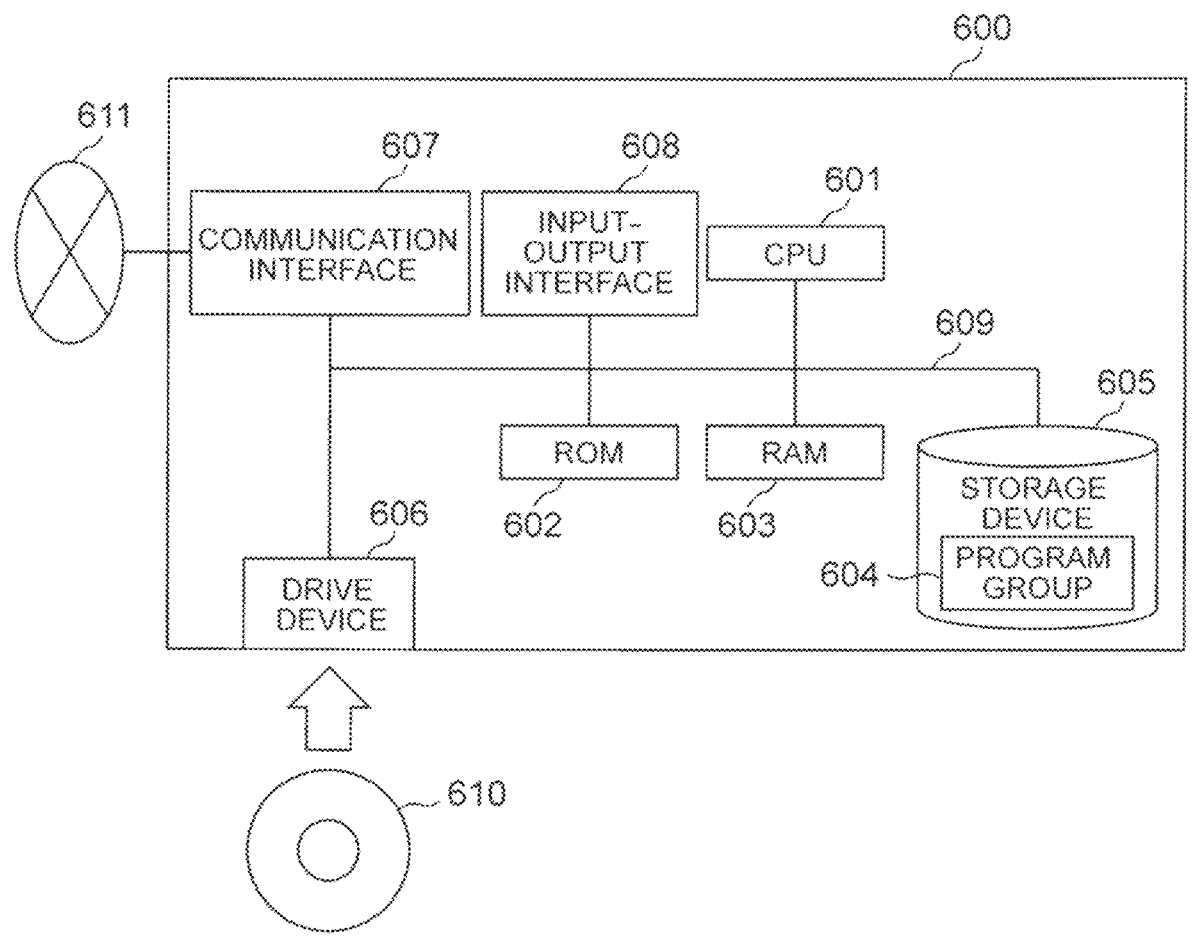
FIG. 35 It depicts a block diagram illustrating a hardware configuration example of an information processing device for implementing constituent elements of each device.

In each of the exemplary embodiments described above, the constituent elements of each device (more specifically, each of the image processing devices 100 to 500 and the shopping list management device 20) are blocks of, for example, functional units. Some or all of the constituent elements of each device are implemented by an arbitrary combination of the information processing device 600 and a program illustrated in FIG. 35. FIG. 35 illustrates a block diagram representing a hardware configuration example of the information processing device 600 that implements the constituent elements of each device. The information processing device 600 includes, for example, the following components.

Central processing unit (CPU) 601
Read only memory (ROM) 602
Random access memory (RAM) 603
Program group 604 loaded in RAM 603
Storage device 605 that stores program group 604
Drive device 606 that reads and writes data on recording medium 610 outside information processing device 600
Communication interface 607 connected to communication network 611 outside information processing device 600
Input-output interface 608 that inputs and outputs data
Bus 609 that connects components The constituent elements of each device in each of the above exemplary embodiments are implemented by the CPU 601 acquiring and executing the program group 604 that implements these functions. The program group 604 that implements the functions of the constituent elements of each device is stored in advance in the storage device 605 or the ROM 602, for example, and the CPU 601 loads the program group 604 in the RAM 603 and executes it, as necessary. The program group 604 may be supplied to the CPU 601 via the communication network 611 or, alternatively, may be stored in the recoding medium 610 in advance, and the drive device 606 may read the program and supply it to the CPU 601.

There are various modifications for the methods of implementing each device. Each device may be implemented by an arbitrary combination of the information processing device 600 and a program, which are separate for each constituent element. Moreover, a plurality of constituent elements included in each device may be implemented by an arbitrary combination of one information processing device 600 and a program.

Further, some or all of the constituent elements of each image processing device can be implemented by other general-purpose or dedicated circuits, processors, or the like or a combination thereof. These may be configured by a single chip, or may be configured by a plurality of chips connected via a bus.

Some or all of the constituent elements of each device may be implemented by a combination of the above-described circuits or the like and a program.

In the case where some or all of the constituent elements of each device are implemented by a plurality of information processing devices, circuits, or the like, the plurality of information processing devices, circuits, or the like may be centrally arranged or distributed. For example, the information processing devices, circuits, and the like may be implemented in a form such as a client and server system, a cloud computing system, or the like, in which the information processing devices, circuits, and the like are connected to each other via a communication network.

Figure 36:
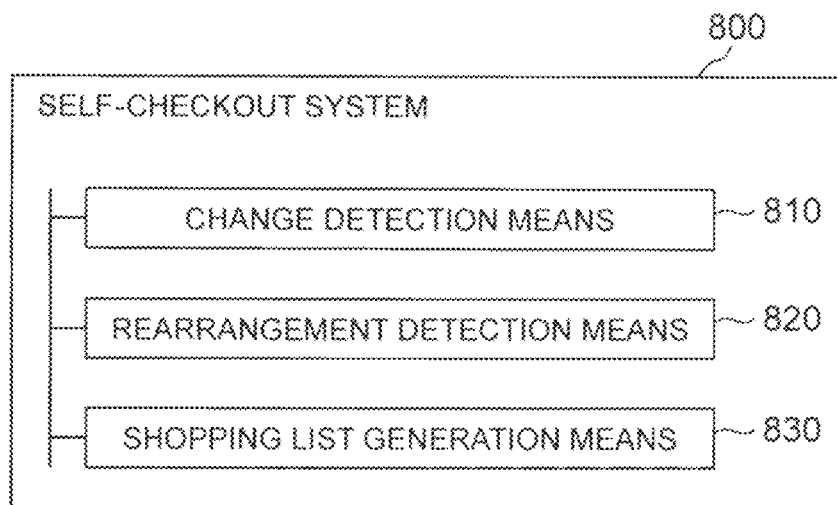
FIG. 36 It depicts a block diagram illustrating the outline of a self-checkout system according to the present invention.

Subsequently, an outline of the present invention will be described. FIG. 36 is a block diagram illustrating the outline of a self-checkout system according to the present invention. A self-checkout system 800 (for example, the self-checkout system 1) according to the present invention includes: a change detection means 810 (for example, the first change detection unit 120) for detecting a change in a display state of a product on the basis of a captured image of the product; a rearrangement detection means 820 (for example, the display detection unit 160) for detecting that the product has been returned to a different location than the location from which the product was taken on the basis of the change in the display state of the product detected by the change detection means 810 and a person included in the captured image or a person whose in-store flow line has been detected; and a shopping list generation means 830 (for example, the shopping list updating unit 22) for specifying the product for which there has been detected a change in the display state that is a result of the person having picked up the product on the basis of shelving information on a product shelf on which the product has been arranged, for performing a registration process (for example, the product registration) for registering the specified product on a shopping list corresponding to the person, and for performing a deletion process (for example, the product deletion, delete flag setting, and the like) for deleting the product, which has been returned to the different location than the location from which the product was taken, from the shopping list that corresponds to the person, on the basis of a result of detection by the rearrangement detection means 820 (specifically, a fact that the product has been returned to a different location than the location from which the product was taken) and the shelving information.

With such a configuration, even in the case where a product has been returned to a different location than the location from which the product was taken, the product purchased by a customer can be properly managed.

The self-checkout system 800 may include an association means (for example, the first relationship generation unit 140 and the relationship integration unit 150) for associating the change in the display state of the product detected by the change detection means 810 with the person included in the captured image. In addition, the rearrangement detection means 820 may detect that the product has been returned to a different location than the location from which the product was taken on the basis of a result of the association by the association means.

Moreover, the self-checkout system 800 may include a notification means (for example, the notification unit 23) for notifying the person that corresponds to the shopping list of the state of the shopping list. Furthermore, the shopping list generation means 830 may set a delete flag to identify the product that has been returned to a different location than the location from which the product was taken to a target product included in the shopping list as a deletion process, and the notification means may notify the person (for example, the terminal 10 carried by the person) of the product with the delete flag set.

Specifically, the shopping list may be associated with a device (for example, the terminal 10) carried by the person. In addition, the notification means may notify the device of the product with the delete flag set.

This configuration prevents an unapproved product from being paid for.

Furthermore, the shopping list generation means 830 may receive an instruction indicating whether to delete the product with the delete flag set via a device (for example, the terminal 10) carried by the notified person and may delete the product from the shopping list in the case of receiving an instruction for deleting the product.

Moreover, the shopping list generation means 830 may stop a payment process based on the shopping list in the case where the shopping list includes a product with the delete flag set.

Moreover, the rearrangement detection means 820 may detect that a product has been returned to a different location than the location from which the product was taken in the case where a change in one display state represents a decrease in products and a change in the other display state represents an increase in products and in the case where the shape of the area of the change is the same between the change in one display state and the change in the other display state and the area of the change is different in the position between them, with respect to the same person.

Moreover, the rearrangement detection means 820 may detect that the product has been returned to the same location in the case where products of the same type displayed in a plurality of locations are detected on the basis of the shelving information and even in the case where the product has been returned to a different location than the location from which the product was taken but the location is a location where the products of the same type are displayed.

On the other hand, the self-checkout system 800 may include a flow line detection means (for example, the flow line detection device 6) for detecting an in-store flow line of a person. In this situation, the rearrangement detection means 820 may detect that a product has been returned to a different location than the location from which the product was taken on the basis of the change in the display state of the product detected by the change detection means 810 and the flow line of the person detected by the flow line detection means. This configuration enables an increase in the accuracy of detecting that a product has been returned to a different location than the location from which the product was taken, thereby enabling a reduction in a sales opportunity loss, a product disposal loss, or the like caused by a defective product display.

Specifically, the flow line detection means may authenticate a person in a predetermined location in the store (for example, the entrance to the store) and follow the authenticated person (for example, via the near field communication or the like) to detect the flow line of the person, and the shopping list generation means 830 may generate a shopping list corresponding to the authenticated person when the authentication has been performed. According to the configuration, the person is able to be properly associated with the shopping list.

Although some or all of the above exemplary embodiments may also be described as in the following Supplementary notes, the present invention is not limited to the following.

(Supplementary note 1) A self-checkout system comprising: a change detection means for detecting a change in a display state of a product on the basis of a captured image of the product; a rearrangement detection means for detecting that the product has been returned to a different location than the location from which the product was taken on the basis of the change in the display state of the product detected by the change detection means and a person included in the captured image or a person whose in-store flow line has been detected; and a shopping list generation means for specifying the product for which there has been detected a change in the display state that is a result of the person having picked up the product on the basis of shelving information on a product shelf on which the product has been arranged, for performing a registration process for registering the specified product on a shopping list corresponding to the person, and for performing a deletion process for deleting the product, which has been returned to the different location than the location from which the product was taken, from the shopping list that corresponds to the person, on the basis of a result of detection by the rearrangement detection means and of the shelving information.

(Supplementary note 2) The self-checkout system according to Supplementary note 1, further comprising an association means for associating the change in the display state of the product detected by the change detection means with the person included in the captured image, wherein the rearrangement detection means detects that the product has been returned to the different location than the location from which the product was taken on the basis of a result of the association by the association means.

(Supplementary note 3) The self-checkout system according to Supplementary note 1 or 2, further comprising a notification means for notifying the person corresponding to the shopping list of the state of the shopping list, wherein the shopping list generation means sets a delete flag to identify the product that has been returned to a different location than the location from which the product was taken to a target product included in the shopping list as a deletion process, and wherein the notification means notifies the person of the product with the delete flag set.

(Supplementary note 4) The self-checkout system according to Supplementary note 3, wherein the shopping list is associated with a device carried by the person and wherein the notification means notifies the device of the product with the delete flag set.

(Supplementary note 5) The self-checkout system according to Supplementary note 4, wherein the shopping list generation means receives an instruction indicating whether to delete the product with the delete flag set via the device carried by the notified person and deletes the product from the shopping list in the case of receiving an instruction for deleting the product.

(Supplementary note 6) The self-checkout system according to any one of Supplementary notes 3 to 5, wherein the shopping list generation means stops a payment process based on the shopping list in the case where the shopping list includes a product with the delete flag set.

(Supplementary note 7) The self-checkout system according to any one of Supplementary notes 1 to 6, wherein the rearrangement detection means detects that a product has been returned to a different location than the location from which the product was taken in the case where a change in one display state represents a decrease in products and a change in the other display state represents an increase in products and in the case where the shape of the area of the change is the same between the change in one display state and the change in the other display state and the area of the change is different in the position between them, with respect to the same person.

(Supplementary note 8) The self-checkout system according to any one of Supplementary notes 1 to 7, wherein the rearrangement detection means detects products of the same type displayed in a plurality of locations on the basis of the shelving information, and even in the case where the product has been returned to a different location than the location from which the product was taken but the location is a location where the products of the same type are displayed, the rearrangement detection means detects that the product has been returned to the same location.

(Supplementary note 9) The self-checkout system according to Supplementary note 1, further comprising a flow line detection means for detecting the in-store flow line of a person, wherein the rearrangement detection means detects that a product has been returned to a different location than the location from which the product was taken on the basis of the change in the display state of the product detected by the change detection means and the flow line of the person detected by the flow line detection means.

(Supplementary note 10) The self-checkout system according to Supplementary note 9, wherein the flow line detection means authenticates a person in a predetermined location in the store and follows the authenticated person to detect the flow line of the person and wherein the shopping list generation means generates a shopping list corresponding to the authenticated person when the authentication has been performed.

(Supplementary note 11) A purchased product management method comprising the steps of: detecting a change in a display state of a product on the basis of a captured image of the product; detecting that the product has been returned to a different location than the location from which the product was taken on the basis of the change in the display state of the detected product and a person included in the captured image or a person whose in-store flow line has been detected; specifying the product for which there has been detected a change in the display state that is a result of the person having picked up the product on the basis of shelving information on a product shelf on which the product has been arranged and performing a registration process for registering the specified product on a shopping list corresponding to the person; and performing a deletion process for deleting the product, which has been returned to the different location than the location from which the product was taken, from the shopping list that corresponds to the person, on the basis of a result of detection indicating that the product has been returned to a different location than the location from which the product was taken and of the shelving information.

(Supplementary note 12) A purchased product management program for causing a computer to perform: a change detection process of detecting a change in a display state of a product on the basis of a captured image of the product; a rearrangement detection process of detecting that the product has been returned to a different location than the location from which the product was taken on the basis of the change in the display state of the product detected by the change detection process and a person included in the captured image or a person whose in-store flow line has been detected; and a shopping list generation process of specifying the product for which there has been detected a change in the display state that is a result of the person having picked up the product on the basis of shelving information on a product shelf on which the product has been arranged, performing a registration process for registering the specified product on a shopping list corresponding to the person, and performing a deletion process for deleting the product, which has been returned to the different location than the location from which the product was taken, from the shopping list that corresponds to the person, on the basis of a result of detection by the rearrangement detection process and of the shelving information.

The programs described in each of the above exemplary embodiments and supplementary notes are each stored in a storage device or recorded in a computer-readable recoding medium. The recoding medium is a portable medium such as, for example, a flexible disk, an optical disk, a magneto-optical disk, and a semiconductor memory.

REFERENCE SIGNS LIST 1, 4, 4a Self-checkout system
2, 5 Imaging device
3 Product shelf
6 Flow line detection device
10 Terminal
20 Shopping list management device
30 Output device
40 Payment device
50 Person identification device
71 Detection result
72 Area of change
73 Area of change
74 Area of change
75 Shelf area information
76 Calculation result
90 Classification result
91 Second attention image
92 First attention image
93 Type of change
100 Image processing device
110 First acquisition unit
120 First change detection unit
121 Foreground area detection unit
122 Background information updating unit
123 Foreground area tracking unit
124 First extraction unit 125 Second extraction unit
126 Area change classification unit
130 First storage unit
131 Background information
132 Shelf change model
133 Foreground information
134 Person information
140 First relationship generation unit
150 Relationship integration unit
160 Display detection unit
200 Image processing device
210 Second acquisition unit
220 Second change detection unit
230 Second storage unit
240 Second relationship generation unit
250 Relationship integration unit
300, 300a Image processing device
310, 310a Third acquisition unit
320, 320a Flow line data generation unit
340 First relationship generation unit
400 Image processing device
440 Second relationship generation unit
500 Image processing device
510 Informing unit
600 Information processing device
601 CPU
602 ROM
603 RAM
604 Program group
605 Storage device
606 Drive device
607 Communication interface
608 Input-output interface
609 Bus
610 Recoding medium
611 Communication network

The invention claimed is:

1. A self-checkout system comprising:
an imaging device which captures an image of a product in a store and
a hardware processor configured to execute a software code to:
acquire a captured image of the product captured by the imaging device;
detect changes in first and second display states of a product based on the captured image of the product;
detect that the product has been returned to a different location than a location from which the product was taken based on the changes in the first and second display states of the product and a person included in the captured image or whose in-store flow line has been detected;
specify the product having the first and second display states in which the changes have been detected as a result of the person having picked up the product based on shelving information on a product shelf on which the product has been arranged;
perform a registration process for registering the specified product on a shopping list corresponding to the person; and
perform a deletion process for deleting the product, which has been returned to the different location than the location from which the product was taken, from the shopping list corresponding to the person, based on a result of detection indicating that the product has been returned to the different location than the location from which the product was taken and based on the shelving information,
wherein the hardware processor is configured to execute the software code to detect that the product has been returned to the different location than the location from which the product was taken in a case where the change in the first display state represents a decrease in a first quantity of the product and the change in the second display state represents an increase in a second quantity of product and in a case where a shape of an area of the change in the first display state and a shape of an area of the change in the second display state are identical and a position of the area of the change in the first display state and a position of the area of the change in the second display state are different, with respect to the person,
the product is one of a plurality of products of a same type, the hardware processor is configured to execute the software code to detect the products of the same type displayed in a plurality of locations based on the shelving information, and
in a case where the product has been returned to the different location, but the different location is where other of the products of the same type are displayed, still detect that the product has been returned to an appropriate location.

2. The self-checkout system according to claim 1, wherein the hardware processor is configured to execute the software code to:
associate the detected changes in the first and second display states of the product with the person included in the captured image; and
detect that the product has been returned to the different location than the location from which the product was taken based on a result of associating the detected changes with the person.

3. The self-checkout system according to claim 1, wherein the hardware processor is configured to execute the software code to:
set a delete flag to identify the product that has been returned to the different location than the location from which the product was taken to a target product included in the shopping list as a deletion process; and
notify the person corresponding to the shopping list of the product that has been identified by setting of the delete flag.

4. The self-checkout system according to claim 3, wherein:
the shopping list is associated with a device carried by the person; and
the hardware processor is configured to execute the software code to notify the device of the product that has been identified by setting of the delete flag.

5. The self-checkout system according to claim 4, wherein the hardware processor is configured to execute the software code to receive an instruction indicating whether to delete the product that has been identified by setting of the delete flag set via the device carried by the person and delete the product from the shopping list in a case of receiving an instruction for deleting the product.

6. The self-checkout system according to claim 3, wherein the hardware processor is configured to execute the software code to stop a payment process based on the shopping list in a case where the shopping list includes the product that has been identified by setting the delete flag set.

7. The self-checkout system according to claim 1, wherein the hardware processor is configured to execute the software code to detect the in-store flow line of the person; and
   detect that the product has been returned to the different location than the location from which the product was taken based on the detected changes in the first and second display states of the product and the detected in-store flow line of the person.

8. The self-checkout system according to claim 7, wherein the hardware processor is configured to execute the software code to:
   authenticate the person in a predetermined location in the store and follow the authenticated person to detect the in-store flow line of the person; and
   generate the shopping list corresponding to the authenticated person when authentication has been performed.

9. A purchased product management method comprising:
   capturing an image of a product in a store using an imaging device;
   acquiring a captured image of the product captured by the imaging device;
   detecting changes in first and second display states of a product based on the captured image of the product;
   detecting that the product has been returned to a different location than a location from which the product was taken on based on the changes in the first and second display states of the product and a person included in the captured image or whose in-store flow line has been detected;
   specifying the product having the first and second display states in which the changes have been detected as a result of the person having picked up the product based on shelving information on a product shelf on which the product has been arranged;
   performing a registration process for registering the specified product on a shopping list corresponding to the person;
   performing a deletion process for deleting the product, which has been returned to the different location than the location from which the product was taken, from the shopping list corresponding to the person, based on a result of detection indicating that the product has been returned to the different location than the location from which the product was taken and based on the shelving information,
   wherein the that the product has been returned to the different location than the location from which the product was taken is detected in a case where the change in the first display state represents a decrease in a first quantity of the product and the change in the second display state represents an increase in a second quantity of product and in a case where a shape of an area of the change in the first display state and a shape of an area of the change in the second display state are identical and a position of the area of the change in the first display state and a position of the area of the change in the second display state are different, with respect to the person,
   the product is one of a plurality of products of a same type;
   detecting that the products of the same type displayed in a plurality of locations based on the shelving information; and
   in a case where the product has been returned to the different location, but the different location is where other of the products of the same type are displayed, still detecting that the product has been returned to an appropriate location.

10. A non-transitory computer readable information recording medium storing a purchased product management program that, when executed by a processor, performs a method for:
   capturing an image of a product in a store using an imaging device;
   acquiring a captured image of the product captured by the imaging device;
   detecting changes in first and second display states of a product based on the captured image of the product;
   detecting that the product has been returned to a different location than a location from which the product was taken on based on the changes in the first and second display states of the product and a person included in the captured image or whose in-store flow line has been detected;
   specifying the product having the first and second display states in which the changes have been detected as a result of the person having picked up the product based on shelving information on a product shelf on which the product has been arranged;
   performing a registration process for registering the specified product on a shopping list corresponding to the person;
   performing a deletion process for deleting the product, which has been returned to the different location than the location from which the product was taken, from the shopping list corresponding to the person, based on a result of detection indicating that the product has been returned to the different location than the location from which the product was taken and based on the shelving information,
   wherein the that the product has been returned to the different location than the location from which the product was taken is detected in a case where the change in the first display state represents a decrease in a first quantity of the product and the change in the second display state represents an increase in a second quantity of product and in a case where a shape of an area of the change in the first display state and a shape of an area of the change in the second display state are identical and a position of the area of the change in the first display state and a position of the area of the change in the second display state are different, with respect to the person,
   the product is one of a plurality of products of a same type;
   detecting that the products of the same type displayed in a plurality of locations based on the shelving information; and
   in a case where the product has been returned to the different location, but the different location is where other of the products of the same type are displayed, still detecting that the product has been returned to an appropriate location.

* * * * *